US006248830B1

(12) United States Patent
Matsuda et al.

(10) Patent No.: US 6,248,830 B1
(45) Date of Patent: Jun. 19, 2001

(54) POLYOLEFIN RESIN COMPOSITION

(75) Inventors: Yushi Matsuda; Masao Hara; Daisaburou Adachi, all of Hiroshima-ken (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 09/384,781

(22) Filed: Aug. 27, 1999

(30) Foreign Application Priority Data

Sep. 30, 1998 (JP) .................................. 10-279199
Jul. 2, 1999 (JP) .................................. 11-188816

(51) Int. Cl.[7] ............................ C08L 23/10; C08L 25/06; C08L 25/08; C08L 53/00; C08L 53/02
(52) U.S. Cl. ......................... 525/191; 525/216; 525/238; 525/240; 525/241
(58) Field of Search .................... 525/191, 216, 525/238, 240, 241

(56) References Cited

U.S. PATENT DOCUMENTS 5,965,654 * 10/1999 Hirata et al. .................... 524/451

FOREIGN PATENT DOCUMENTS

| 197 52 658 A1 | 6/1998 | (DE) . |
|---|---|---|
| 63277261 | 11/1988 | (JP) . |
| 6057128 | 3/1994 | (JP) . |
| 6192498 | 7/1994 | (JP) . |
| 08127298 | 5/1996 | (JP) . |
| 10076893 | 3/1998 | (JP) . |
| 10129377 | 5/1998 | (JP) . |

* cited by examiner

*Primary Examiner*—Nathan W. Nutter
(74) *Attorney, Agent, or Firm*—Brooks & Kushman P.C.

(57) ABSTRACT

A polyolefin resin composition comprises a component A consisting of polypropylene or a propylene-ethylene block copolymer whose MFR is greater than 16 (g/10 minutes); a component B consisting of an ethylene based rubber; and a component D compatible with the component B. A ratio of summation of the propylene-ethylene copolymer part in the component A, the component B, and the component D to summation of the components A, B, and D is 25 wt. % or more and 45 wt. % or less. Further, a ratio of the blend quantity of the component D to summation of the blend quantities of the components B and D is less than 0.8. In this manner, the bending elastic modulus and the tensile breaking extension are included in a desired region, while the tensile breaking extension is improved.

17 Claims, 46 Drawing Sheets

FIG. 9A

| BLEND NO. | | COMPONENT A | MFR OF COMPONENT A | BLEND QUANTITY OF COMPONENT A (%) | TACTICITY OF COMPONENT A | COMPONENT B | COMPONENT B | HARDNESS OF COMPONENT B (JIS A) | BLEND QUANTITY OF COMPONENT B (%) | (EPR IN A+B) / (OTHER THAN FILLER) | COMPONENTS C AND D | MFR OF COMPONENT C | BLEND QUANTITY OF COMPONENTS C AND D | C/(A+B+C) | BENDING ELASTIC MODULUS (GPa) | HIGH-SPEED TENSILE BREAKING EXTENSION (%) |
|---|---|---|---|---|---|---|---|---|---|---|---|---|---|---|---|---|
| 1 | COMPARATIVE EXAMPLE 1 | HOMOGENEOUS PP | 0.4 | 100 | | | | | 0 | 0 | | | — | — | 1.25 | 39 |
| 2 | COMPARATIVE EXAMPLE 2 | HOMOGENEOUS PP | 0.4 | 70 | | ETHYLENE-PROPYLENE TERPOLYMER | PARTIAL CROSS LINKING TYPE | 50 | 30 | 30 | | | — | — | 0.66 | 76 |
| 3 | COMPARATIVE EXAMPLE 3 | HOMOGENEOUS PP | 0.4 | 60 | | ETHYLENE-PROPYLENE TERPOLYMER | PARTIAL CROSS LINKING TYPE | 50 | 40 | 40 | | | — | — | 0.45 | 93 |
| 4 | COMPARATIVE EXAMPLE 4 | HOMOGENEOUS PP | 3 | 80 | | ETHYLENE-PROPYLENE TERPOLYMER | PARTIAL CROSS LINKING TYPE | 50 | 20 | 20 | | | — | — | 0.93 | 59 |
| 5 | EXAMPLE 1 | HOMOGENEOUS PP | 3 | 60 | | ETHYLENE-PROPYLENE TERPOLYMER | PARTIAL CROSS LINKING TYPE | 50 | 40 | 40 | | | — | — | 0.54 | 165 |
| 6 | EXAMPLE 2 | HOMOGENEOUS PP | 22 | 60 | | ETHYLENE-PROPYLENE COPOLYMER RUBBER | NON-CROSS LINKING TYPE | 57 | 40 | 40 | | | — | — | 0.63 | 83.1 |
| 7 | EXAMPLE 3 | HOMOGENEOUS PP | 22 | 60 | 92 | ETHYLENE-PROPYLENE TERPOLYMER | PARTIAL CROSS LINKING TYPE | 50 | 40 | 40 | | | — | — | 0.5 | 226.5 |
| 8 | EXAMPLE 4 | HOMOGENEOUS PP | 22 | 60 | | ETHYLENE-PROPYLENE TERPOLYMER | PARTIAL CROSS LINKING TYPE | 90 | 40 | 40 | | | — | — | 0.73 | 95.4 |
| 9 | EXAMPLE 5 | HOMOGENEOUS PP | 22 | 60 | | ETHYLENE-PROPYLENE TERPOLYMER | PARTIAL CROSS LINKING TYPE | 70 | 40 | 40 | | | — | — | 0.51 | 122.1 |
| 10 | EXAMPLE 6 | HOMOGENEOUS PP | 22 | 50 | | ETHYLENE-PROPYLENE TERPOLYMER | PARTIAL CROSS LINKING TYPE | 50 | 40 | 44.44 | TALC | | 10 | — | 0.74 | 118.9 |
| 11 | COMPARATIVE EXAMPLE 5 | BLOCK PP | 45 | 100 | | | | | 0 | 10 | | | — | — | 1.1 | 36.4 |
| 12 | EXAMPLE 7 | BLOCK PP | 45 | 80 | | ETHYLENE-PROPYLENE TERPOLYMER | PARTIAL CROSS LINKING TYPE | 50 | 20 | 28 | | | — | — | 0.68 | 113.1 |

FIG. 9B

| BLEND NO. | | COMPONENT A | MFR OF COMPONENT A | BLEND QUANTITY OF COMPONENT A (%) | TACTICITY OF COMPONENT A | COMPONENT B | COMPONENT B | HARDNESS OF COMPONENT B (JIS A) | BLEND QUANTITY OF COMPONENT B (%) | (EPR IN A+B)/ (OTHER THAN FILLER) | COMPONENTS C AND D | MFR OF COMPONENT C | BLEND QUANTITY OF COMPONENTS C AND D | C/(A+B+C) | BENDING ELASTIC MODULUS (GPa) | HIGH-SPEED TENSILE BREAKING EXTENSION (%) |
|---|---|---|---|---|---|---|---|---|---|---|---|---|---|---|---|---|
| 13 | EXAMPLE 8 | BLOCK PP | 45 | 70 | | ETHYLENE-PROPYLENE TERPOLYMER | PARTIAL CROSS LINKING TYPE | 50 | 30 | 38 | | | — | — | 0.51 | 243.4 |
| 14 | COMPARATIVE EXAMPLE 6 | BLOCK PP | 45 | 60 | | ETHYLENE-PROPYLENE TERPOLYMER | PARTIAL CROSS LINKING TYPE | 50 | 40 | 48 | | | — | — | 0.4 | 300 |
| 15 | COMPARATIVE EXAMPLE 7 | RANDOM PP | 25 | 75 | | ETHYLENE-PROPYLENE TERPOLYMER | PARTIAL CROSS LINKING TYPE | 50 | 25 | 38.25 | | | — | — | 0.49 | 84.3 |
| 16 | EXAMPLE 9 | HOMOGENEOUS PP | 22 | 60 | 94 | ETHYLENE-PROPYLENE COPOLYMER RUBBER | COMPLETE CROSS LINKING TYPE | 45 | 40 | 40 | | | — | — | 0.5 | 214.5 |
| 17 | EXAMPLE 10 | BLOCK PP | 30 | 70 | | ETHYLENE-PROPYLENE TERPOLYMER | PARTIAL CROSS LINKING TYPE | 50 | 30 | 44 | | | — | — | 0.55 | 234 |
| 18 | EXAMPLE 11 | BLOCK PP | 30 | 80 | | ETHYLENE-PROPYLENE COPOLYMER RUBBER | NON-CROSS LINKING TYPE | 88 | 20 | 36 | | | — | — | 0.87 | 97 |
| 19 | EXAMPLE 12 | BLOCK PP | 30 | 70 | | ETHYLENE-PROPYLENE TERPOLYMER | PARTIAL CROSS LINKING TYPE | 50 | 30 | 44 | | | — | — | 0.53 | 98 |
| 20 | EXAMPLE 13 | BLOCK PP | 30 | 60 | | ETHYLENE-PROPYLENE TERPOLYMER | COMPLETE CROSS LINKING TYPE | 50 | 30 | 42 | POLYPROPYLENE | 40 | 10 | 10 | 0.56 | 99 |
| 21 | EXAMPLE 14 | HOMOGENEOUS PP | 22 | 60 | | STYRENE-ETHYLENE-PROPYLENE-STYRENE COPOLYMER | NON-CROSS LINKING TYPE | | 40 | 40 | | | — | — | 0.65 | 211 |

{ ( PROPYLENE-ETHYLENE COPOLYMER PART IN COMPONENT A )
+ COMPONENT B } / ( COMPONENT A + COMPONENT B )

◇ EXAMPLE

□ COMPARATIVE EXAMPLE

FIG. 19A

| | REMARKS | COMPONENT A | | Component B Styrene-containing ethylene based rubber | Blend quantity of B (wt%) | Talc master batch (containing 70% of talc) | D Polystyrene | Blend quantity of D (wt%) | B Styrene-noncontaining ethylene based rubber | Blend quantity of B (wt%) | Bending elastic modulus | Fast extension |
|---|---|---|---|---|---|---|---|---|---|---|---|---|
| | | PP | Blend quantity of A (wt%) | | | | | | | | | |
| EXAMPLE 15 | | BLOCK PP | 50 | SEPS | 20 | 20 | PS | 10 | | | 1.08 | 198 |
| EXAMPLE 16 | MFR OF COMPONENT A = 30 | BLOCK PP | 80 | SEPS | 16 | | PS | 4 | | | 1.00 | 125 |
| EXAMPLE 17 | MFR OF COMPONENT A = 30 | BLOCK PP | 80 | SEPS | 10 | | PS | 10 | | | 1.00 | 104 |
| EXAMPLE 18 | MFR OF COMPONENT A = 50 | BLOCK PP | 50 | SEBS | 20 | 20 | PS | 10 | | | 1.16 | 200 |
| EXAMPLE 19 | COMPONENT B IS SEBS | BLOCK PP | 50 | SEBS | 15 | 10 | PS | 10 | | | 1.41 | 159 |
| EXAMPLE 20 | CONTAINING α-OLEFIN COPOLYMER | BLOCK PP | 55 | SEPS | 10 | | PS | 10 | ETHYLENE-PROPYLENE COPOLYMER | 10 | 0.86 | 176 |
| EXAMPLE 21 | HIGH α-OLEFIN HARDNESS : HIGH MFR | BLOCK PP | 70 | SEPS | 10 | | PS | 10 | ETHYLENE-PROPYLENE COPOLYMER | 10 | 0.83 | 118 |
| EXAMPLE 22 | MIDDLE α-OLEFIN HARDNESS : MIDDLE MFR | BLOCK PP | 70 | SEPS | 10 | | PS | 10 | ETHYLENE-PROPYLENE COPOLYMER | 10 | 0.94 | 119 |
| EXAMPLE 23 | LOW α-OLEFIN HARDNESS : LOW MFR | BLOCK PP | 70 | SEPS | 10 | | PS | 10 | ETHYLENE-PROPYLENE COPOLYMER | 10 | 0.86 | 131 |
| EXAMPLE 24 | | BLOCK PP | 50 | SEPS | 20 | 20 | PS | 10 | | | 1.38 | 103 |
| EXAMPLE 25 | COMPONENT B IS SEBS | BLOCK PP | 50 | SEBS | 20 | 20 | PS | 10 | | | 1.34 | 170 |
| EXAMPLE 26 | | BLOCK PP | 50 | SEPS | 20 | 20 | PS | 10 | | | 1.53 | 116 |
| EXAMPLE 27 | | BLOCK PP | 50 | SEPS | 20 | 20 | PS | 10 | | | 1.37 | 114 |
| EXAMPLE 28 | COMPONENT B IS SEBS | BLOCK PP | 50 | SEBS | 20 | 20 | PS | 10 | | | 1.37 | 150 |
| EXAMPLE 29 | COMPONENT B IS SEBS | BLOCK PP | 50 | SEBS | 20 | 20 | PS | 10 | | | 1.25 | 144 |
| EXAMPLE 30 | COMPONENT D IS ABS | BLOCK PP | 50 | SEPS | 20 | 20 | ABS | 10 | | | 1.27 | 101 |
| EXAMPLE 31 | | BLOCK PP | 50 | SEPS | 20 | 20 | PS | 10 | | | 1.11 | 165 |
| EXAMPLE 32 | MFR OF COMPONENT D : 0.4 | BLOCK PP | 50 | SEPS | 20 | 25 | PS | 10 | | | 1.17 | 129 |
| EXAMPLE 33 | | BLOCK PP | 50 | SEPS | 15 | 20 | PS | 10 | | | 1.46 | 139 |
| EXAMPLE 34 | | BLOCK PP | 50 | SEPS | 20 | 10 | PS | 10 | | | 1.34 | 121 |
| EXAMPLE 35 | COMPONENT D IS A MODIFIED PPE | BLOCK PP | 50 | SEPS | 20 | 20 | MODIFIED PPE | 10 | | | 1.04 | 138 |
| EXAMPLE 36 | COMPONENT D IS SBS | BLOCK PP | 55 | SEPS | 20 | 20 | SBS | 10 | | | 1.23 | 127 |
| EXAMPLE 37 | | BLOCK PP | 55 | SEPS | 15 | 10 | PS | 10 | ETHYLENE-PROPYLENE-DIEN BASED TERPOLYMER | 10 | 0.80 | 172 |
| EXAMPLE 38 | COMPONENT B IS SEEPS | BLOCK PP | 60 | SEEPS | 15 | 20 | PS | 5 | | | 1.30 | 102 |

FIG. 19B

| | | COMPONENT A | | COMPONENT B | | | | D | | | | |
|---|---|---|---|---|---|---|---|---|---|---|---|---|
| | REMARKS | PP | BLEND QUANTITY OF A (wt%) | STYRENE-CONTAINING ETHYLENE BASED RUBBER | BLEND QUANTITY OF B (wt%) | TALC MASTER BATCH (CONTAINING 70% OF TALC) | POLYSTYRENE | BLEND QUANTITY OF D (wt%) | STYRENE-NONCONTAINING ETHYLENE BASED RUBBER | BLEND QUANTITY OF B (wt%) | BENDING ELASTIC MODULUS | FAST EXTENSION |
| COMPARATIVE EXAMPLE 8 | MFR OF COMPONENT A = 16 | BLOCK PP | 50 | SEPS | 20 | 20 | PS | 10 | | | 1.66 | 46 |
| COMPARATIVE EXAMPLE 9 | MFR OF COMPONENT A = 30 | BLOCK PP | 92.5 | SEPS | 7.5 | 0 | PS | 0 | | | 1.23 | 62 |
| COMPARATIVE EXAMPLE 10 | MFR OF COMPONENT A = 30 | BLOCK PP | 45 | SEPS | 20 | 20 | PS | 15 | | | 0.57 | 238 |
| COMPARATIVE EXAMPLE 11 | NO COMPONENT D | BLOCK PP | 60 | SEPS | 20 | 20 | | | | | 1.49 | 95 |
| COMPARATIVE EXAMPLE 12 | MFR OF COMPONENT A = 30 | BLOCK PP | 80 | SEPS | 4 | | PS | 16 | | | 1.49 | 41 |
| COMPARATIVE EXAMPLE 13 | MFR OF COMPONENT A = 30 | BLOCK PP | 80 | SEPS | 0 | | PS | 20 | | | 1.79 | 10 |
| COMPARATIVE EXAMPLE 14 | | BLOCK PP | 50 | SEPS | 20 | 20 | PS | 10 | | | 1.70 | 29 |
| COMPARATIVE EXAMPLE 15 | | BLOCK PP | 50 | SEPS | 20 | 20 | PS | 10 | | | 1.68 | 60 |
| COMPARATIVE EXAMPLE 16 | | BLOCK PP | 50 | SEPS | 20 | 20 | PS | 10 | | | 2.06 | 51 |
| COMPARATIVE EXAMPLE 17 | MFR OF COMPONENT A = 30 TACTICITY: 92 | BLOCK PP | 50 | SEPS | 20 | 20 | PS | 10 | | | 1.66 | 46 |
| COMPARATIVE EXAMPLE 18 | | BLOCK PP | 50 | SEPS | 20 | 20 | PS | 10 | | | 1.70 | 54 |

FIG. 20A

| | | EXAMPLE 15 | EXAMPLE 16 | EXAMPLE 17 | EXAMPLE 18 | EXAMPLE 19 | EXAMPLE 20 | EXAMPLE 21 | EXAMPLE 22 | EXAMPLE 23 | EXAMPLE 24 | EXAMPLE 25 | EXAMPLE 26 | EXAMPLE 27 | EXAMPLE 28 | EXAMPLE 29 | EXAMPLE 30 | EXAMPLE 31 | EXAMPLE 32 |
|---|---|---|---|---|---|---|---|---|---|---|---|---|---|---|---|---|---|---|---|
| | LIMITING VISCOSITY OF COMPONENT D / LIMITING VISCOSITY OF COMPONENT B | 0.4 | | | | | | | | | | | | | | | | 0.4 | 0.5 |
| | LIMITING VISCOSITY OF COMPONENT B / LIMITING VISCOSITY OF COMPONENT A | 0.6 | | | | | | | | | | | | | | | | 0.9 | 0.6 |
| TOTAL | TACTICITY | 94 | | | | | | | | | | | | | | | | | |
| | VISCOSITY RATIO OF COMPONENT D TO COMPONENT B | 0.24 | | | | | | | | | | | | | | | | 0.40 | 0.61 |
| | VISCOSITY RATIO OF COMPONENT B TO COMPONENT A | 7.87 | | | | | | | | | | | | | | | | 7.87 | 7.87 |
| D | MELT VISCOSITY ($Pa \cdot S$, 200°C) | 268 | | | | | | | | | | | | | | | | 453 | 692 |
| B | MELT VISCOSITY ($Pa \cdot S$, 200°C) | 1135 | | | | | | | | | | | | | | | | 1135 | 1135 |
| COMPONENT A | MELT VISCOSITY ($Pa \cdot S$, 200°C) | 144 | | | | | | | | | | | | | | | | 144 | 144 |
| A POLYSTYRENE | MFR | 30 | | | 50 | | | | | | | | | | | | | | |
| D | MFR (200°C, 5.0Kg) | 30 | 30 | 30 | 30 | 30 | 30 | 30 | 30 | 30 | 30 | 30 | 30 | 30 | 30 | 30 | 30 | 7 | 0.4 |
| B STYRENE BASED ELASTOMER | MFR | 17.2 | 17.2 | 17.2 | 17.2 | 4.5 | 17.2 | 17.2 | 17.2 | 17.2 | 4.0 | 13.0 | 2.4 | 70.0 | 5.0 | 10.8 | 17.2 | 17.2 | 17.2 |
| B | STYRENE CONTENT | 23 | 23 | 23 | 23 | 18 | 23 | 23 | 23 | 23 | 13 | 19 | 30 | 30 | 32 | 13 | 23 | 23 | 23 |
| B α-OLEFIN COPOLYMER | MFR | | | | | 0.4 | 8.6 | 0.7 | 0.4 | | | | | | | | | | |
| B | RUBBER HARDNESS | | | | | | 55 | 73 | 57 | 55 | | | | | | | | | |

FIG. 20B

| | | Example 33 | Example 34 | Example 35 | Example 36 | Example 37 | Example 38 | Comparative Example 8 | Comparative Example 9 | Comparative Example 10 | Comparative Example 11 | Comparative Example 12 | Comparative Example 13 | Comparative Example 14 | Comparative Example 15 | Comparative Example 16 | Comparative Example 17 | Comparative Example 18 |
|---|---|---|---|---|---|---|---|---|---|---|---|---|---|---|---|---|---|---|
| | LIMITING VISCOSITY OF COMPONENT D / LIMITING VISCOSITY OF COMPONENT B | | | | | | | | | | | | | | | | | |
| | LIMITING VISCOSITY OF COMPONENT B / LIMITING VISCOSITY OF COMPONENT A | | | | | | | | | | | | | | | | | |
| TOTAL | TACTICITY | | | | | | | | | | | | | | | | | 92 |
| | VISCOSITY RATIO OF COMPONENT D TO COMPONENT B | 1.19 | | | | | | | | | | | | | | 0.22 | | 0.24 |
| | VISCOSITY RATIO OF COMPONENT B TO COMPONENT A | 2.64 | | | | | | | | | | | | | | 14.48 | | 12.88 |
| D | MELT VISCOSITY (Pa·S, 200°C) | 453 | | | | | | | | | | | | | | 453 | | 453 |
| B | MELT VISCOSITY (Pa·S, 200°C) | 380 | | | | | | | | | | | | 2088 | | | | 1857 |
| COMPONENT A | MELT VISCOSITY (Pa·S, 200°C) | 144 | | | | | | | | | | | | 144 | | | | 144 |
| A POLYSTYRENE | MFR (200°C, 5.0Kg) | 30 | 7 | | | | 30 | 30 | 7 | 7 | 7 | 30 | 30 | 7 | 30 | 30 | 30 | 7 |
| B STYRENE BASED ELASTOMER | MFR | 17.2 | 70.0 | 17.2 | 17.2 | 17.2 | | 17.2 | 17.2 | 17.2 | 17.2 | 17.2 | 17.2 | 0.0 | 0.0 | 0.4 | 17.2 | 2.4 |
| B | STYRENE CONTENT | 23 | 30 | 23 | 23 | 23 | | 23 | 23 | 23 | 23 | 23 | 23 | 35 | 35 | 65 | 23 | 30 |
| B α-OLEFIN COPOLYMER | MFR | | | | | | | | | | | | | | | | | |
| B | RUBBER HARDNESS | | | 50 | | | | | | | | | | | | | | |

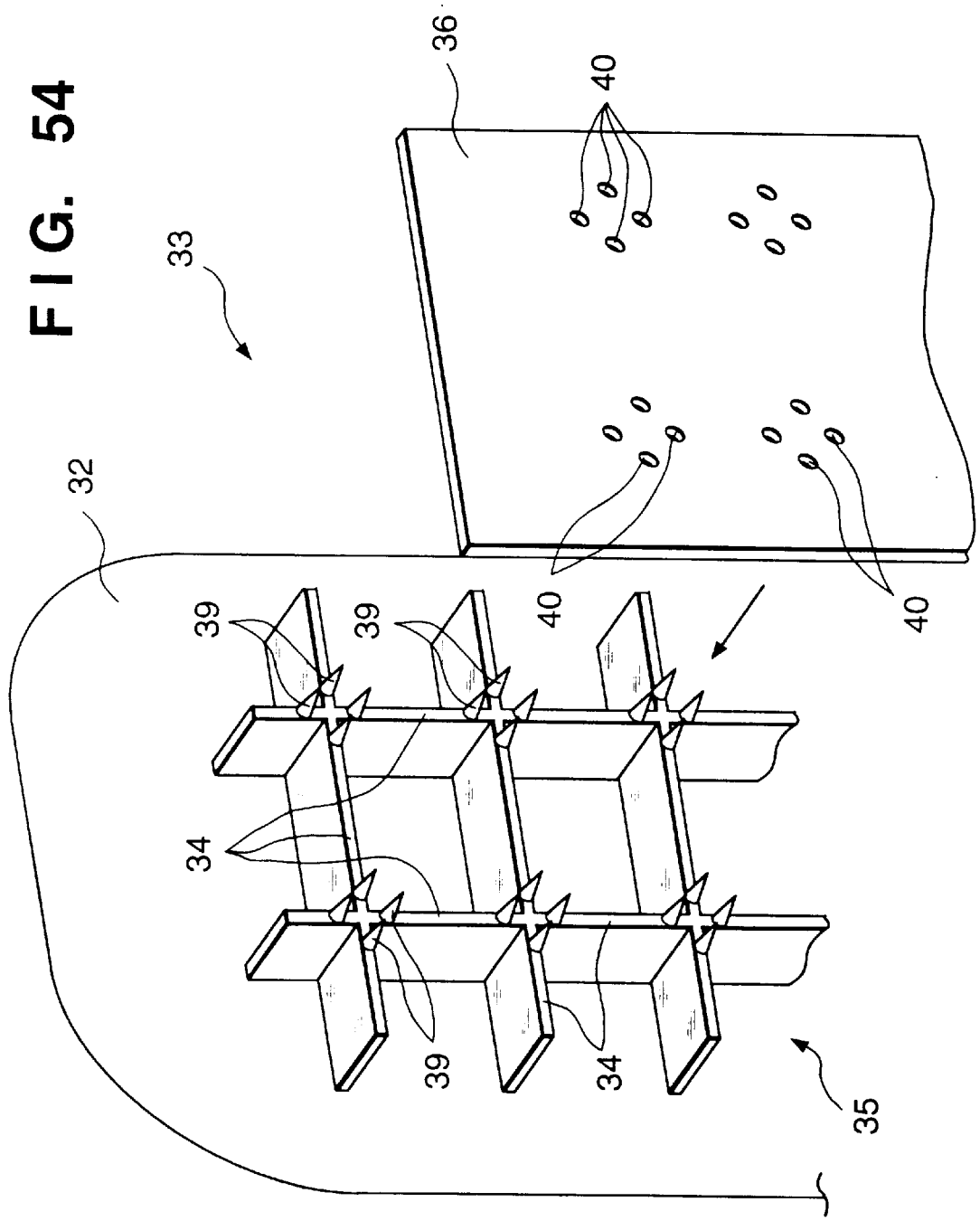

POLYOLEFIN RESIN COMPOSITION

BACKGROUND OF THE INVENTION

1. Field of the Invention

This invention relates to a polyolefin resin composition exhibiting its superior characteristics for high-speed tensile breaking extension while ensuring harmony with a bending elastic modulus.

2. Description of Related Art

Recently, a shock absorbing structure is likely to be employed at various sites from the viewpoint of ensuring human protection. This shock absorbing structure generally comprises a resin based energy absorbing body. Even if a human being bumps against this shock absorbing structure, the resin based energy absorbing body absorbs shock energy at that time. Recently, it is expected to increase capability of absorbing the shock energy of the resin based energy absorbing body (for instance, from the viewpoint of better human protection (reduction of injury or the like), it is expected to enable shock energy to be absorbed over a long time while a crush acceleration at the time of collision is maintained at a low level (in a state in which a speed change is small)).

However, when the shock energy absorbing capability is increased as described above, the thickness of the resin based energy absorbing body muse be thickened, and collision strokes at the time of collision must be increased, thus causing deterioration of the use (mounting) environment of the shock absorbing structure.

The following description will be given with reference to a specific example. The above-mentioned shock absorbing structure is applicable to vehicles such as automobiles having possibility of collision in which a clew (the head or the like) may bump against the body, as disclosed in Japanese Patent Laid-Open Nos. 10-129377 and 10-76893. However, in the case where an attempt is made to lower a maximum acceleration at the time of crush of the resin based energy absorbing body from the viewpoint of better human protection, it becomes impossible to absorb shock energy due to lowered maximum acceleration at the time of the crush. In this case, the thickness of the resin based energy absorbing body must be thickened to ensure the shock absorption stroke. It is difficult to adopt such a construction considering a limited vehicle space.

On the other hand, as disclosed in Japanese Patent Laid-Open No. 8-127298, it is proposed that a resin based energy absorbing body is crushed, and a pillar as a strength member is also deformed by the resin based energy absorbing body to increase shock absorption strokes at the time of collision. Recently, to improve body rigidity, the thickness of the pillar is increased, reinforcement is added, high tension or the like is applied. Therefore, it is difficult to deform the pillar as a strength member to increase the shock absorption strokes based on the above-mentioned proposal.

SUMMARY OF THE INVENTION

In view of such circumstance, the present invention has been achieved under the recognition that, as to shock absorption, there is a limitation to improvement from a structural aspect, and there is a need for ensuring improvement from a material aspect (a resin composition). It is a technical object of the present invention to provide a polyolefin resin composition capable of enhancing its shock absorption performance while considering human protection and use environment or the like.

To achieve the above-mentioned technical object, in a first aspect of the present invention, there is provided: a polyolefin resin composition comprising a component (A) comprising polypropylene or propylene-ethylene block copolymer with a melt flow rate (MFR) greater than 16 (g/10 minutes); a component (B) comprising ethylene based rubber; and a component (D) compatible with the component (B), wherein a ratio of summation of a propylene-ethylene copolymer part in the component (A), the component (B), and the component (D) to summation of the component (A), the component (B), and the component (D) is 25 wt. % or more and 45 wt. % or less, and a ratio of a blend quantity of the component (D) to summation of the blend quantity of the component (B) and the blend quantity of the component (D) is less than 0.8.

In a second aspect of the present invention, a melt flow rate (MFR) of the component (A) is greater than 45 (g/10 minutes).

In a third aspect of the present invention, the component (B) is a copolymer containing at least both of a styrene skeleton and an ethylene skeleton.

In a fourth aspect of the present invention, the component (B) contains a propylene skeleton.

In a fifth aspect of the present invention, the component (B) contains a butylene skeleton.

In a sixth aspect of the present invention, the component (B) contains an α-olefin copolymer containing ethylene.

In a seventh aspect of the present invention, the melt flow rate (MFR) of the copolymer of the component (B) is 0.5 (g/10 minutes) or more and 140 (g/10 minutes) or less.

In an eighth aspect of the present invention, the styrene skeleton content in the copolymer of the component (B) is 13 wt. % or more and less than 35 wt. % of the component (B).

In a ninth aspect of the present invention, the component (D) is an aromatic vinyl polymer.

In a tenth aspect of the present invention, the melt flow rate (MFR) of the component (D) is 6 (g/10 minutes) or more.

In an eleventh aspect of the present invention, the component (D) is polystyrene.

In a twelfth aspect of the present invention, the component (B) surrounds the component (D), and these components each have a fine structure dispersed in the component (A).

In a thirteenth aspect of the present invention, a ratio of the viscosity before mixing in the component (B) to that in the component (A) (viscosity of the component (B) /viscosity of the component (A)) is 2.6 to 10.

In a fourteenth aspect of the present invention, a ratio of the viscosity before mixing in the component (D) to that in the component (B) (viscosity of the component (D) /viscosity of the component (B)) is 0.4 or less.

In a fifteenth aspect of the present invention, the composition is fractionated into an extraction residue component and an extracted component by Soxhlet fractionation using chloroform; the extracted component is fractionated into a methyl ethyl ketone insoluble component and a methyl ethyl ketone soluble component by dissolution fractionation using methyl ethyl ketone; the methyl ethyl ketone soluble component is fractionated into a hexane soluble component and a hexane insoluble component by dissolution fractionation using hexane; an n-decane soluble component is fractionated by heating dissolution fractionation using n-decane with respect to the extraction residue component; and when limiting viscosity $\eta 1$ of the hexane insoluble component, limiting viscosity $\eta 2$ of a mixture in which the hexane soluble component and the methyl ethyl ketone insoluble component are mixed with each other, and limiting viscosity η3 of the n-decane soluble component are obtained, a ratio of the limiting viscosity η2 of the mixture to the limiting viscosity η3 of the n-decane soluble component (η2/η3) is 0.6 or more and 0.9 or less.

In a sixteenth aspect of the present invention, the composition is fractionated into an extraction residue component and an extracted component by Soxhlet fractionation using chloroform; the extracted component is fractionated into a methyl ethyl ketone soluble component and a methyl ethyl ketone soluble component by dissolution fractionation using methyl ethyl ketone; the methyl ethyl ketone insoluble component is fractionated into a hexane soluble component and a hexane insoluble component by dissolution fractionation using hexane; an n-decane soluble component is fractionated by heating dissolution fractionation using n-decane with respect to the extraction residue component; and when the limiting viscosity η1 of the hexane insoluble component, the limiting viscosity η2 of the mixture in which the hexane soluble component and the methyl ethyl ketone insoluble component are mixed with each other, and the limiting viscosity η3 of the n-decane soluble component are obtained, the ratio η1/η2 of the limiting viscosity η1 of the hexane insoluble component to the limiting viscosity η2 of the mixture is 0.5 or less.

In a seventeenth aspect of the present invention, recycled polypropylene or a propylene-ethylene block copolymer is contained as the component (A); a recycled aromatic vinyl polymer is contained as the component (D) and as the component (B), a copolymer including at least both of the styrene skeleton and the ethylene skeleton is contained as a content adjusting material.

In an eighteenth aspect of the present invention, the bending elastic modulus is set to 0.5 GPa or more and the tensile breaking extension at a strain speed of 60 (1/s) is set to 80% or more.

According to the first aspect, the melt flow rate (MFR) of the component A is greater than 16 (g/10 minutes); in addition to the components A and B, the component D compatible with the component B is contained; the ratio of summation of the propylene-ethylene copolymer part in the component A, the component B, and the component D to summation of the components A, B, and D is 25 wt. % or more and 45 wt. % or less; and the ratio of the blend quantity of the component D to summation of the blend quantities of the components B and D is less than 0.8. Based on each of these elements or the like or based on a connection between these elements or the like, while the tensile breaking extension and bending elastic modulus are included in a desired region (for example, a region in which a bending elastic modulus is 0.5 GPa or more and a high-speed tensile breaking extension is 80% or more at a strain speed of 60 (1/s) the tensile breaking extension can be improved). Based on an energy absorbing member using the olefin resin composition, after a generated load (crush acceleration) is initiated to a constant level at the initial stage of collision and deformation, extension of the resin material itself is increased, thereby making it possible to increase the absorption quantity of shock energy, and to avoid an increase in the shock absorption strokes. Therefore, the polyolefin resin composition is employed, thereby making it possible to enhance shock absorption performance considering human protection and use environment or the like.

According to the second to seventeenth aspects, based on the elements as claimed in each claim, the tensile breaking extension is improved while a balance with the bending elastic modulus is specifically obtained in a desired region, making it possible to enhance shock absorption performance.

According to the eighteenth aspect, the bending elastic modulus is set to 0.5 GPa or more and the tensile breaking extension at a strain speed of 60 (1/s) is set to 80% or more. Thus, while general rigidity or the like is ensured, the tensile breaking extension can be improved more than a general case (in which the bending elastic modulus is 0.5 GPa or more and the tensile breaking extension is 30% or less at a strain speed of 60 (1/s)), and specifically, shock absorption performance can be enhanced considering human protection and use environment or the like.

As a more preferred mode 1, in the first and second aspects, tacticity of the component (A) is 93 or more.

As a more preferred mode 2, in the fourth aspect, the component (B) is a styrene-ethylene-propylene terpolymer.

As a more preferred mode 3, in the fifth aspect, the component (B) is a styrene-ethylene-butylene terpolymer.

As a more preferred mode 4, in the sixth aspect, the rubber hardness of the α-olefin copolymer is 73 or less in JIS A.

As a more preferred mode 5, in the sixth aspect, the rubber hardness of the α-olefin copolymer is 55 or less in JIS A.

As a more preferred mode 6, in the sixth aspect, the melt flow rate (MFR) of the α-olefin copolymer is 8.6 (g/10 minutes) or less.

As a more preferred mode 7, in the sixth aspect, the melt flow rate (MFR) of the α-olefin copolymer is 0.5 (g/10 minutes) or less.

As a more preferred mode 8, in the ninth aspect, an aromatic vinyl polymer as the component (D) is an aromatic vinyl copolymer.

As a more preferred mode 9, in the mode 8, the component (D) is an acrylonitrile-butylene-styrene copolymer.

As a more preferred mode 10, in the mode 8, the component (D) is a modified polyphenylene ether.

As a more preferred mode 11, in the mode 8, the component (D) is a styrene-butylene-styrene copolymer.

As a more preferred mode 12, in any of the first to seventeenth aspects and in any of the modes 1 to 11, a talc in which a specific surface area is 3.5 m²/g or more is blended so as to be 30% or less of all including the talc.

As a more preferred mode 13, in any of the first to seventeenth aspects and in any of the modes 1 to 11, the bending elastic modulus is set to 0.5 GPa or more and the tensile breaking extension at a strain speed of 60 (1/s) is set to 145% or more.

As a more preferred mode 14, in any of the first to seventeenth aspects and in any of the modes 1 to 13, the composition is employed as an energy absorbing member for reducing force acting on a human body.

As a more preferred mode 15, in the mode 14, the energy absorbing member is employed for automobile parts.

As a more preferred mode 16, in any of the first to seventeenth aspects and in any of the modes 1 to 13, the composition is employed as a resin based energy absorbing body in which plate shaped rib portions are integrated with these portions crossing with each other.

As a more preferred mode 17, in any of the first to If; seventeenth aspects and in any of the modes 1 to 13, the resin based energy absorbing body is employed for automobile parts that may bump against a human body during collision.

According to the mode 13, the bending elastic modulus is set to 0.5 GPa or more and the tensile breaking extension at a strain speed of 60 (1/s) is set to 145% or more, thereby making it possible to improve shock absorption performance more significantly than the eighteenth aspect.

According to the mode 14, the composition is employed as an energy absorbing member for reducing force acting on a human body, and the energy absorbing member has a superior shock absorption performance, thus making it possible to effectively protect a human body based on the shock absorption performance.

According to the mode 15, the energy absorbing member is employed for mobile parts, thus making it possible to protect clews or pedestrians via the energy absorbing member having the superior shock absorption performance.

According to the mode 16, the comosition is employed as a resin based energy absorbing body in which plate shaped rib portions are integrated with the portions crossing with each other. Thus, in addition to ensuring reduction of weight and use materials merely, a generated load (crush acceleration) at the initial stage of collision and deformation is initiated, its initiation gradient or the like can be adjusted at each rib portion, and further, an easily breakable rib portion crossing and the material properties of the resin composition are well utilized, making it possible to increase shock energy absorption.

According to the mode 17, the energy absorbing body is employed for automobile parts that may bump against a human body during collision, thus making it possible to effectively protect a human body based on the superior shock absorption performance even if collision occurs.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore, reference is made to the claims which follow the description for determining the scope of the invention.

BRIEF DESCRIPTION OF THE DRAWINGS

FIGS. 9A and 9B are views showing the results in which the energy absorbing body is molded under a variety of conditions, components or the like, and testing is carried out for such mold products each;

FIGS. 19A and 19B is a view showing the results in which the energy absorbing body is molded under another variety of conditions, components or the like, and testing is carried out for such mold products each;

FIGS. 20A and 20B is a view showing the results in which the energy absorbing body is molded under another variety of conditions, components or the like, and testing is carried out for such mold product each;

FIG. 54 is a perspective view showing the energy absorbing body according to the fifth embodiment.

DETAILED DESCRIPTION OF THE PREFERRED EMBODIMENTS

Hereinafter, embodiments of the present invention will be described with reference to drawings.

First, a shock absorbing structure to which the present invention is applied will be described.

Figure 1:
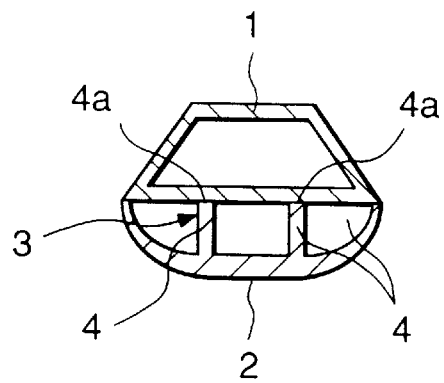
FIG. 1 is a traverse sectional view showing a resin based energy absorbing body according to a first embodiment arranged between a pillar and a pillar trim.
Figure 2:
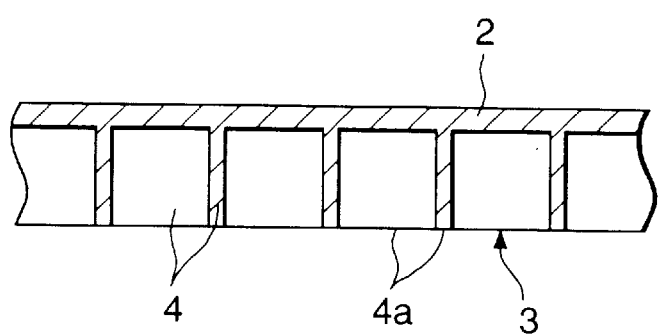
FIG. 2 is a longitudinal sectional view showing the resin based energy absorbing body and the pillar trim according to the first embodiment.
Figure 3:
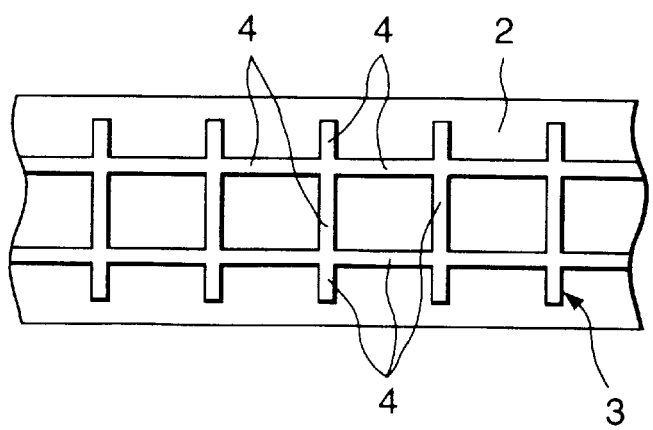
FIG. 3 is a plan view showing the resin based energy absorbing body and the pillar trim according to the first embodiment.

FIG. 1 shows a shock absorbing structure in an automobile. In FIG. 1, reference numeral 1 designates each pillar (a pillar inner) in an automobile, reference numeral 2 designates a pillar trim, and a resin based energy absorbing body 3 is provided between each pillar 1 and each pillar trim 2 in the automobile. The energy absorbing body 3 forms a lattice-shaped lattice body as shown in FIG. 2 and FIG. 3, the lattice shape is composed of a plurality of plate shaped rib portions 4, and each of these rib portions 4 is arranged so as to ensure a position relationship substantially orthogonal to the adjacent rib portions 4. In this embodiment, this energy absorbing body 3 (a proximal end of each rib portion 4) is integrated so that each rib portion 4 is erected from the interior face of the pillar trim 2 by integral molding using the same resin, and a tip end 4a of each rib portion 4 of the energy absorbing body 3 is abutted against the pillar 1. The shape of this energy absorbing body 3 is apparently the same as a general one, and the rib portion height (a length from the interior face of the pillar trim 2 to the tip end of the rib 4) is about 15 mm, the rib portion interval (a length between the opposite rib portions) is about 20 mm, and the rib portion thickness (thickness) is about 1 mm.

Figure 7:
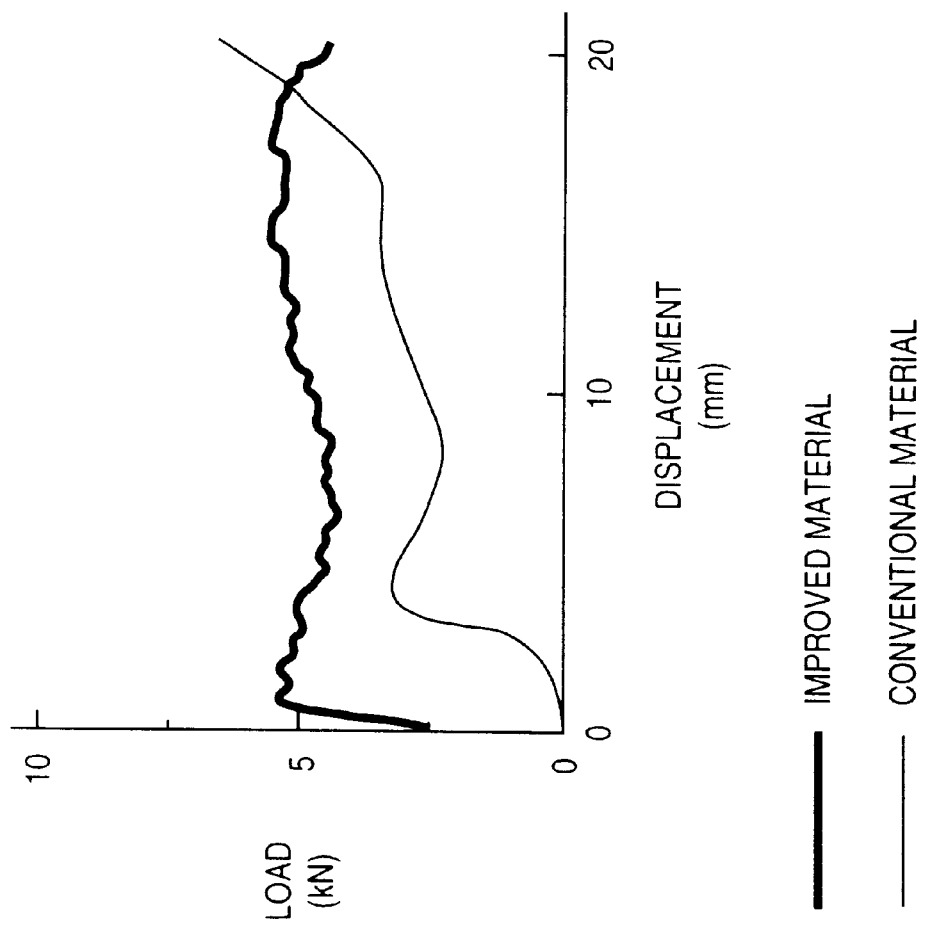
FIG. 7 is a graph depicting load-displacement characteristics when a shock load is applied to the energy absorbing body and the pillar trim according to the first embodiment.

The above energy absorbing body 3 has its material performance in which a high-speed tensile breaking extension (extension rate) is higher than the general one (i.e., about 30% assuming that the bending elastic modulus is 0.5 GPa or more). In the case where a breakage occurs at a crossing portion (cross portion) of the tip end 4a of the adjacent rib portions 4, attention is focused on the fact that the generated load upon the energy absorbing body 3 falls significantly (refer to the conventional material line of FIG. 7). This is because, when the tension force in a direction in which the adjacent rib portions 4 are broken together with the shock load being applied to the adjacent rib portions 4 acts, each rib portion 4 expands, and restricts an occurrence of a breakage at the crossing portion between the tip end and the proximal end of the adjacent rib portions 4. In this manner, as shown in FIG. 7 (refer to the improved material line), after the generated load (crush acceleration) is initiated to a constant level at the initial stage of collision and deformation, a displacement (time) in which the generated load (acceleration) continues in a substantially constant state lengthens. As a result, absorption of the shock energy due to the energy absorbing body 3 is increased even if shock absorption strokes are not increased.

Since 0.5 GPa as the lower limit of the bending elastic modulus is led from required rigidity of a general member, the material is likely to be hardly bent with an increase in the bending elastic modulus.

A more specific description will be given with respect to the above.

Figure 4:
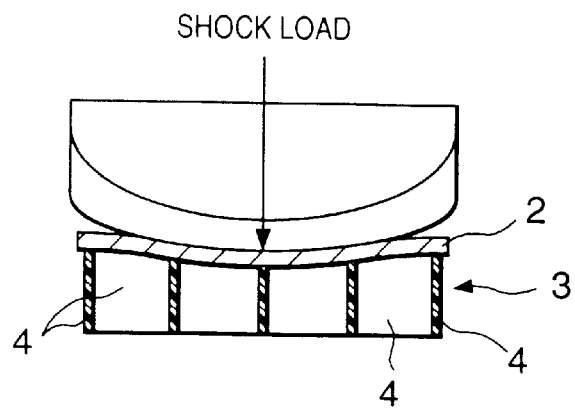
FIG. 4 is an illustrative view for illustrating a state in which a shock load is applied to the energy absorbing body and the pillar trim according to the prior art.
Figure 5:
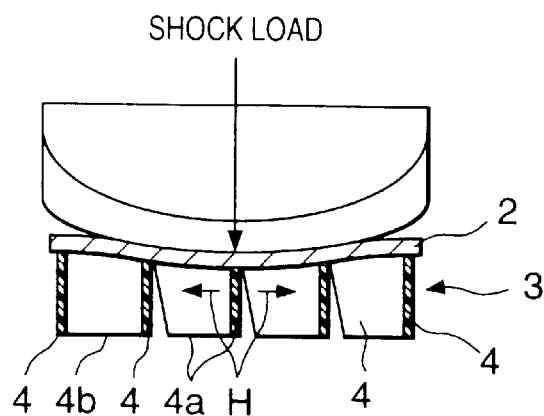
FIG. 5 is a view of the state of operation from FIG. 4.
Figure 6:
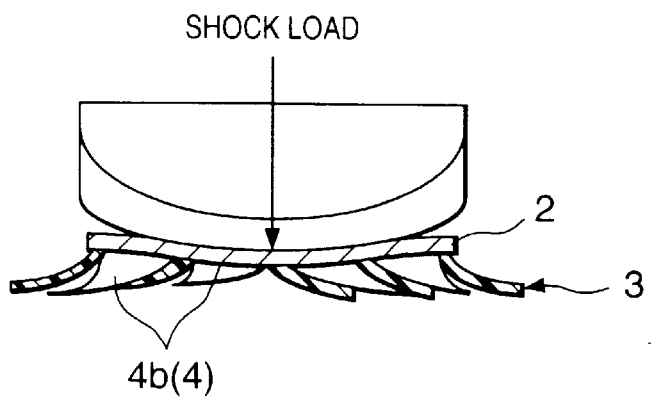
FIG. 6 is a view of state of operation from FIG. 5.

When an energy absorbing body in the same lattice shape as the above energy absorbing body 3 is formed, having its normal material performance in the high-speed tensile breaking extension, and a shock load is applied to that energy absorbing body via the pillar trim 2, the energy absorbing body 3 first causes compressive elastic deformation as shown in FIG. 4. Then, as shown in FIG. 5 and FIG. 6, tension force acts in a direction substantially orthogonal to the acting direction of the shock load (for example, refer to a direction indicated by the arrow H in FIG. 5) with the shock load being applied to the crossing portion of the tip end 4a of the adjacent rib portions. The crossing portion of the tip end 4a of the adjacent rib portions breaks, and the flat plate part 4b of each rib portion 4 is bent and deformed. Such state indicates that up to the rise point at the beginning of collision is a compressive elastic deformation region, and a region from that point to the vicinity of the end of a traverse axis is a coexisting region of breakage at the crossing portion of the tip end 4a of the adjacent rib portions and buckling and deformation at each rib portion 4 in FIG. 7 (refer to the conventional material line).

When a strain speed and a strain quantity are measured for each deformation in such process, the strain speed indicates about 90 (1/s), and the strain quantity indicates 1 to 2% in compressive elastic deformation; the strain speed indicates 1,700 to 3,500 (1/s), and the strain quantity indicates about 100% in tension deformation (breakage) at the crossing portion of the adjacent rib portion 4; and the strain speed indicates about 900 (1/s), and the strain quantity indicates 30 to 40% in buckling and deformation of the flat plate part 4b of the rib portion 4. From the above fact, it is recognized that the tension deformation (breakage) at the crossing portion of the adjacent rib portion 4 greatly influences shock energy absorption. To restrict this breakage, an attempt is made to obtain a high-speed tensile breaking extension of 100% at a strain speed of 2000 (1/s) based on the above strain speed and strain quantity.

Figure 8:
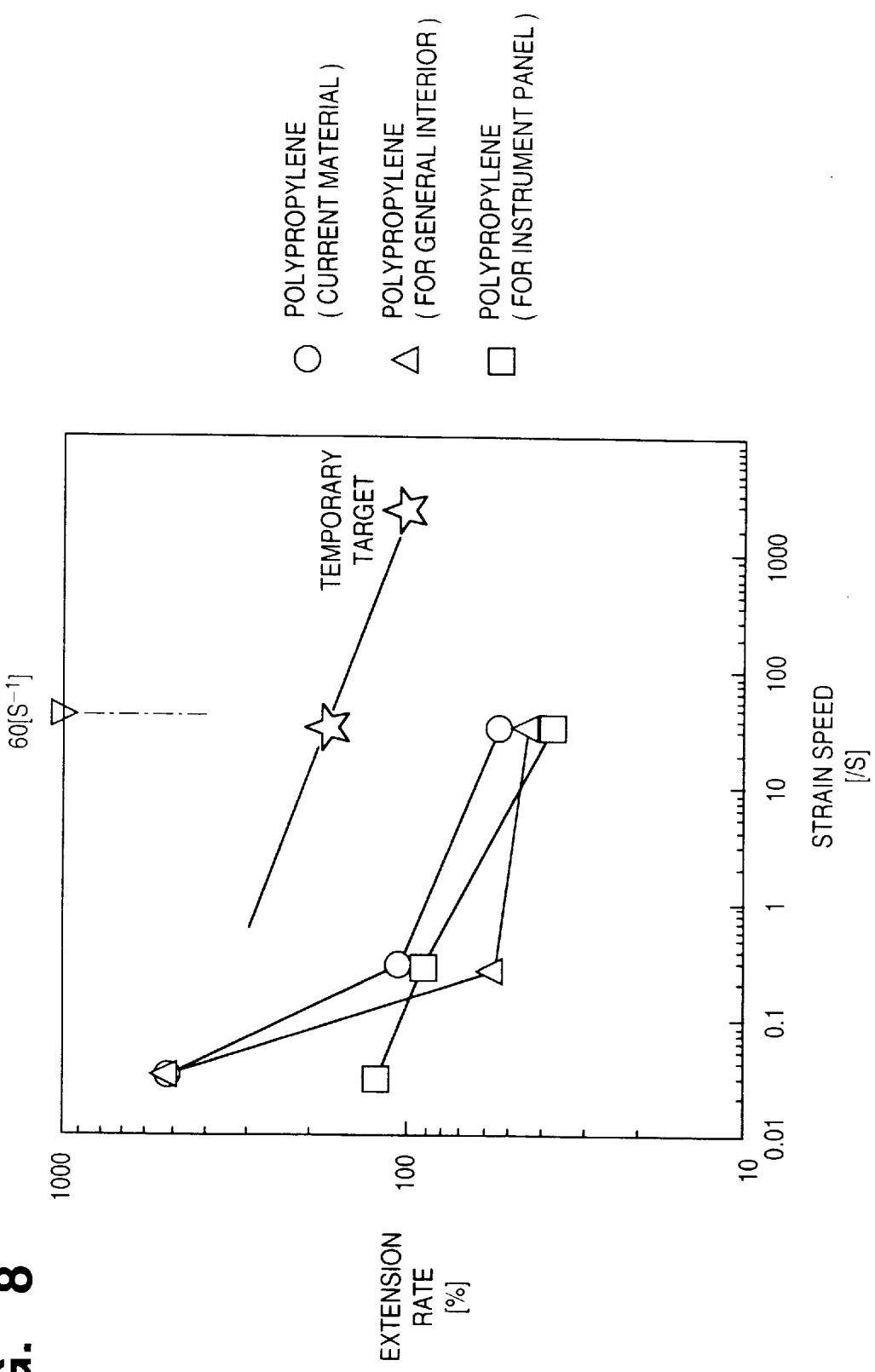
FIG. 8 is an illustrative view for illustrating technique in which a target extension rate (a high-speed tensile breaking extension) is obtained in a measurable region.

However, it is difficult to measure a region for the above strain speed of 2,000 (1/s). Therefore, as shown in FIG. 8, the above value (a strain speed of 2,000 (1/s) and a high-speed tensile breaking extension (extension rate) of 100%) was set as a temporary target value in FIG. 8, the extension rate was obtained near 60 (1/s) as a measurable upper limit while tendency of the general material of the energy absorbing body is considered with its temporary target value being a reference (a tendency in which the extension rate increases with a decrease in strain speed, a level of the tendency, etc. (refer to a dotted dash line)), and the value of about 200% was set as a target value to be actually handled.

Specifically, a variety of tests were carried out from the viewpoints of blend materials, conditions or the like to obtain the above high-speed tensile breaking extension (extension rate), the results shown in FIGS. 9A and 9B were obtained, and the following findings (a resin composition) were found out based on the results shown in FIGS. 9A and 9B. In FIGS. 9A and 9B, a homogeneous PP designates polypropylene, a block PP designates a propylene-ethylene block copolymer, and a random PP designates a propylene-ethylene random copolymer.

A resin composition constituting the energy absorbing body 3 consists of a component A consisting of polypropylene or a propylene-ethylene block copolymer having a melt flow rate (MFR) greater than 0.4 (g/10 minutes); and a component B consisting of an ethylene based rubber, wherein a ratio of summation of the propylene-ethylene copolymer part in the component A and the component B to summation of the components A and B is preferably 25 wt. % or more and 45 wt. % or less.

Figure 10:
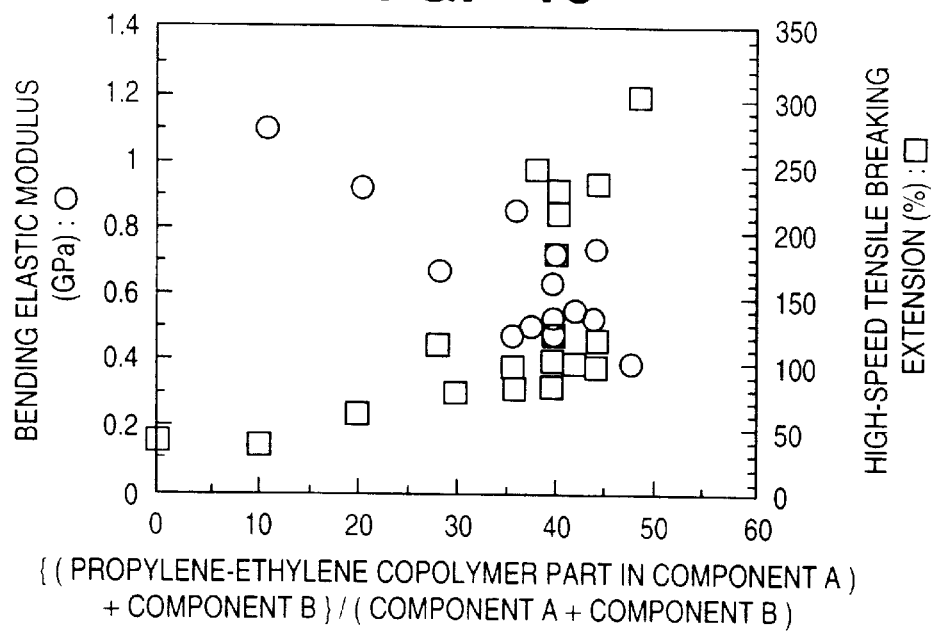
FIG. 10 is a view showing an effect of ((a propylene-ethylene copolymer part in component A)+component B)/(component A+component B) upon the bending elastic modulus and high-speed tensile breaking extension.
Figure 11:
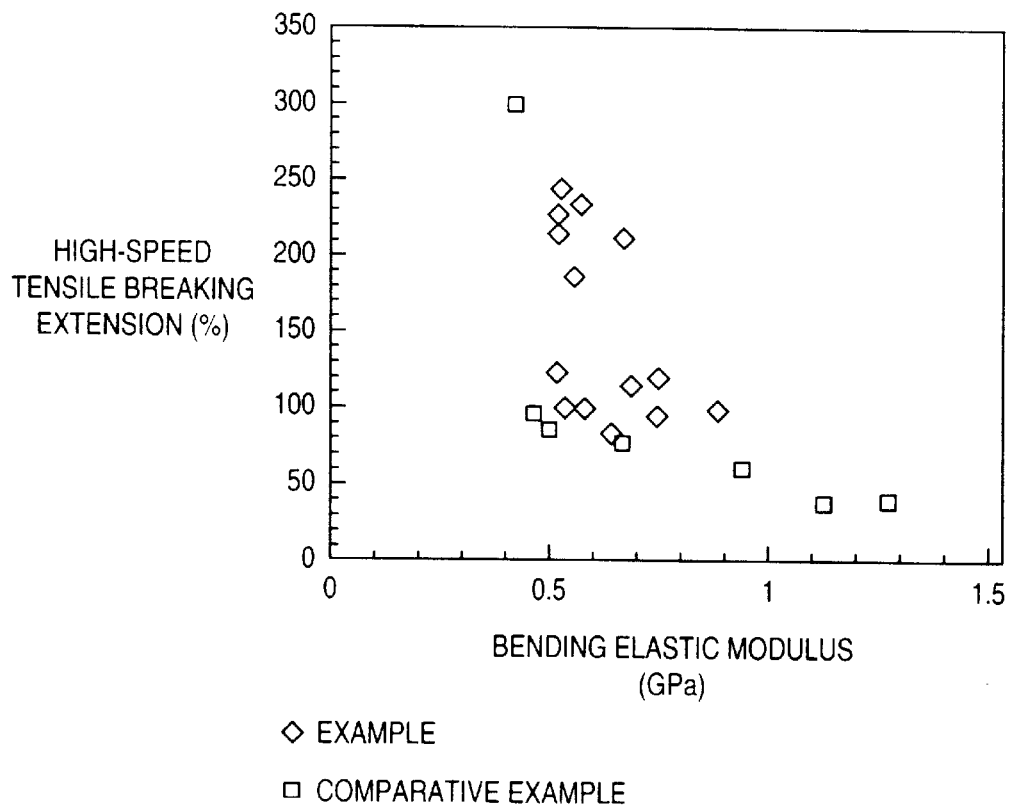
FIG. 11 is a view showing the test results in a desired region in which the bending elastic modulus and high-speed tensile breaking extension are compatible with each other (for example, a region in which the bending elastic modulus is 0.5 GPa or more and the high-speed tensile breaking extension is 80% or more)

A ratio of summation of the propylene-ethylene copolymer in the component A and the component B to summation of the components A and B, i.e., [(the propylene-ethylene copolymer part in the component A)+component B]/(component A+component B) is 25 wt. % or more and 45 wt. % or less because the high-speed tensile breaking extension cannot be ensured at less than 25 wt. % as shown in FIG. 10 and FIG. 11 (in which data of FIGS. 9A and 9B are plotted); and because the bending elastic modulus (0.5 GPa) cannot be ensured if 45 wt. % is exceeded. On the other hand, Example in which the ratio is within the range of 25 wt. % or more and 45 wt. % or less, the high-speed tensile breaking extension of 80% or more can be ensured at a bending elastic modulus of 0.5 GPa or more and can be within a desired region in which improvement is observed. In the following description, a desired region in which the bending elastic modulus and the high-speed tensile breaking extension are compatible with each other is a region in which the high-speed tensile breaking extension is 80% or more at a bending elastic modulus of 0.5 GPa or more and at a strain speed of 60 (1/s).

Figure 12:
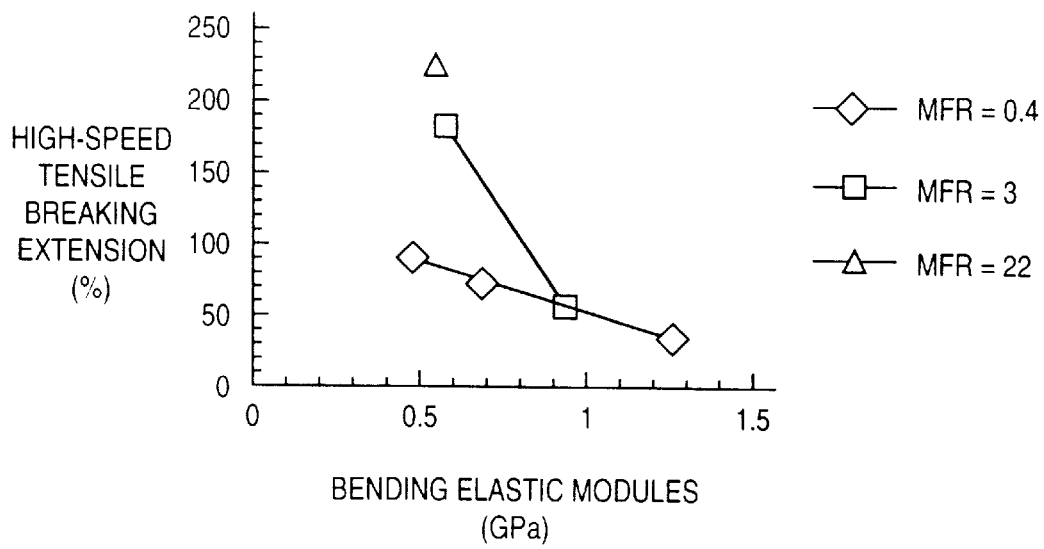
FIG. 12 is a view showing an effect of the MFR of the component A upon the bending elastic modulus and high-speed tensile breaking extension.

The MFR of the component A is greater than 0.4 (g/10 minutes) because, as shown in FIG. 12 (in which data of FIGS. 9A and 9B are plotted), when the MFR of the component A is 0.4 (g/10 minutes) or less, it is difficult to make the bending elastic modulus and the high-speed tensile breaking extension compatible with each other in a desired region in which improvement is observed. In this case, the MFR of the component A is preferably greater than 21 (g/10 minutes), and more preferably, the MFR is greater than 45 (g/10 minutes). As shown in FIG. 12 (in which data of FIGS. 9A and 9B are plotted), the high-speed tensile breaking extension can be enhanced while the bending elastic modulus and the high-speed tensile breaking extension are compatible with each other in a desired region.

Here, the MFR indicates a molecule weight tendency via easiness of flow, and indicates tendency of lower molecule weight as the MFR becomes greater.

Figure 13:
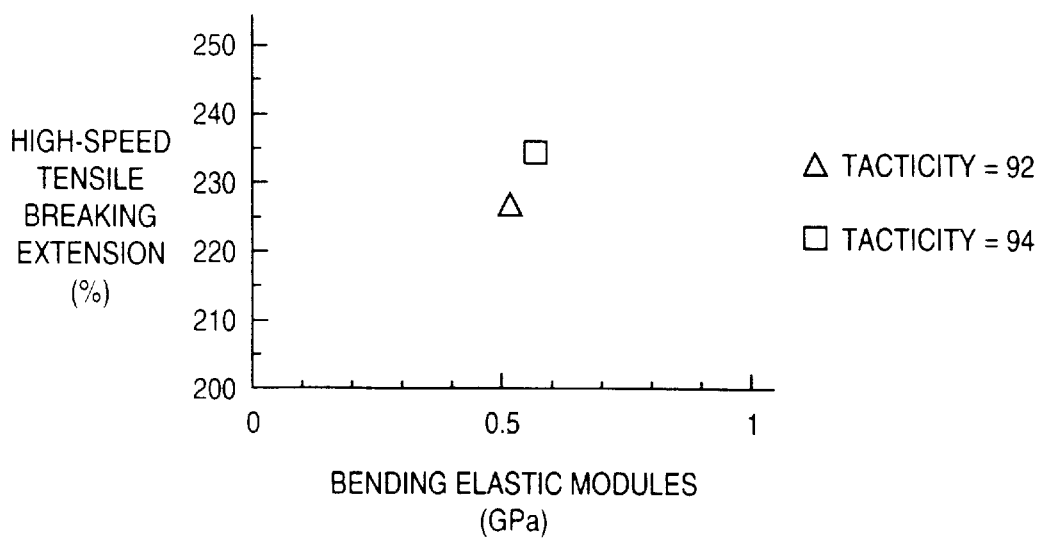
FIG. 13 is a view showing an effect of the tacticity of the component A upon the bending elastic modulus and high-speed tensile breaking extension.

The tacticity of the component A is preferably 93 or more. As shown in FIG. 13 (refer to blend Nos. 7 and 17 in FIGS. 9A and 9B), this is because the high-speed tensile breaking extension can be enhanced while the bending elastic modulus and the high-speed tensile breaking extension are compatible with each other in a desired region.

Here, the tacticity indicates three-dimensional regularity, and is measured with a normal method using NMR (Nuclear Magnetic Resonance).

The component B, at least part of which is cross linked, is preferable.

Figure 14:
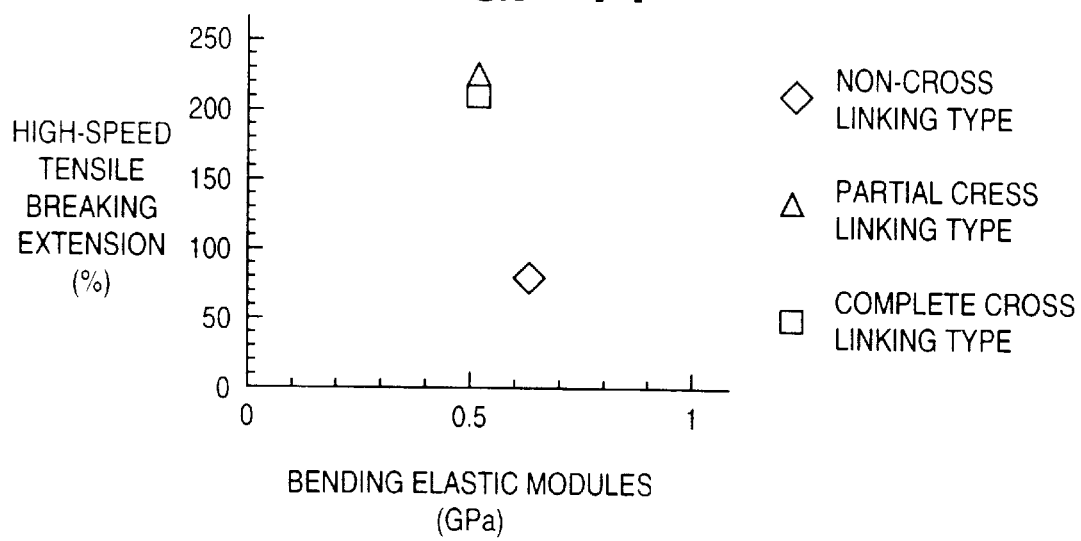
FIG. 14 is a view showing an effect of the cross linking state of the component B upon the bending elastic modulus and high-speed tensile breaking extension.

As shown in FIG. 14 (refer to blend Nos. 6, 7, and 16 in FIGS. 9A and 9B), with respect to the component B, when at least part thereof is cross linked, the high-speed tensile breaking extension can be enhanced while the bending elastic modulus and the high-speed tensile breaking extension are compatible with each other in a desired region.

Preferably, the above component B is an olefin based thermoplastic elastomer, the rubber component of the olefin based thermoplastic elastomer is an ethylene-propylene based terpolymer, and the rubber component blend quantity in the olefin based thermoplastic elastomer is 40 to 60 wt. %.

In particular, in this case, more preferably, the component B, part of which is cross linked, is more preferable from the viewpoint of enhancing the high-speed tensile breaking extension (refer to blend No. 7 in FIGS. 9A and 9B).

The rubber hardness of the partially cross linked component B is preferably 75 or less in JIS A, and is more preferably 55 or less in JIS A.

Figure 15:
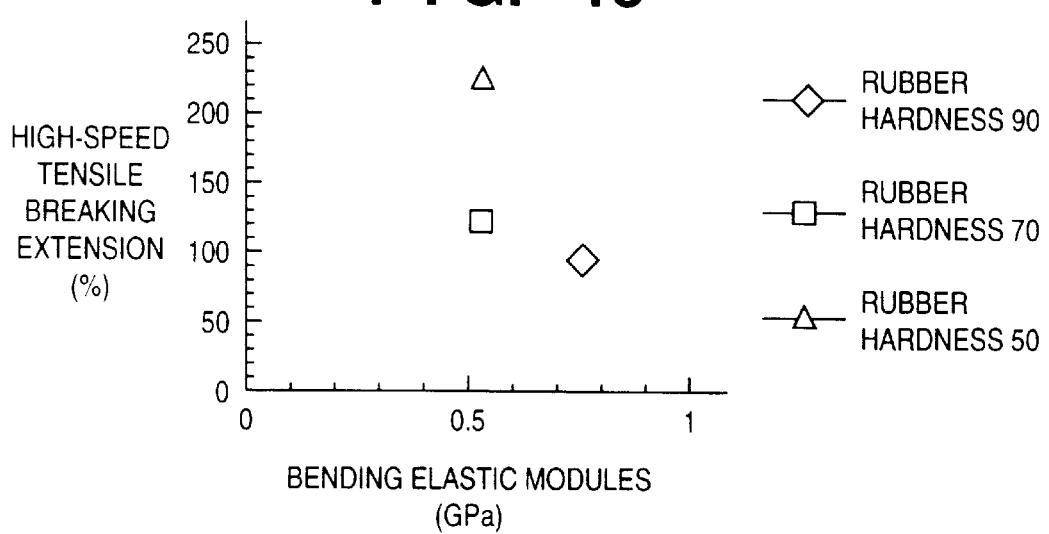
FIG. 15 is a view showing an effect of the rubber hardness of the component B upon the bending elastic modulus and high-speed tensile breaking extension.

As shown in FIG. 15 (refer to blend Nos. 8, 9, and 7 in FIGS. 9A and 9B), when the rubber hardness of the component B is 75 or less, the high-speed tensile breaking extension can be enhanced in a desired region as the rubber hardness is decreased.

Preferably, the above component B is a styrene-ethylene-propylene-styrene copolymer (SEPS).

Figure 16:
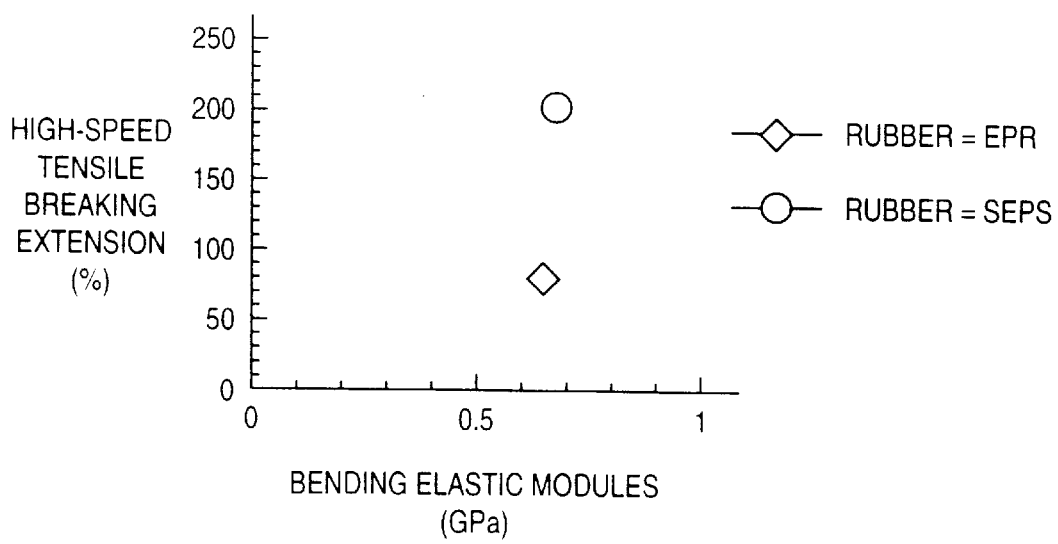
FIG. 16 is a view showing an effect of the SEPS of the component B upon the bending elastic modulus and high-speed tensile breaking extension.

As shown in FIG. 16 (plotted from data of blend Nos. 6 and 21 in FIGS. 9A and 9B), SEPS can enhance the high tensile breaking extension more significantly than any other component in a desired region in which the bending elastic modulus and the fast tension breakage are compatible with each other.

As the component C, it is preferable that polypropylene with an MFR that is 10 or more greater than that of the component A is blended, and the component C is blended at a blend ratio of 5 to 20 wt. % to the whole summation of the components A, B, and C.

Figure 17:
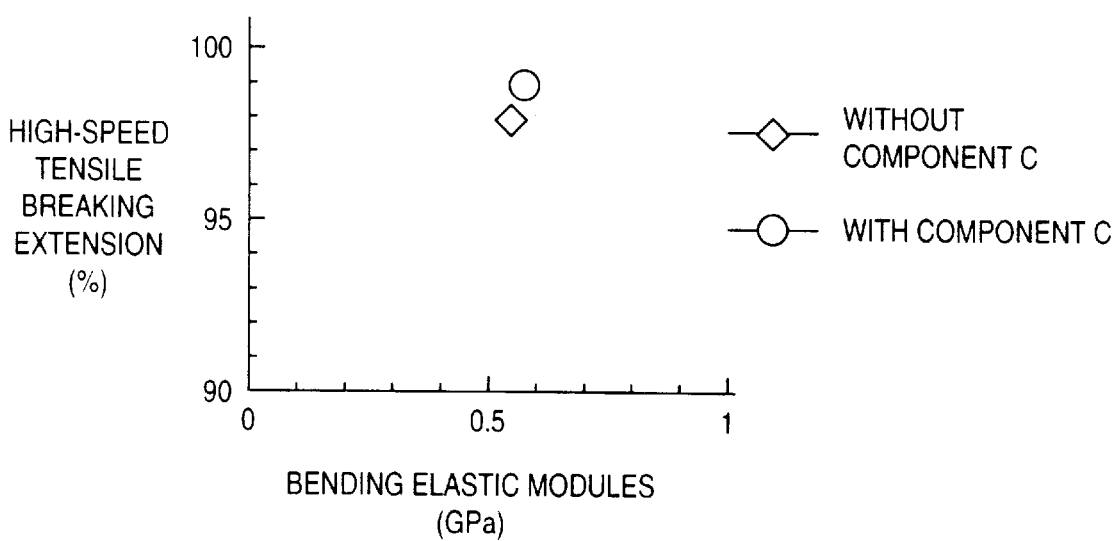
FIG. 17 is a view showing an effect of the component C upon the bending elastic modules and high-speed tensile breaking extension.

As shown in FIG. 17 (plotted from data of blend Nos. 19 and 20 in FIGS. 9A and 9B), the component C can enhance the high-speed tensile breaking extension in a desired region in which the bending elastic modulus and the high-speed tensile breaking extension are compatible with each other. In this case, an effect is not achieved when the blend quantity is less than 5 wt. %; and if 20 wt. % is exceeded, it is similar to merely increasing the MFR of the component A, which is not effective.

Talc having 3.5 m$^2$/g or more in specific surface area is preferably blended so as to be 30 wt. % or less of all including the talc, and more preferably blended so as to be 10 wt. % to 20 wt. %.

Figure 18:
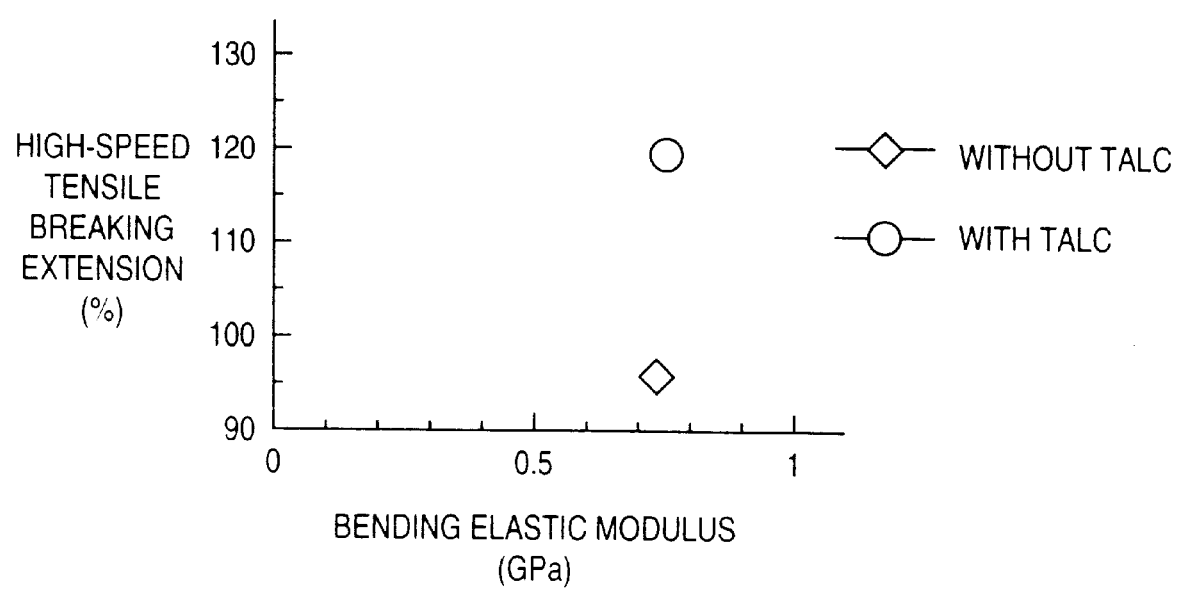
FIG. 18 is a view showing an effect of talc upon the bending elastic modulus and high-speed tensile breaking extension.

As shown in FIG. 18 (plotted from data of blend Nos. 8 and 10 in FIGS. 9A and 9B), talc can enhance the high-speed tensile breaking extension in a desired region in which the bending elastic modulus and the high-speed tensile breaking extension are compatible in the above range. That is, when the specific surface area is less than 3.5 m$^2$/g, if the blend exceeds 30 wt. % of all including the talc, the high-speed tensile breaking extension is significantly lowered for a reason such as difficulty in mixing. In addition, the bending elastic modulus is less improved at less than 10 wt. %; and if 20 wt. % is exceeded, the extension is lowered, and the specific gravity is increased.

Further, the above energy absorbing body 3 is formed by ejection molding. This attempt is made to enhance the bending elastic modulus of the pillar trim 2 by utilizing the phenomenon that a low molecule weight gathers the outside of flow (die face side) based on the material resin flow during ejection molding to make a hard component consisting of the low molecule weight omnipresent in an outside layer (the inside of the chamber) of the pillar trim 2 as a plate shaped body. In this manner, through complementation with the aforementioned blend component, as shown in the improved material line in FIG. 7, a rise gradient of the generated initial load is made steeper compared with the conventional material line in FIG. 7, making it possible to displace while the generated initial load is maintained high (increase in shock energy absorption quantity).

Furthermore, the above energy absorbing body 3 can be formed by employing a polyolefin resin composition as described below in another mode. This resin composition is achieved by testing a variety of blend materials, conditions or the like to improve the high-speed tensile breaking extension (extension rate) in a desired region in which the high-speed tensile breaking extension and the bending elastic modulus are compatible with each other (as described above, a region in which the high-speed tensile breaking extension is 80% or more at a bending elastic modulus of 0.5 GPa or more and at a strain speed of 60 (l/s). Hereinafter, referred to as such area); and its specific content is led out from FIGS. 19A and 19B and FIGS. 20A and 20B showing the test results.

In FIGS. 19A and 19B and FIGS. 20A and 20B, in addition to definition of acronyms used in FIGS. 9A and 9B, SEBS designates a styrene-ethylene-butylene-styrene copolymer, SEPS designates a styrene-ethylene-propylene-styrene copolymer, SEEPS designates a styrene-ethylene-ethylene-propylene-styrene copolymer, and PS designates polystyrene. In FIGS. 19A and 19B, a talc master batch is a resin pellet in which talc and a polypropylene resin are mixed with each other at a ratio of 70:30; and a ratio of talc and polypropylene resin in total is calculated considering the ratio of 70:30.

This resin composition consists of a component A consisting of polypropylene or a propylene-ethylene block copolymer whose MFR is greater than 16 (g/10 minutes); a component B consisting of an ethylene based rubber; and a component D compatible with the component B, wherein a ratio of summation of the propylene-ethylene copolymer part in the component A, the component B, and the component D to summation of the components A, B, and D is 25 wt. % or more and 45 wt. % or less, and a ratio of the blend quantity of the component D to summation of the blend quantities of the components B and D is less than 0.8.

This is because the high-speed tensile breaking extension is improved as significantly as possible while an attempt is made to place the high-speed tensile breaking extension and the bending elastic modulus in a desired region. Hereinafter, a specific description will be given.

The above component A is preferably 16 to 120 (g/10 minutes) in MFR, and more preferably 45 (g/10 minutes) or more in MFR.

Figure 21:
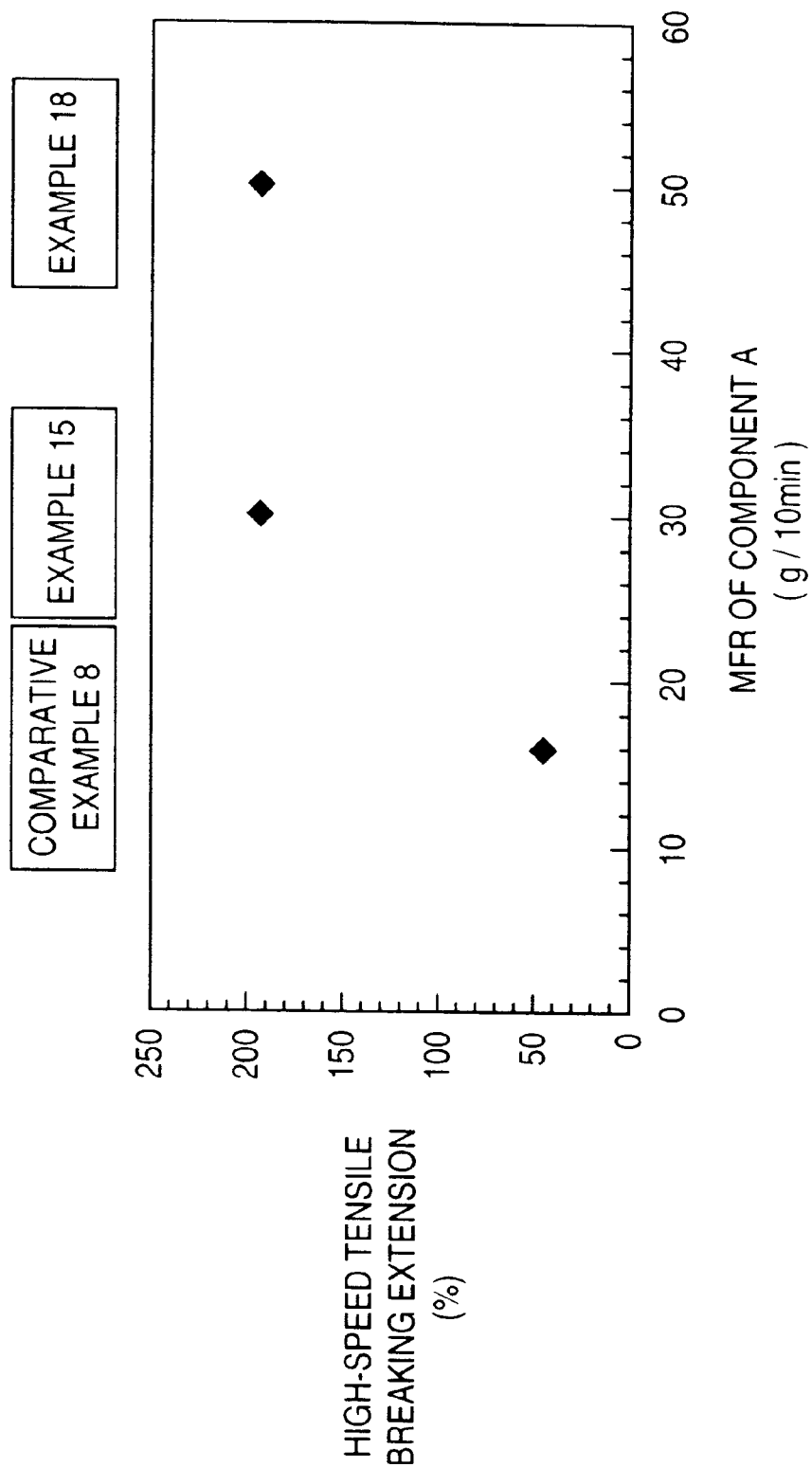
FIG. 21 is a view showing an effect of the MFR of the component A according to another resin composition (FIGS. 19A and 19B and FIGS. 20A and 20B) upon the high-speed tensile breaking extension.
Figure 22:
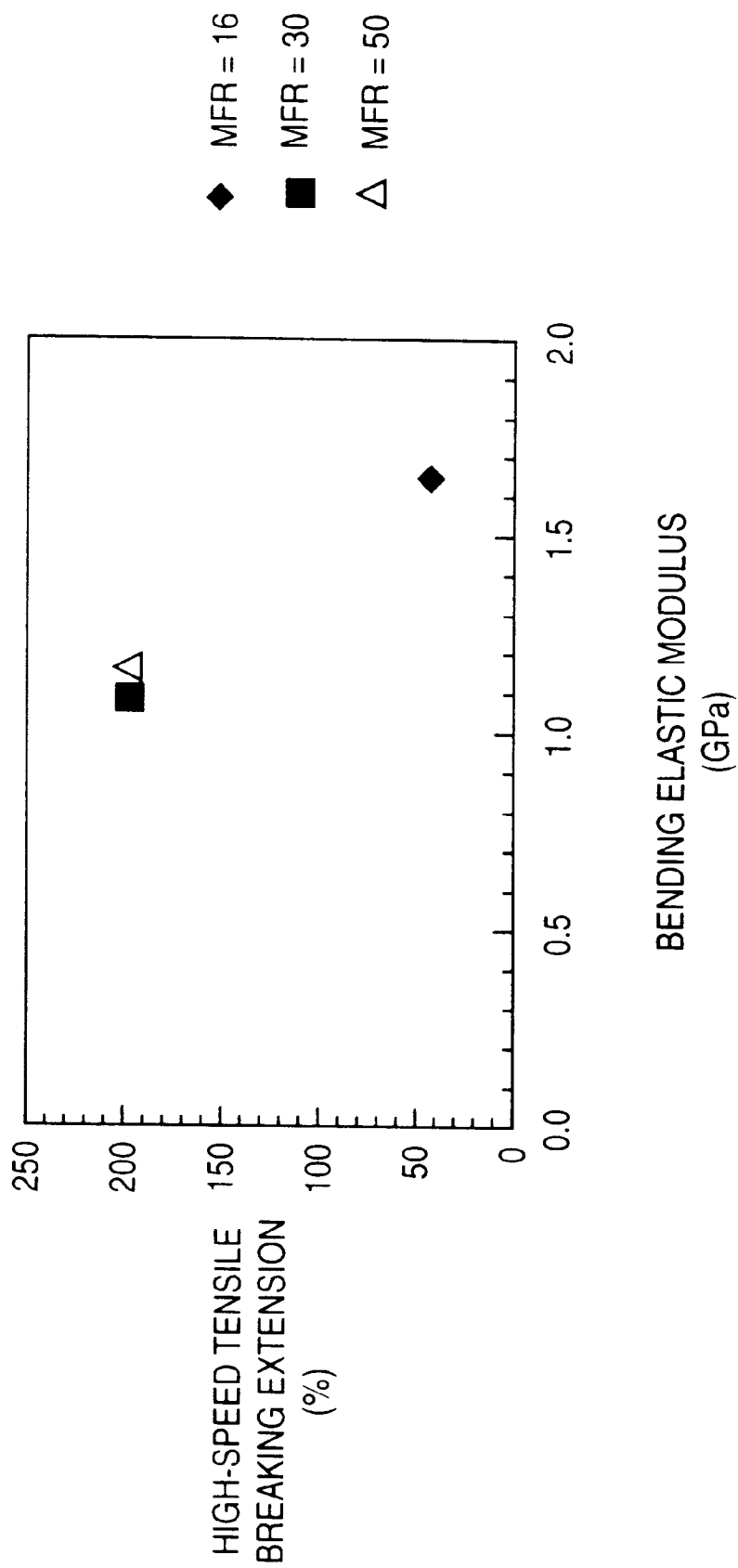
FIG. 22 is a view showing an effect of the MFR of the component A according to another resin composition upon the bending elastic modulus and high-speed tensile breaking extension.

This is because, as shown FIG. 21 and FIG. 22, when the MFR of the component A is greater than 16 (g/10 minutes), the bending elastic modulus is somewhat lowered in a desired region; and however, as that value increases with the MFR 16 (g/10 minutes) of the component A being at its boundary, the fast tension breakage extension shifts to a tendency toward increasing and when the MFR is 45 (g/10 minutes) or more, the high-speed tensile breaking extension becomes stable at a high value. On the other hand, the higher MFR of the component A is more preferable, and the upper limit of the component A is generally obtainable, and is about 120 based on restrictions, as described above.

In this case, the MFR is measured in conformance with JIS K7210, and the measuring conditions are 230° C. and 2.16 kg.

Figure 23:
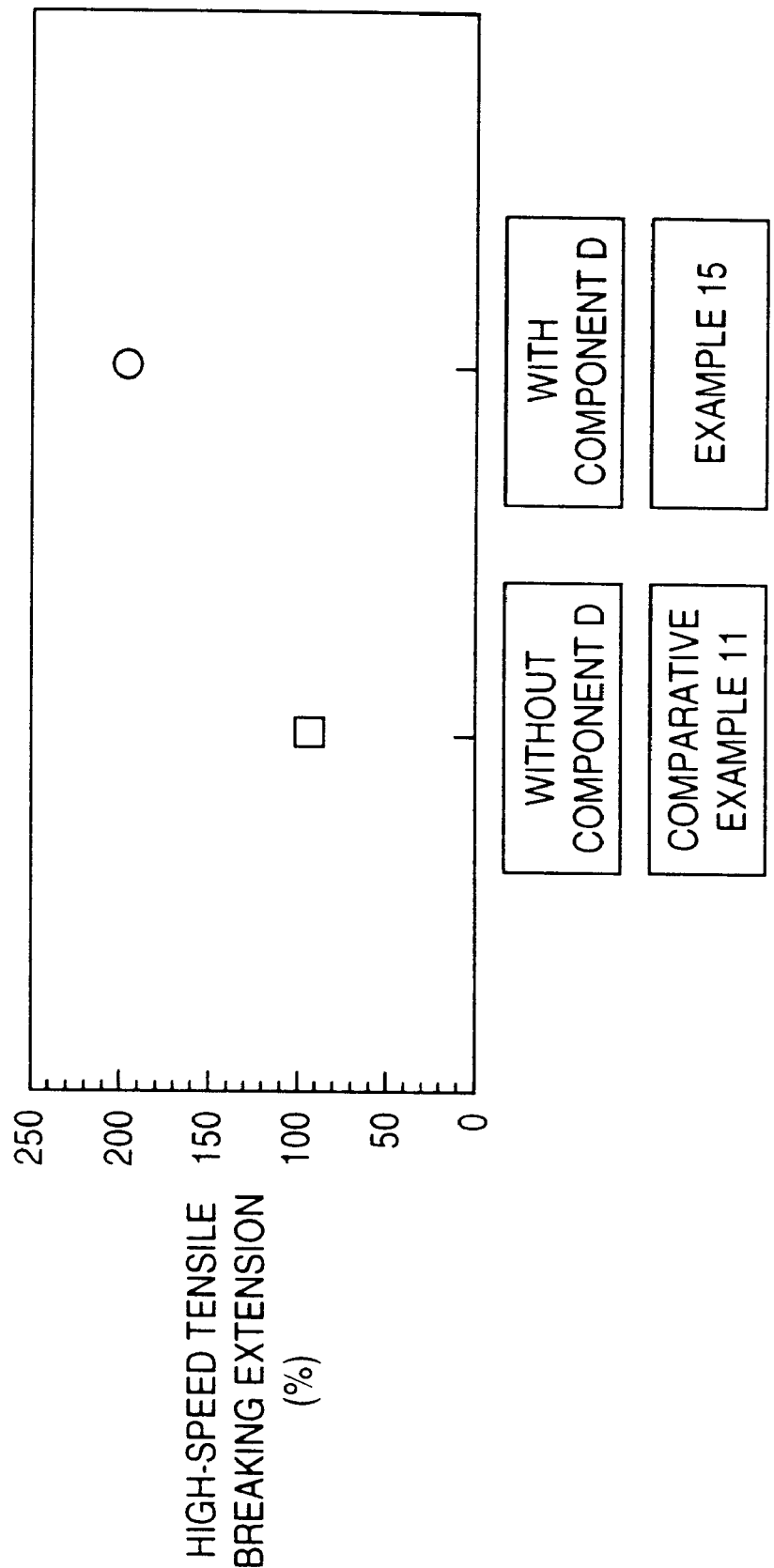
FIG. 23 is a view showing an effect of the component D according to another resin composition upon the high-speed tensile breaking extension.
Figure 24:
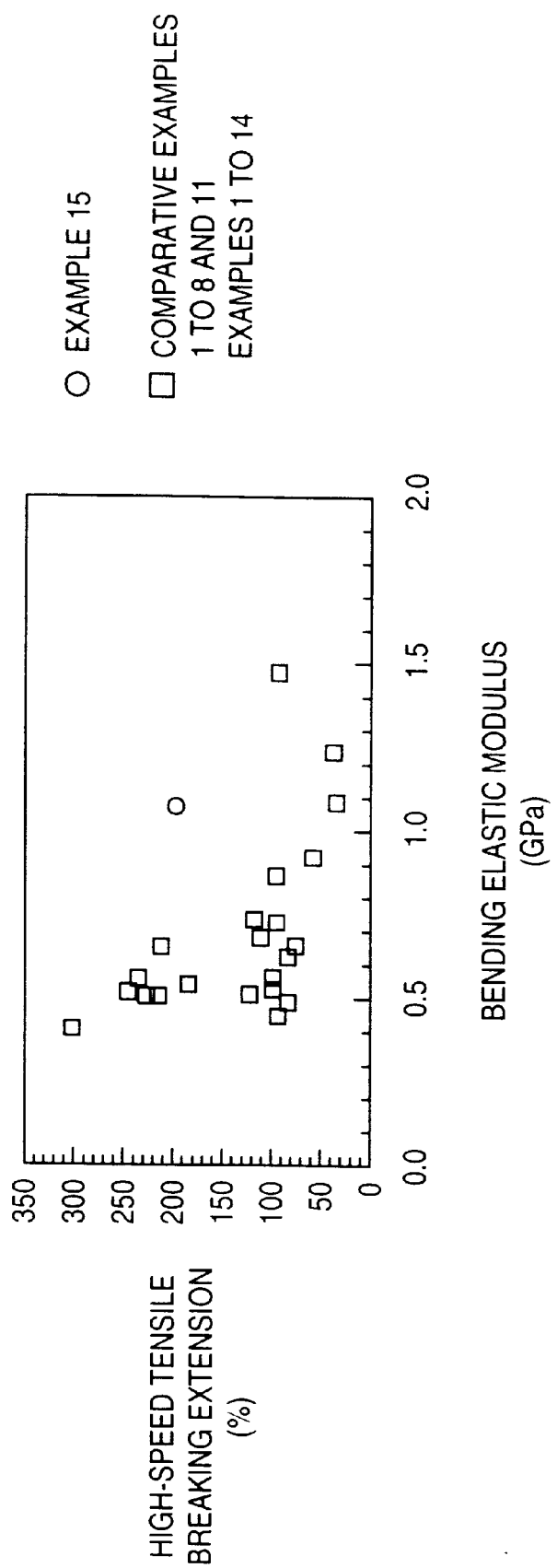
FIG. 24 is a view showing an effect of the component D according to another resin composition upon the bending elastic modulus and high-speed tensile breaking extension.

In addition to the components A and B, the component D compatible with the component B is contained because, as shown in FIG. 23 and FIG. 24 (plotted using data of FIGS. 9A and 9B as well as data of FIGS. 19A and 19B and FIGS. 20A and 20B), containing the component D can enhance the high-speed tensile breaking extension more effectively compared to the case where the component D is not contained at a desired bending elastic modulus (for example, 0.5 PGa or more).

Figure 25:
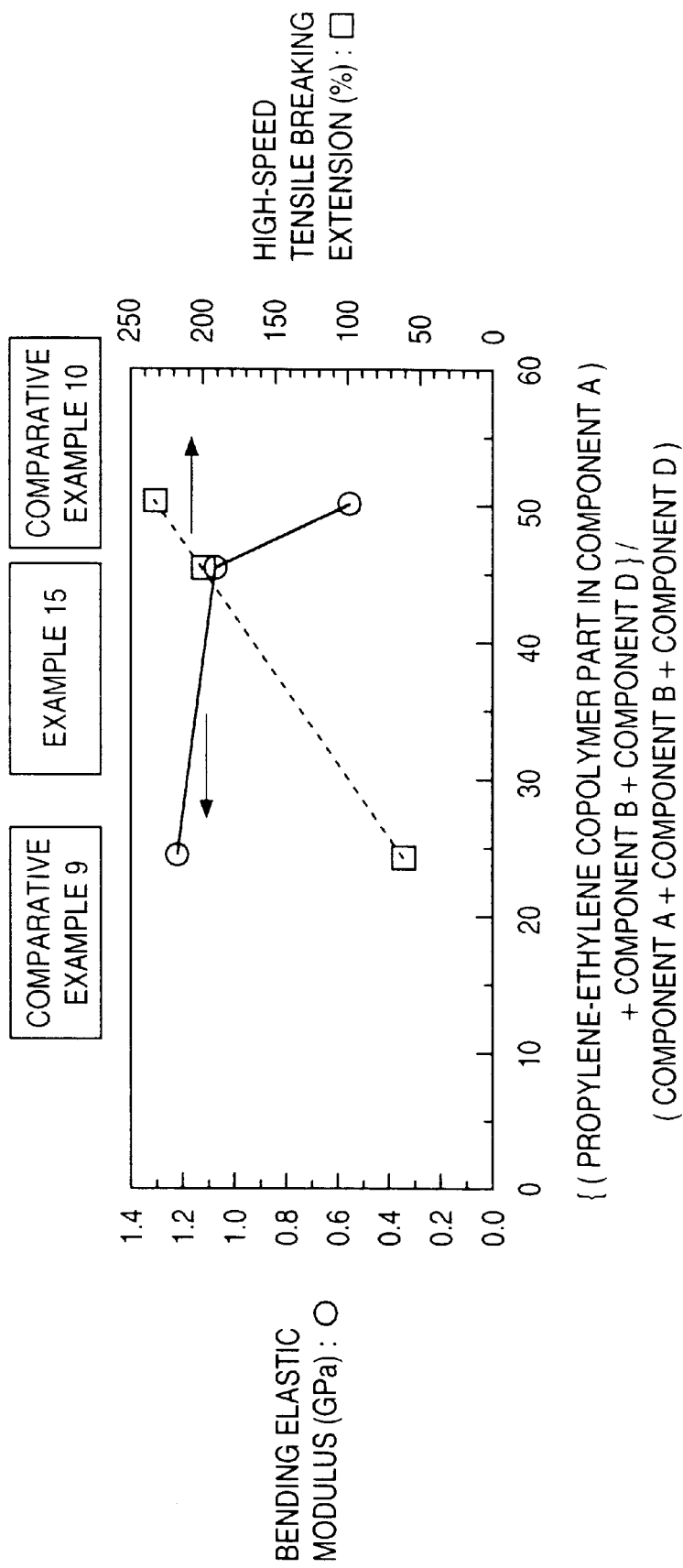
FIG. 25 is a view showing an effect of ((the propylene-ethylene copolymer part in component A)+(component B+component D)/(component A+component B+component D) according to another resin composition upon the bending elastic modulus.
Figure 26:
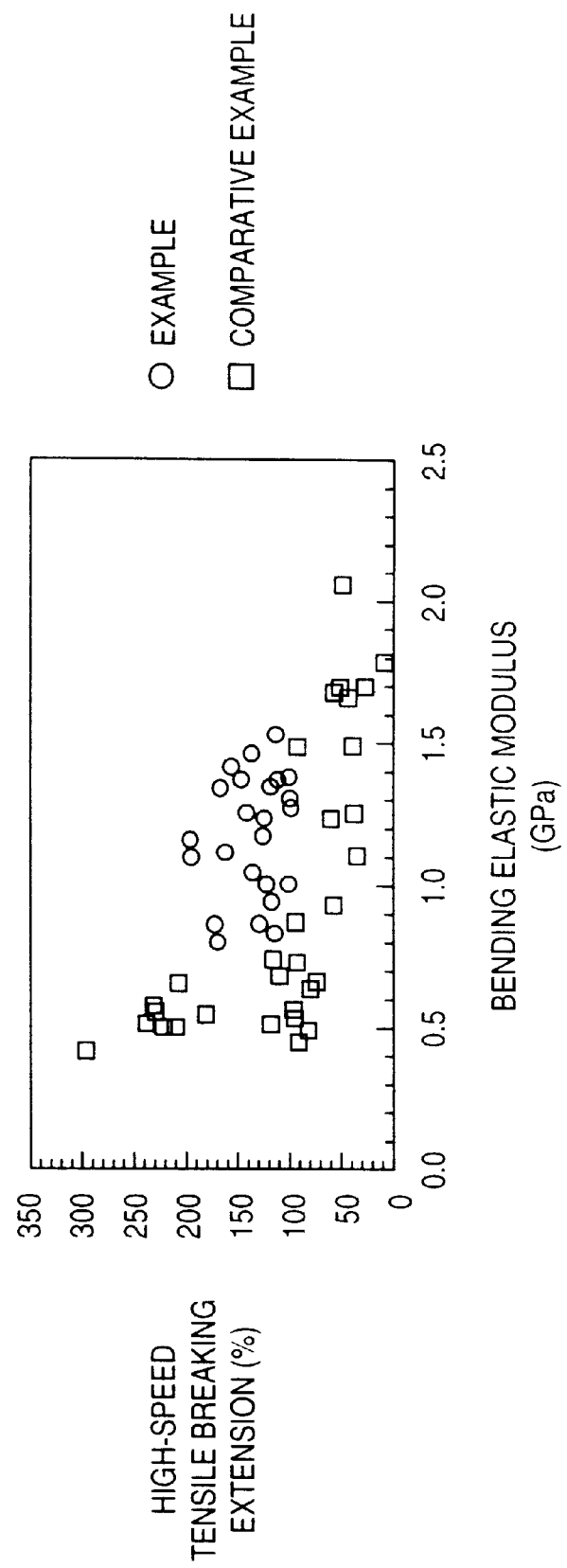
FIG. 26 is a view showing an effect of ((the propylene-ethylene copolymer part in component A)+(component B+component D)/(component A+component B+component D) according to another resin composition upon the bending elastic modulus and high-speed tensile breaking extension.

A ratio of summation of the propylene-ethylene copolymer part in the component A, the component B, and the component D to summation of the components A, B, and D, i.e., a ratio of [(the propylene-ethylene copolymer part in the component A+component B+component D)/(component A+component B+component D) is 25 wt. % or more and 45 wt. % or less because, as shown in FIG. 25, increasing the ratio increases the high-speed tensile breaking extension, and lowers the bending elastic modulus. As a result, when the ratio is 25 wt. % or more and 45 wt. % or less, as shown in FIG. 26, the high-speed tensile breaking extension and the bending elastic modulus can be compatible with a desired region.

Figure 27:
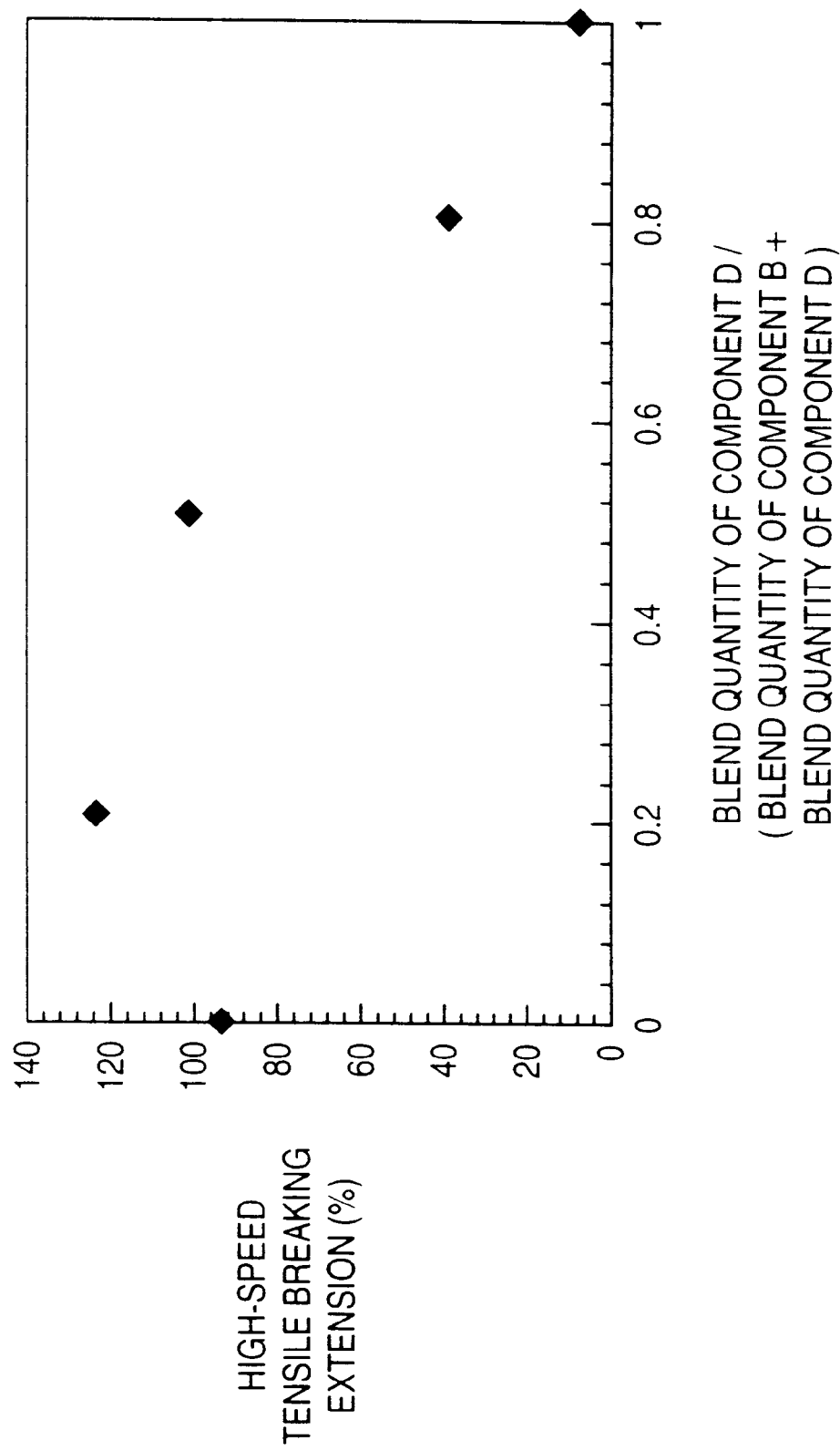
FIG. 27 is a view showing an effect of the blend quantity of the component D according to another resin composition/ (the blend quantity of component B+the blend quantity of component D) upon the high-speed tensile breaking extension.

The ratio of the blend quantity of the component D to summation of the blend quantities of the components B and D, i.e., the blend quantity of the component D/(blend quantity of component B+blend quantity of component D) is less than 0.8 because, as shown in FIG. 27, the high-speed tensile breaking extension is likely to increase as the ratio is close to less than 0.8. In this case, as is obvious from FIG. 27, it is desirable that the ratio is 0.1 or more and 0.5 or less. This is because the high-speed tensile breaking extension exists in a region of higher values, and the highest high-speed tensile breaking extension can be obtained in the range of these values as well.

The tacticity of the above component A is preferably 93 or more.

Figure 28:
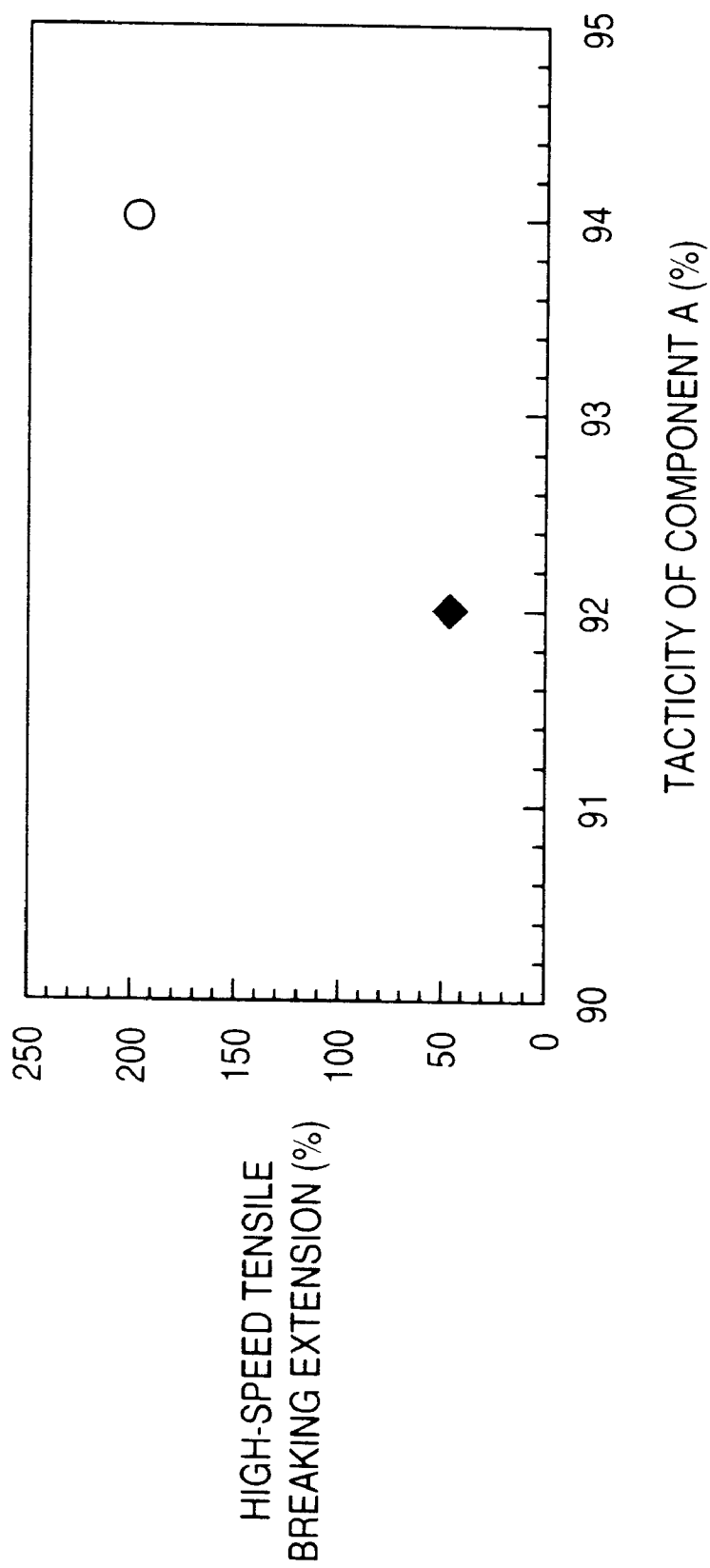
FIG. 28 is a view showing an effect of the tacticity of the component A according to another resin composition upon the high-speed tensile breaking extension.
Figure 29:
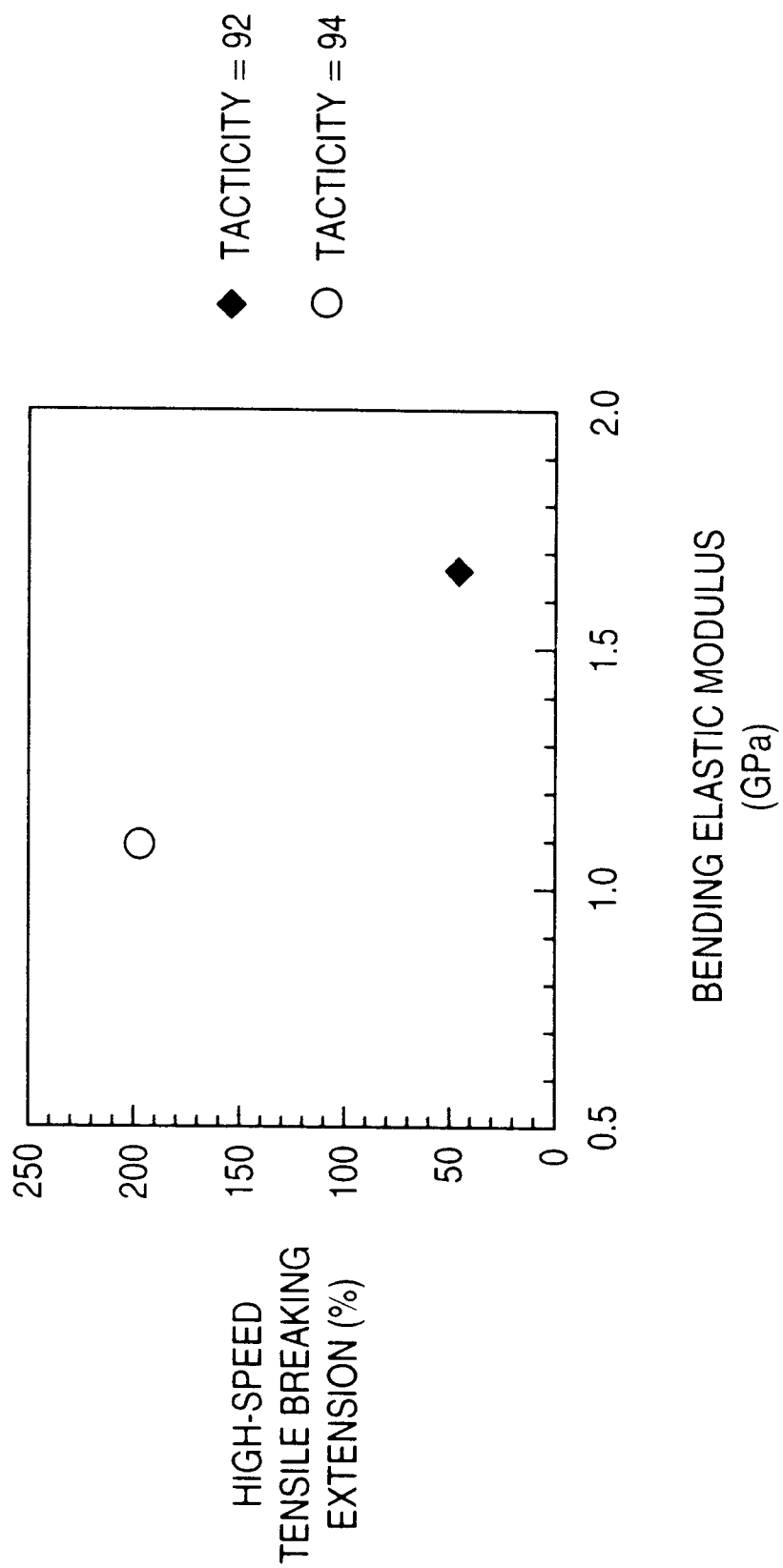
FIG. 29 is a view showing an effect of the tacticity of the component A according to another resin composition upon the bending elastic modulus and high-speed tensile breaking extension.

This is because, as shown in FIG. 28 and FIG. 29 (plotted from Example 15 and Comparative Example 17 in FIGS. 19A and 19B and FIGS. 20A and 20B), the high-speed tensile breaking extension can be improved together with an increase in tacticity of the component A. In this case, the value for the tacticity of the component A is obtained by a normal method using NMR (Nuclear Magnetic Resonance)

As the component B, a copolymer containing both of a styrene skeleton and an ethylene skeleton, i.e., a hydrogen-added styrene based resin elastomer is preferred.

Specifically, the component B may consist of a styrene-ethylene-propylene terpolymer containing the propylene skeleton (for example, a styrene-ethylene-propylene-styrene copolymer (SEPS) or a styrene-ethylene-ethylene-propylene-styrene copolymer (SEEPS)) or may consist of a styrene-ethylene-butylene terpolymer (SEBS) containing a butylene skeleton. Further, in addition to the above content, the component B may contain an α-olefin copolymer including ethylene (for example, including SEPS or α-olefin copolymer (non-cross linking type or the like)). In this case, at least part of the α-olefin copolymer including ethylene may be cross linked (for example, including SEPS and a partially cross linked α-olefin copolymer or the like).

Figure 30:
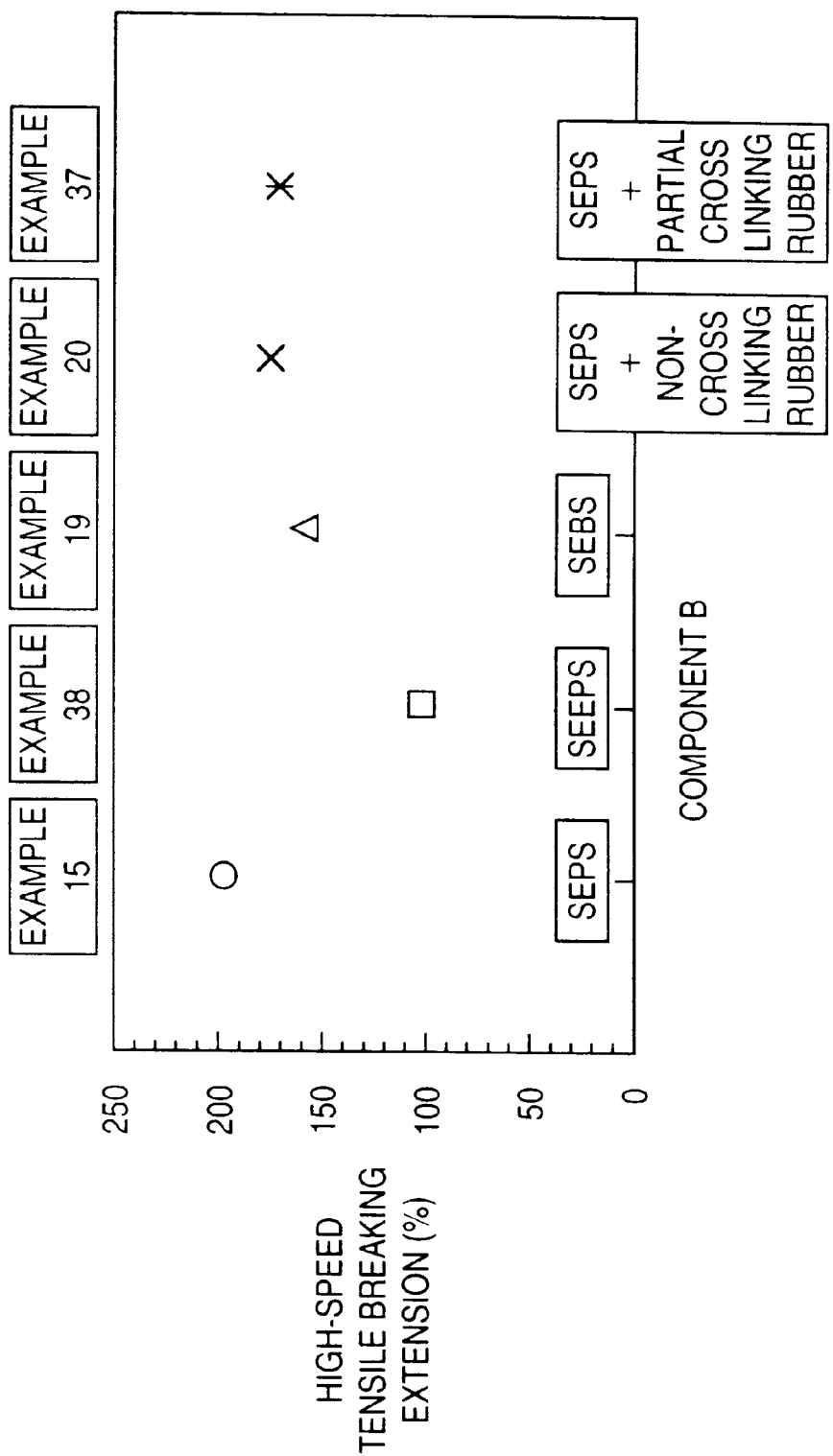
FIG. 30 is a view showing an effect of type of the component B according to another resin composition upon the high-speed tensile breaking extension.
Figure 31:
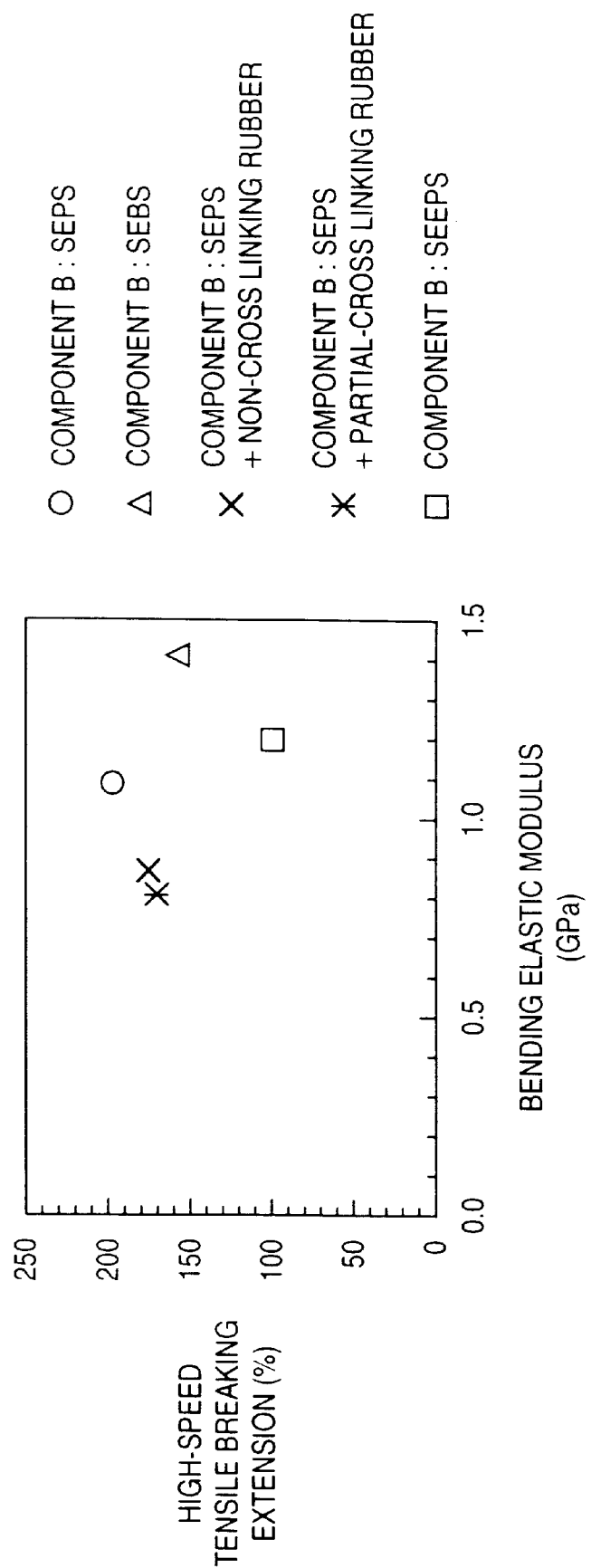
FIG. 31 is a view showing an effect of type of the component B according to another resin composition upon the bending elastic modulus and high-speed tensile breaking extension.

This is because, as shown in FIG. 30 and FIG. 31, the high-speed tensile breaking extension and the bending elastic modulus exhibit well balanced preferable values in a desired region.

The rubber hardness of the α-olefin copolymer contained in the component B is preferably 73 or less in JIS A, and further preferably 55 or less in JIS A.

Figure 32:
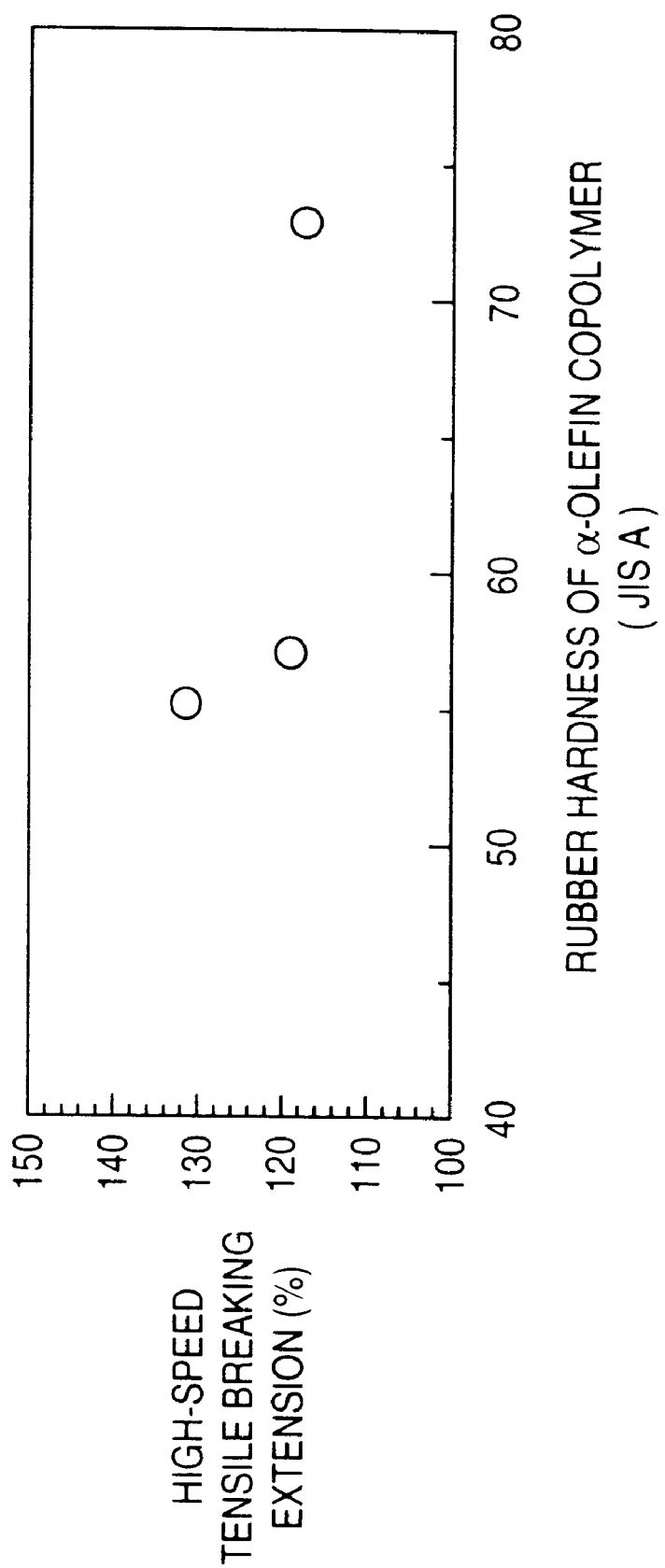
FIG. 32 is a view showing an effect of the rubber hardness of an α-olefin copolymer according to another resin composition upon the high-speed tensile breaking extension.

This is because, as shown in FIG. 32 (plotted from Examples 21 to 23 in FIGS. 19A and 19B and FIGS. 20A and 20B), the rubber hardness of 73 or less in JIS A can maintain the high-speed tensile breaking extension in a high state, and at the rubber hardness of 55 or less in JIS A, the value rises, and the high-speed tensile breaking extension can be higher. On the other hand, the smaller α-olefin copolymer in JIS A is more preferable, and however, the lower limit of the rubber hardness is about 40 in JIS A because of a restriction regarding obtainable values.

The MFR of the α-olefin copolymer contained in the component B is preferably 8.6 (g/10 minutes) or less, and more preferably 0.5 (g/10 minutes) or less.

Figure 33:
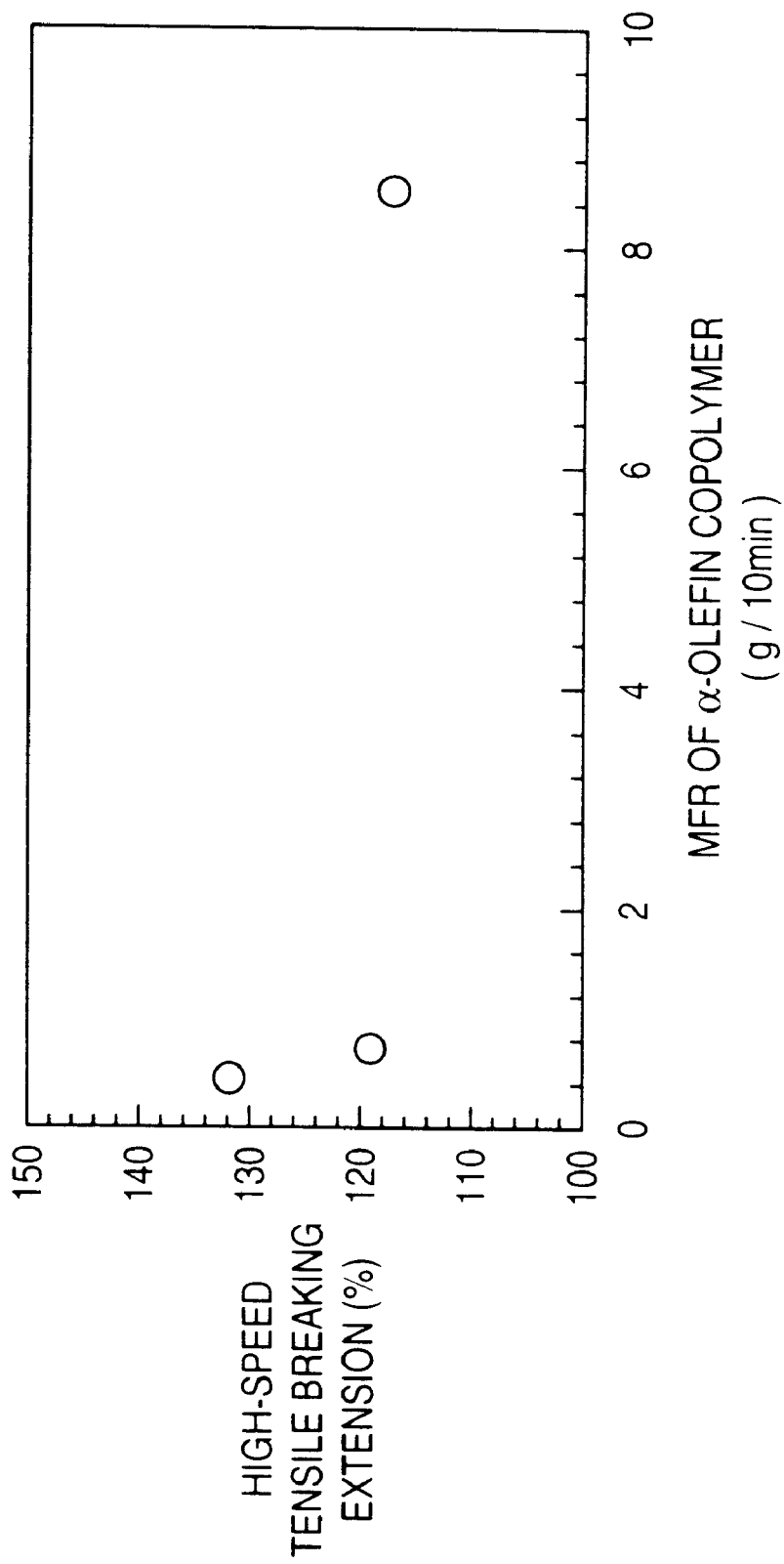
FIG. 33 is a view showing an effect of the MFR of the α-olefin copolymer according to another resin composition upon the high-speed tensile breaking extension.

This is because, as shown in FIG. 33 (plotted from Examples 21 to 23 in FIGS. 19A and 19B and FIGS. 20A and 20B), when the MFR is 8.6 (g/10 minutes) or less, the high-speed tensile breaking extension can be maintained constantly at a value in a desired region; and when the MFR is 0.5 (g/10 minutes or less), the fast tension breakage extension rises, and can be higher.

On the other hand, the lower limit of the MFR of α-olefin copolymer is assumed to be about 0.05 because of its limitation to the measuring method.

The MFR is measured in conformance with JIS K7210, and the measuring conditions are 230° C. and 2.16 kg.

The MFR of the copolymer of the component B is preferable within the range of 0.5 to 140 (g/10 minutes), and more preferable within the range of 4.5 to 50 (g/10 minutes), and further more preferable 12 to 20 (g/10 minutes).

Figure 34:
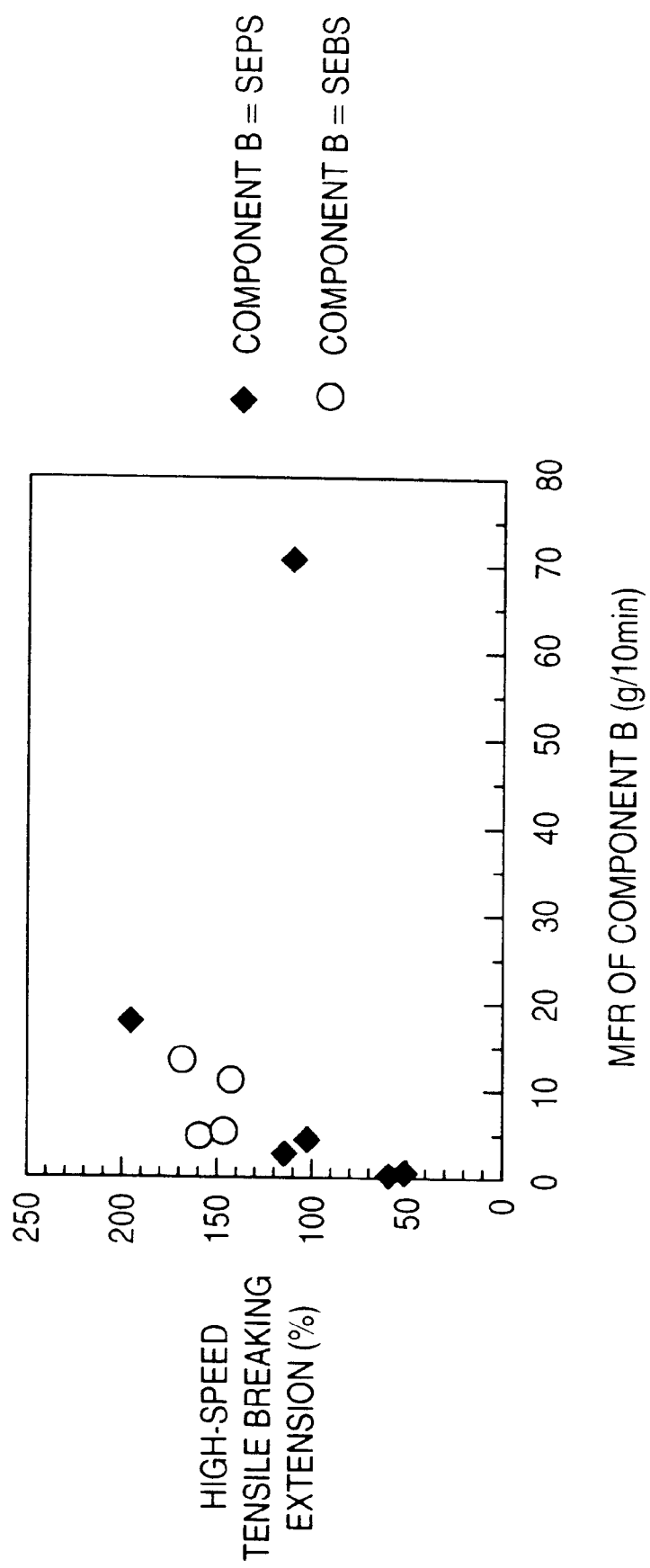
FIG. 34 is a view showing an effect of the MFR of the component B according to another resin composition upon the high-speed tensile breaking extension.

This is because, as shown in FIG. 34 (plotted from Examples 15, 19, and 24 to 29, Comparative Examples 15 and 16 in FIGS. 19A and 19B and FIGS. 20A and 20B), a large value can be obtained with respect to the high tensile breaking extension in the above range. In this case, the MFR is specified in conformance with JIS K7210, and the measuring conditions are 230° C. and 2.16 kg.

The styrene skeleton content in the copolymer of the above component B is preferably 13 wt. % or more and less than 35 wt. %, is more preferably 18 wt. % or more and less than 30 wt. %, and is furthermore preferably 22 wt. % or more and less than 25 wt. %.

Figure 35:
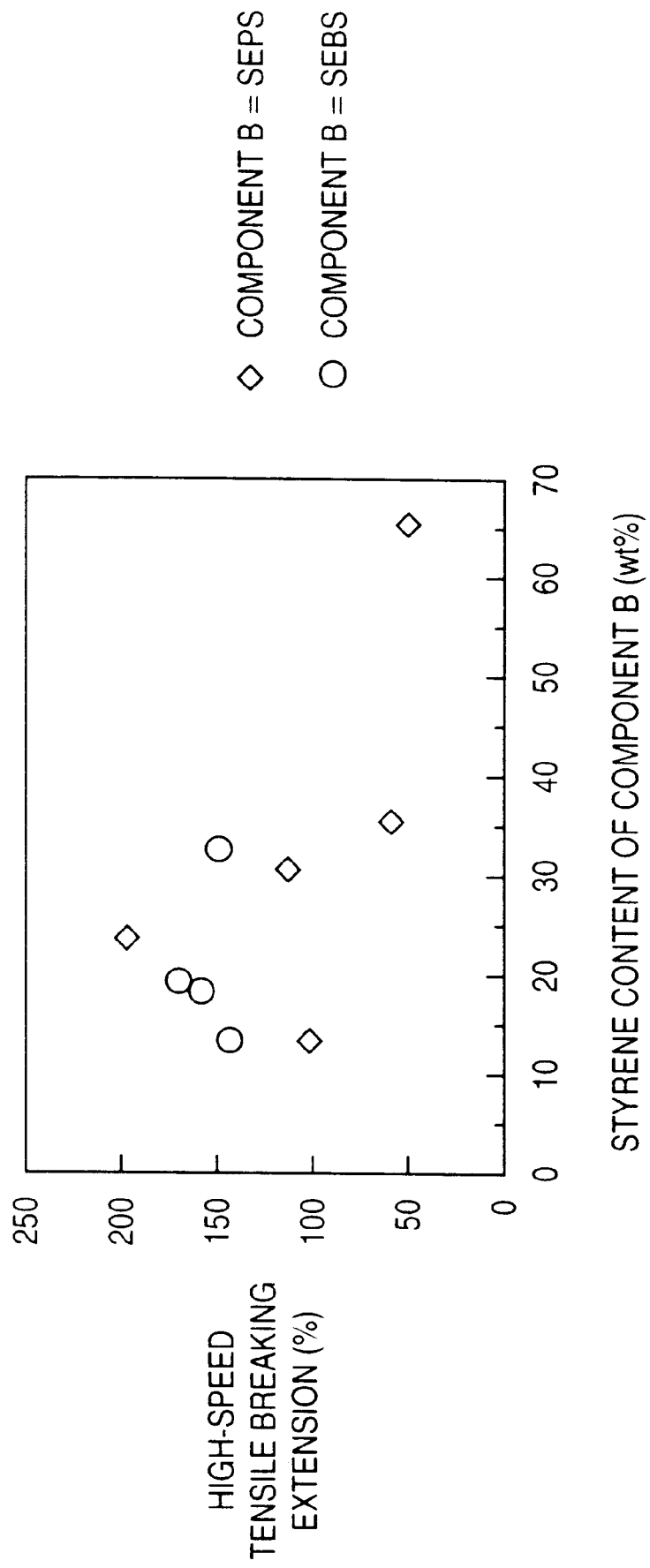
FIG. 35 is a view showing an effect of the styrene content of the component B according to another resin composition upon the high-speed tensile breaking extension.

This is because, as shown in FIG. 35 (plotted from Examples 15, 19, and 24 to 29 and Comparative Examples 15 and 16 in FIGS. 19A and 19B and FIGS. 20A and 20B), a large value can be obtained with respect to the high-speed tensile breaking extension in the above range, and a peak value can be obtained in a particularly preferable range.

As the above component D, an aromatic vinyl polymer can be employed, and specifically, it is preferred to employ polystyrene (PS), an acrylonitrile-butylene-styrene copolymer (ABS) that is an aromatic vinyl copolymer, a modified polyphenylene ether (PPE), a styrene-butylene-styrene copolymer (SBS) or the like.

Figure 36:
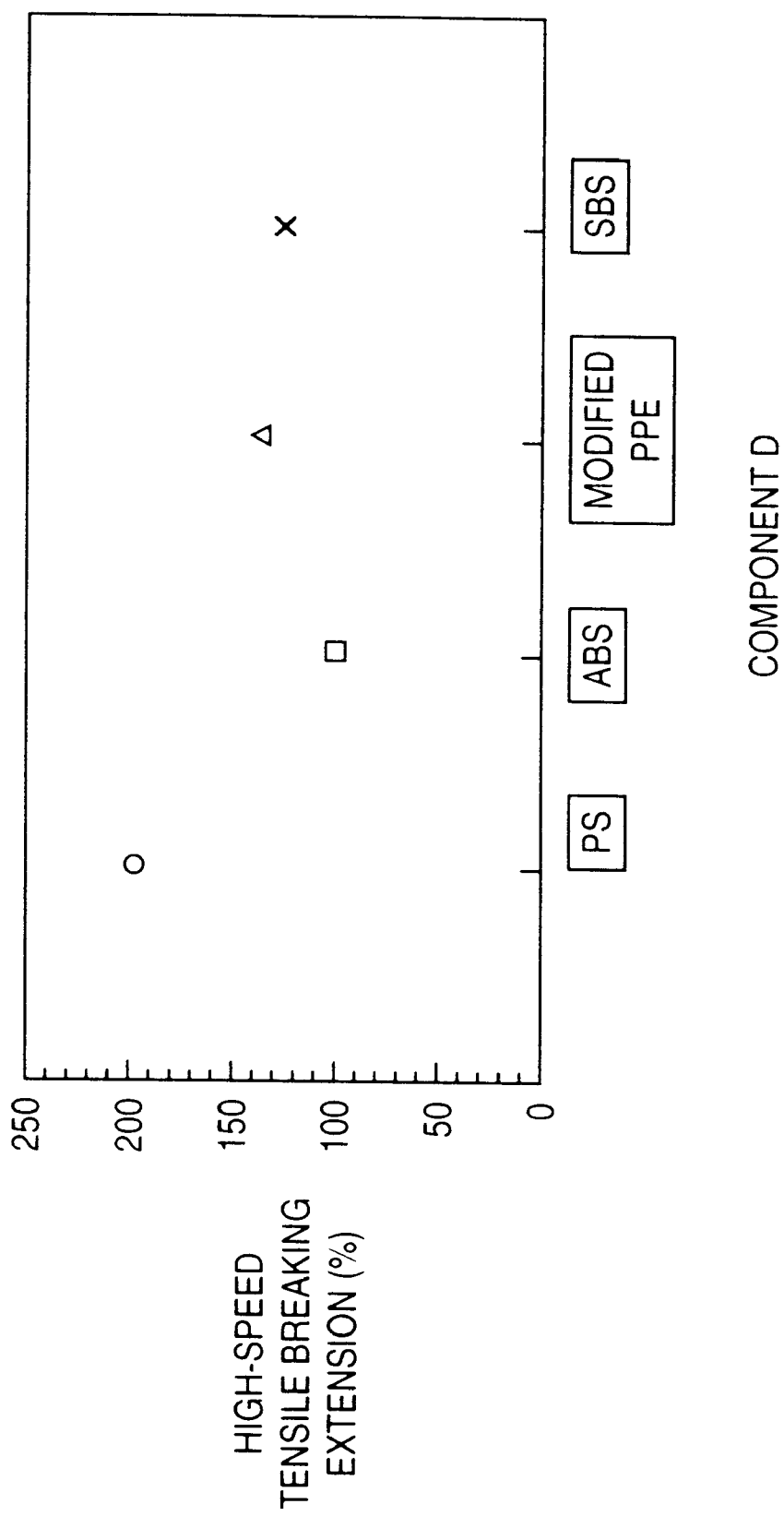
FIG. 36 is a view showing an effect of type of the component D according to another resin composition upon the high-speed tensile breaking extension.
Figure 37:
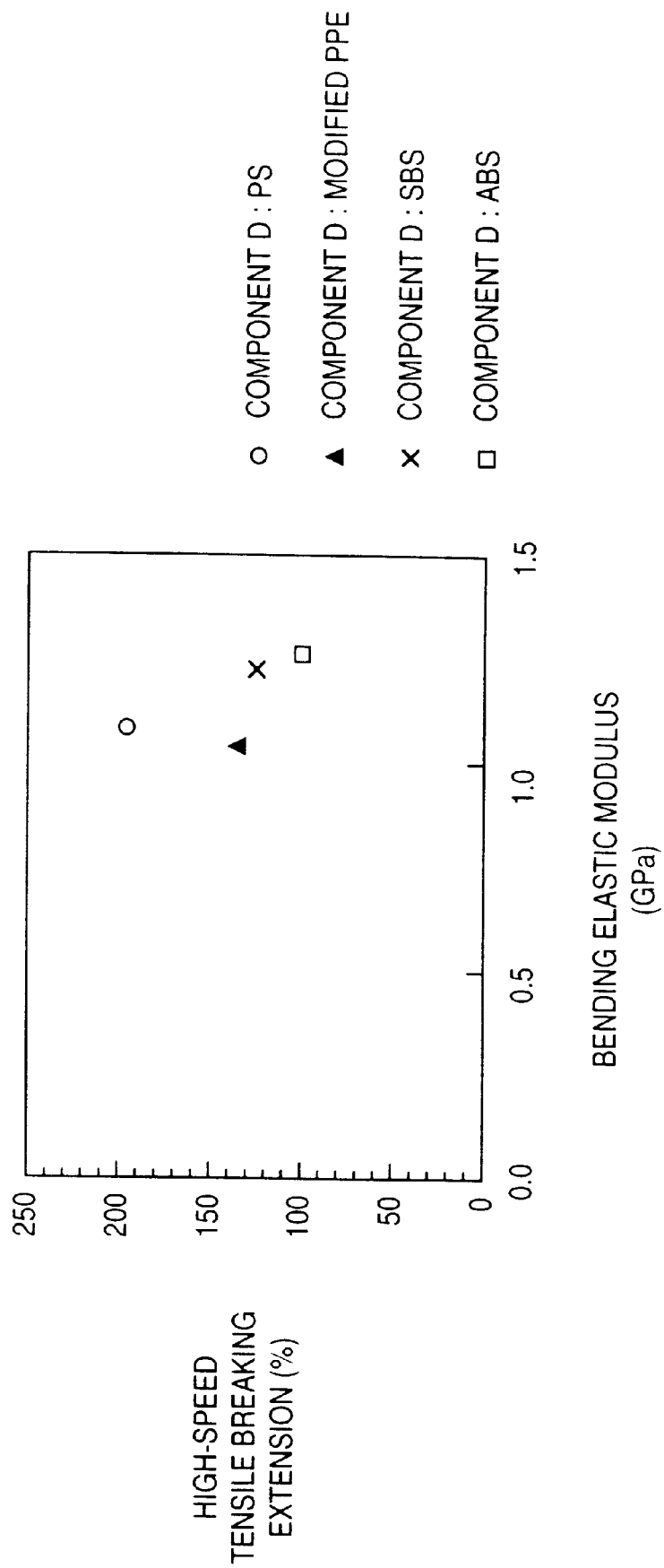
FIG. 37 is a view showing an effect of type of the component D according to another resin composition upon the bending elastic modulus and high-speed tensile breaking extension.

This is because, as shown in FIG. 36 and FIG. 37, in any component, the high-speed tensile breaking extension and the bending elastic modulus exhibit well balanced preferable values in a desired region.

The MFR of the above component D is preferably 6 (g/10 minutes) or more, and is more preferably 10 (g/10 minutes) or more.

Figure 38:
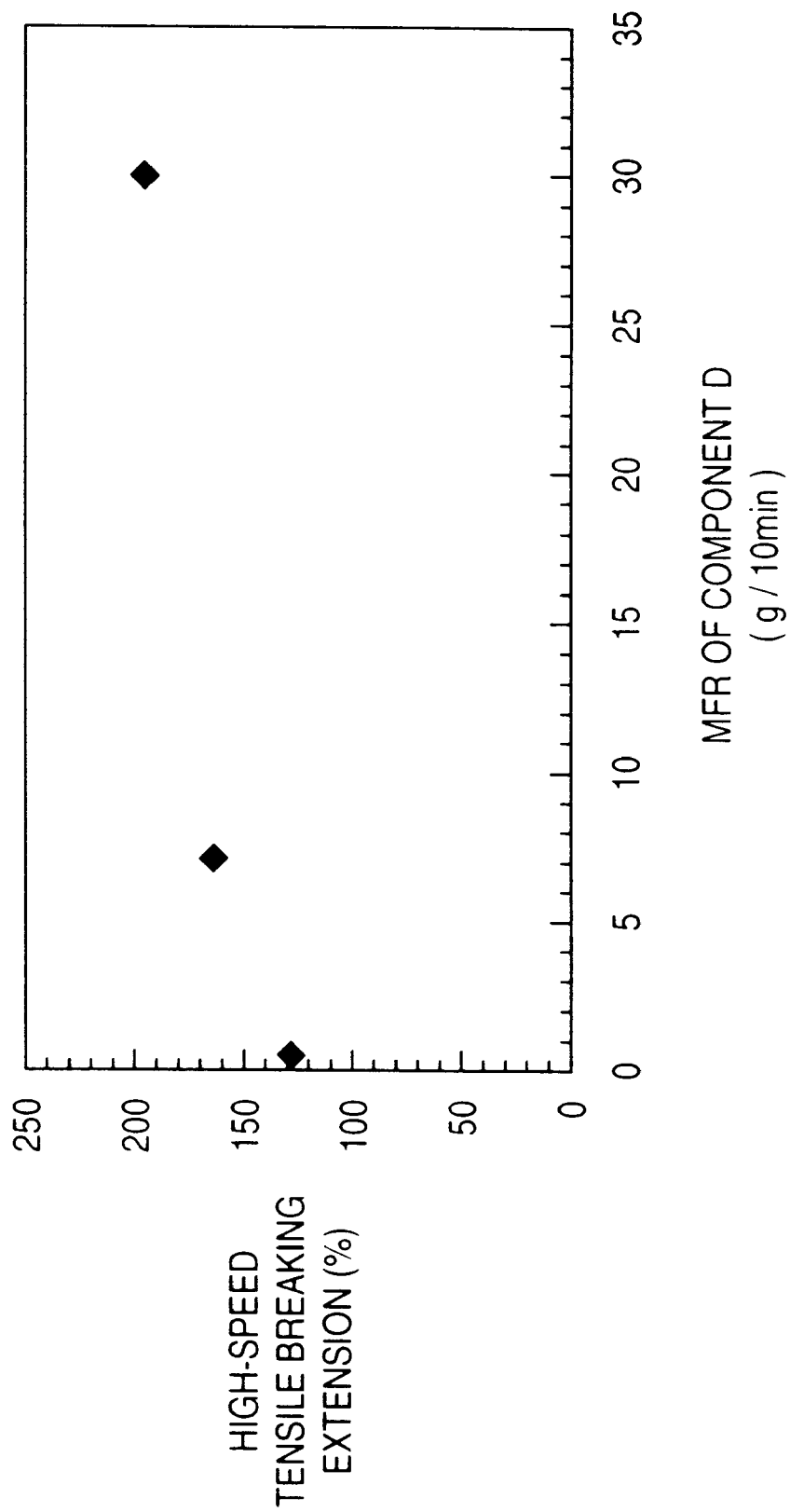
FIG. 38 is a view showing an effect of the MFR of the component D according to another resin composition upon the high-speed tensile breaking extension.

This is because, as shown in FIG. 38 (plotted from Examples 15, 31, and 32 in FIGS. 19A and 19B and FIGS. 20A and 20B), when the MFR is 6 (g/10 minutes) or more, a high value can be obtained with respect to the high-speed tensile breaking extension, and when the MFR is 10 (g/10 minutes) or more, the high-speed tensile breaking extension is further enhanced.

In this case, the MFR is measured in conformance with JIS K7210, and the measuring conditions are 200° C. and 5 kg.

The above component D is surrounded by the above component (B), and it is preferable that they are finely structured of being dispersed in the above component (A).

Figure 39:
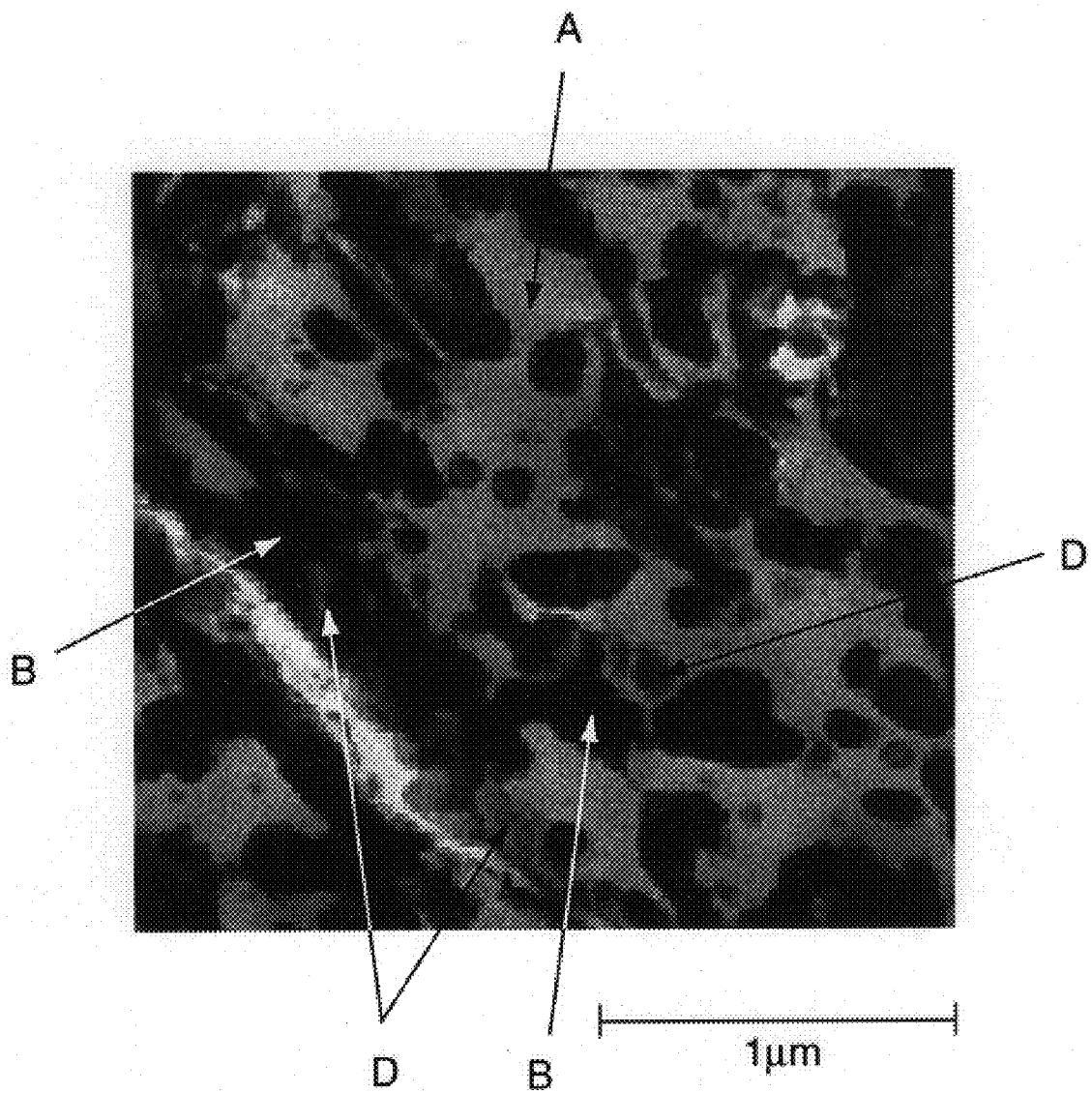
FIG. 39 is a microscopic photographic view showing an internal structure according to Example (magnification: ×30, 000)
Figure 40:
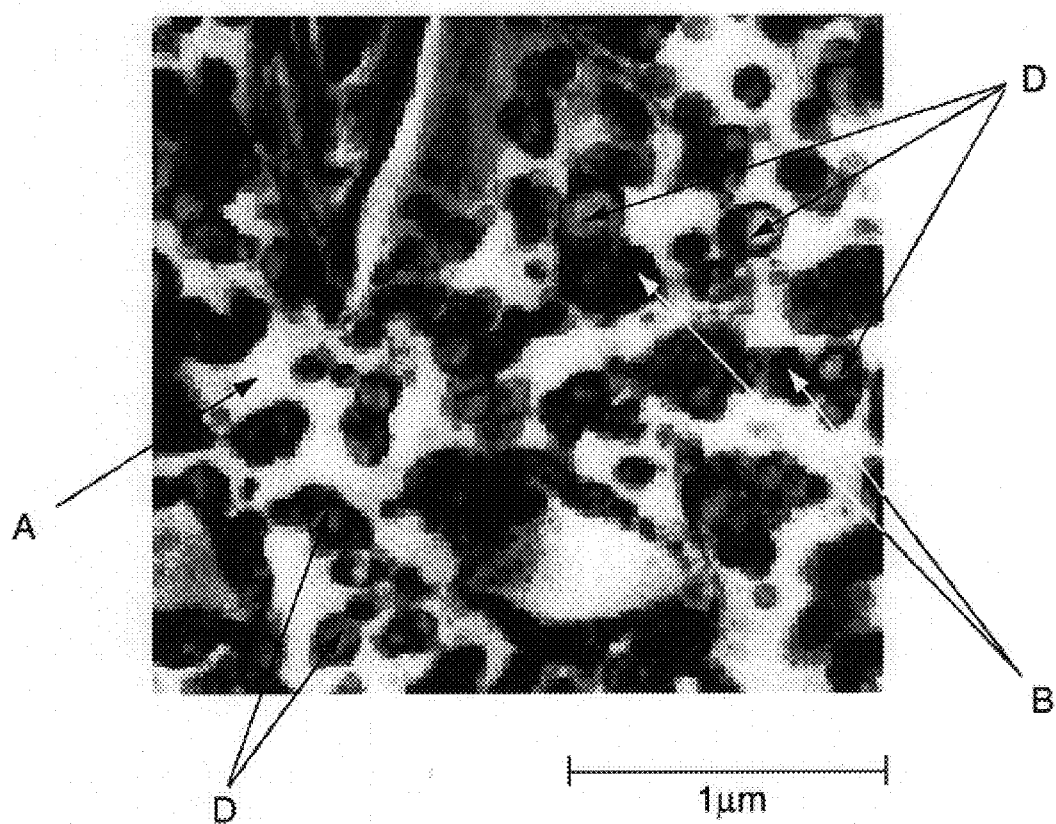
FIG. 40 is a microscopic photographic view showing another internal structure according to Example (magnification: ×30,000)
Figure 41:
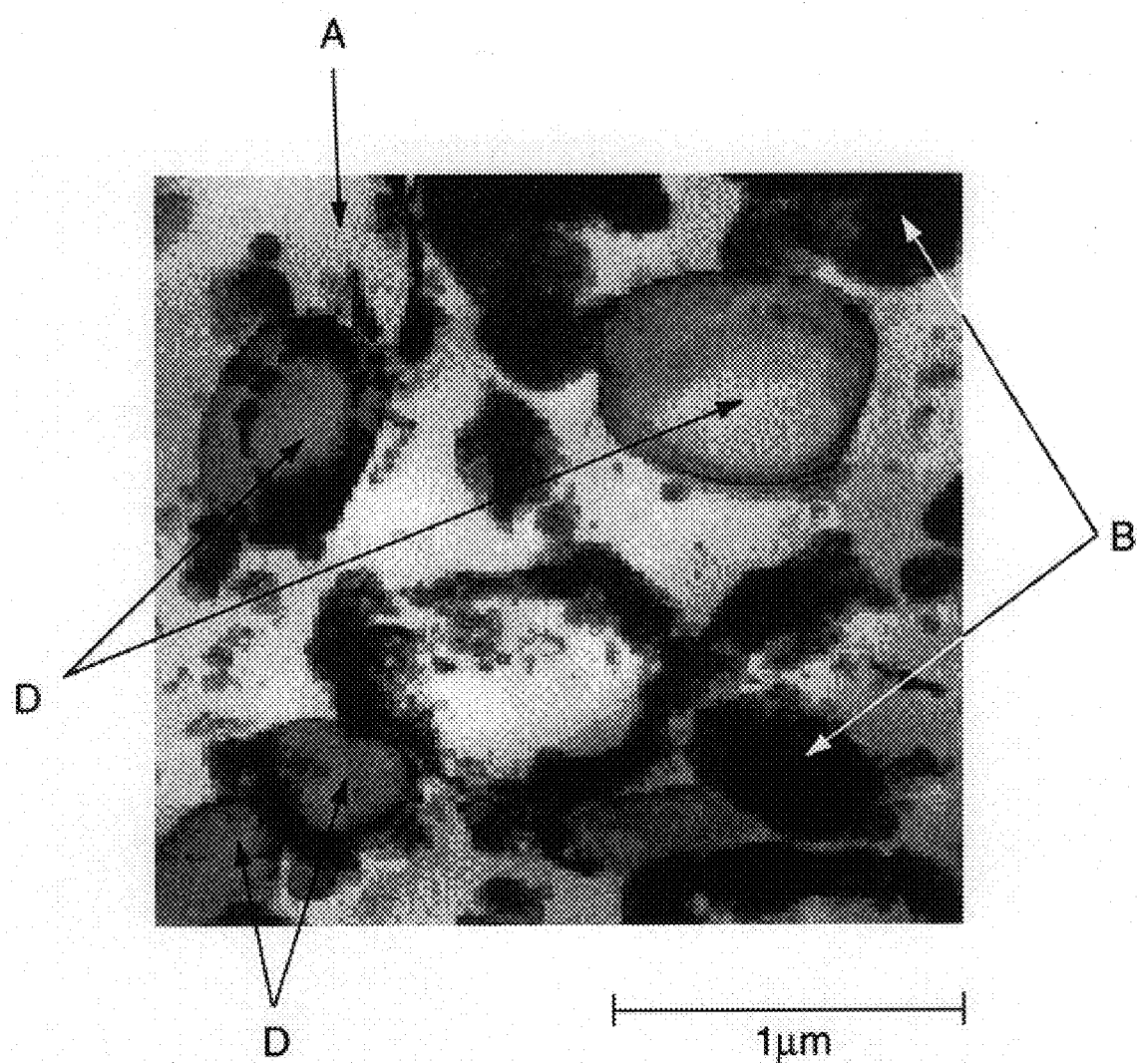
FIG. 41 is a microscopic photographic view showing another internal structure according to Comparative Example (magnification: ×30,000)
Figure 42:
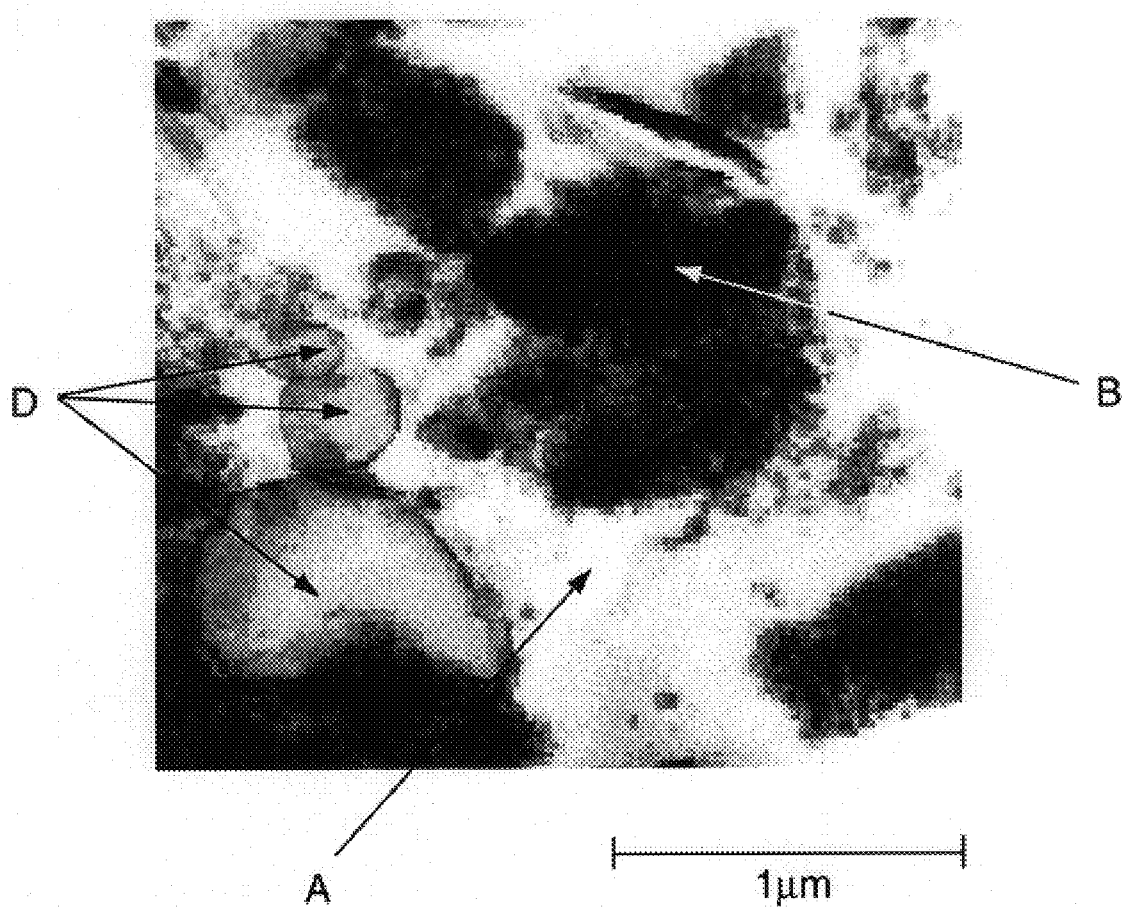
FIG. 42 is a microscopic photographic view showing another internal structure according to Comparative Example (magnification: ×30,000)

This is because, as is obvious from comparison of FIG. 39 (microscopic photo of Example 34 (magnification:×30,000)) and FIG. 40 (microscopic photo of Example 31 (magnification:×30,000)) showing Examples with, FIG. 41 (microscopic photo of Comparative Example 18 (magnification:×30,000), and FIG. 42 (microscopic photo of Comparative Example 14 (magnification:×30,000)) showing Comparative Examples, the above-mentioned fine structure is presented in Examples, and based on this structure, a well balanced value is obtained in a desired region with respect to the high-speed tensile breaking extension and the bending elastic modulus, compared with Comparative Examples in which such fine structure is not presented.

In this case, in FIG. 39 to FIG. 42, reference numerals A, B, and D each designate components A, B, and D. In FIG. 39 and FIG. 40 showing Examples, a white portion designates component A; component B is dispersed as a number of black small lumps in the component A; component D exists as a gray portion in the component B, and the component D is structured of being surrounded by the component B. On the other hand, in FIG. 41 and FIG. 42 showing Comparative Examples, components B and D each have a fine structure in which these components exist independently and in enlarged manner, and the fine structure according to Examples cannot be obtained.

A ratio of melt viscosity before mixing in the component B to melt viscosity before mixture in the component A, that is, (the melt viscosity of component B/melt viscosity of component A) is preferably 2.6 to 10.

Figure 43:
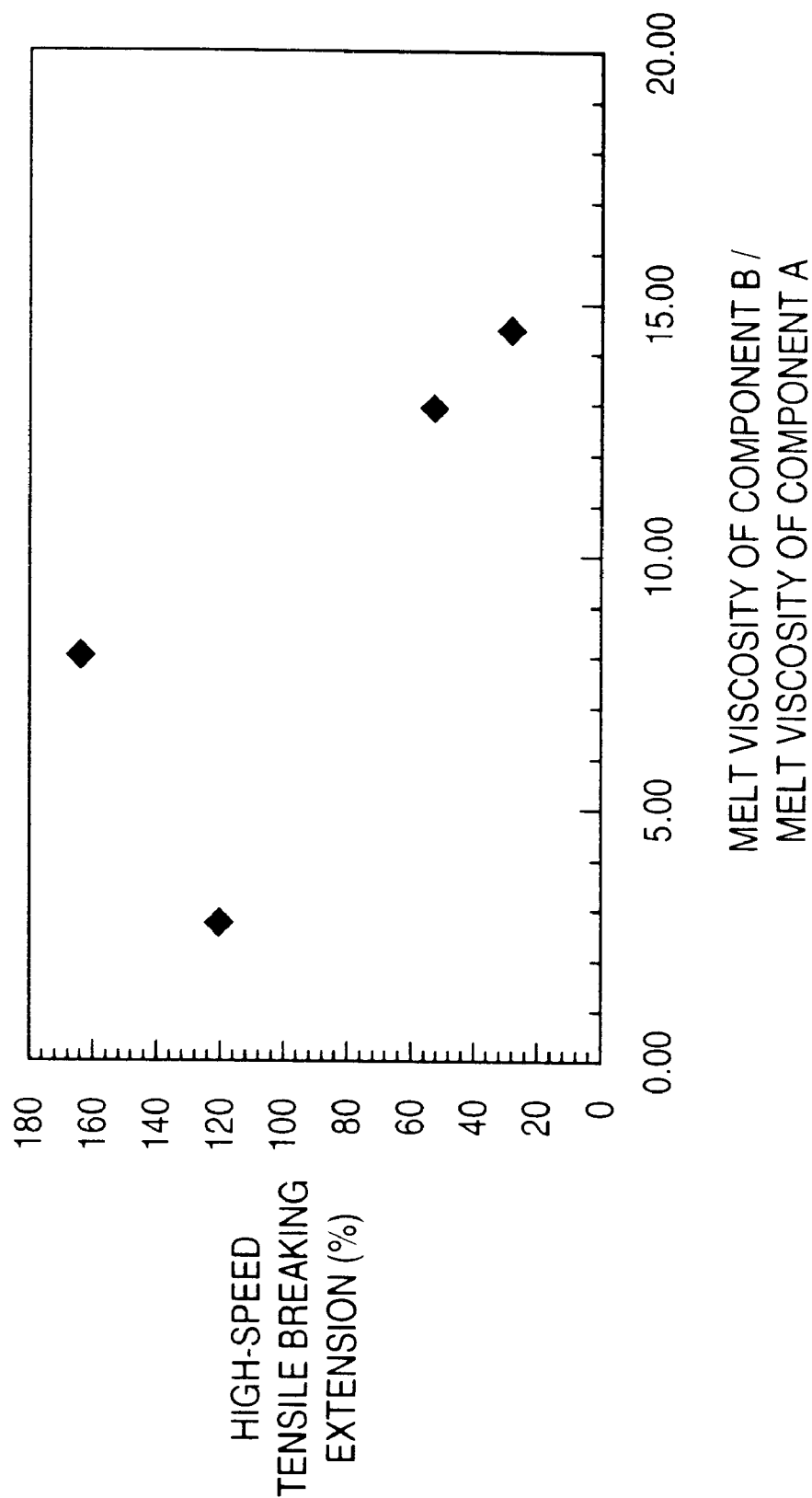
FIG. 43 is a view showing an effect of (the melt viscosity of component B/the melt viscosity of component A) according to another resin composition upon the high-speed tensile breaking extension.

This is because, as shown in FIG. 43 (plotted from Examples 31 and 34 and Comparative Examples 14 and 18 in FIGS. 19A and 19B and FIGS. 20A and 20B), (the melt viscosity of component B/melt viscosity of component A) exhibits characteristics for forming a peak with respect to the high-speed tensile breaking extension, and a preferable value is obtained for the high-speed tensile breaking extension in the above range.

In this case, the viscosity is measured under the measuring conditions in which a temperature is 200° C., a shear speed is 364.8 (l/s), and a capillary diameter is 1 mm using capillarograph under JIS K7199. Hereinafter, the viscosity is measured under the same measuring conditions and using the same measuring method.

A ratio of the melt viscosity before mixing in component D to the melt viscosity before mixing in the component B, i.e., (the melt viscosity of component D/melt viscosity of component B) is preferably 0.4 or less, in particular.

Figure 44:
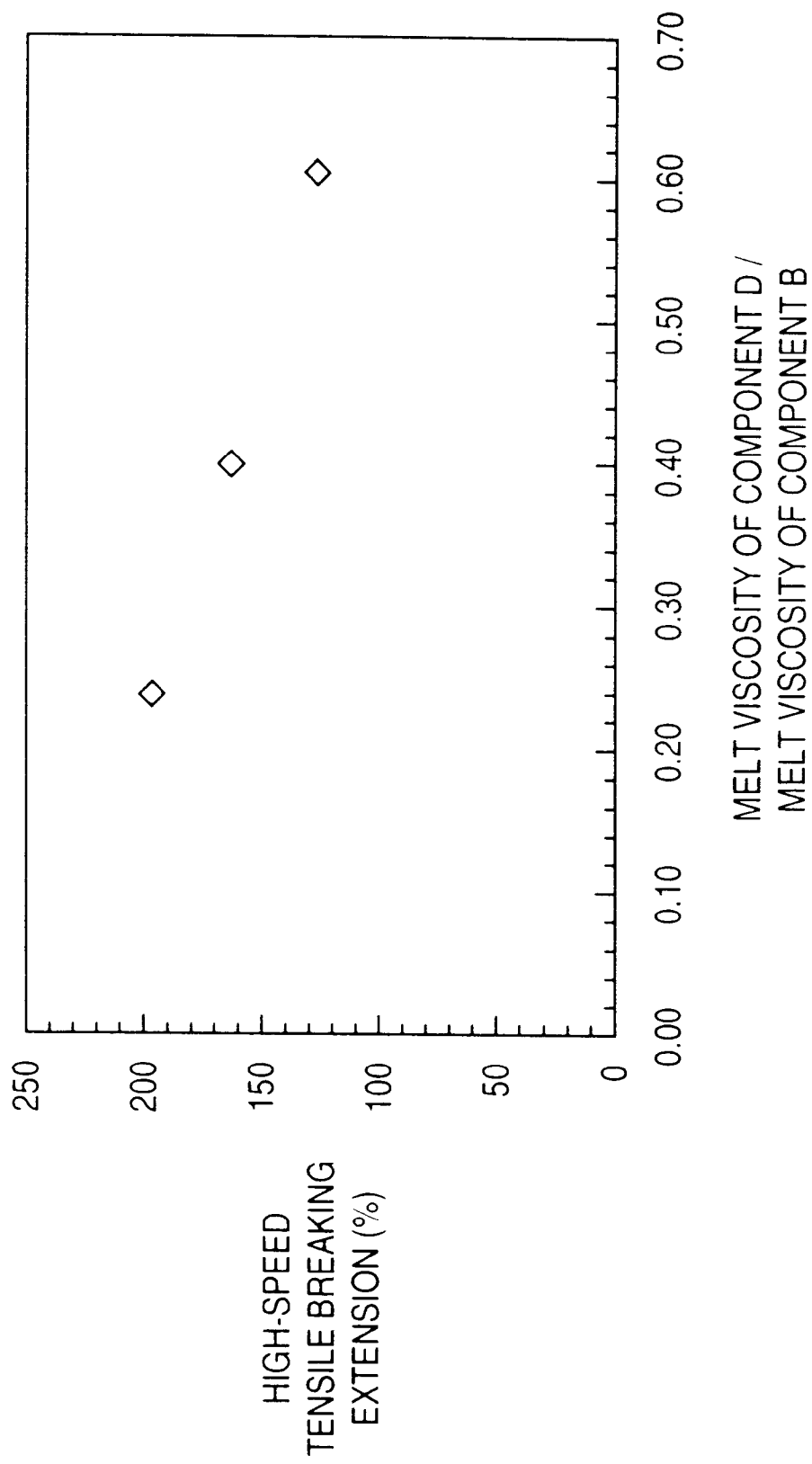
FIG. 44 is a view showing an effect of (the melt viscosity of component D/the melt viscosity of component B) according to another resin composition upon the high-speed tensile breaking extension.

This is because, as shown in FIG. 44 (plotted from Examples 15, 31, and 32 in FIGS. 19A and 19B and FIGS. 20A and 20B), when the above ratio is 1.2 or less, a desired value can be obtained for the high-speed tensile breaking extension, and however, in particular, when it is 0.4 or less, the high-speed tensile breaking extension can be higher. On the other hand, the lower limit of (the melt viscosity of component D/melt viscosity of component B) is about 0.02 because of a restriction regarding obtainable values.

The composition is fractionated into an extraction residue component and an extracted component by Soxhlet fractionation using chloroform; the extracted component is fractionated into a methyl ethyl ketone insoluble component and a methyl ethyl ketone soluble component by dissolution fractionation using methyl ethyl ketone; the methyl ethyl ketone soluble component is fractionated into a hexane soluble component and a hexane insoluble component by dissolution fractionation using hexane; n-decane soluble component is fractionated by heating dissolution fractionation using n-decane with respect to the above extraction residue component; and when a limiting viscosity $\eta 1$ of the hexane insoluble component, a limiting viscosity $\eta 2$ of a mixture in which the hexane soluble component and the methyl ethyl ketone insoluble component are mixed with each other, and a limiting viscosity $\eta 3$ of the n-decane soluble component are obtained, a ratio of the limiting viscosity $\eta 2$ of the mixture to the limiting viscosity $\eta 3$ of the n-decane soluble component, i.e., $\eta 2/\eta 3$ is preferably 0.6 or more and 0.9 or less, and is more preferably greater than 0.6 and less than 0.9.

Figure 45:
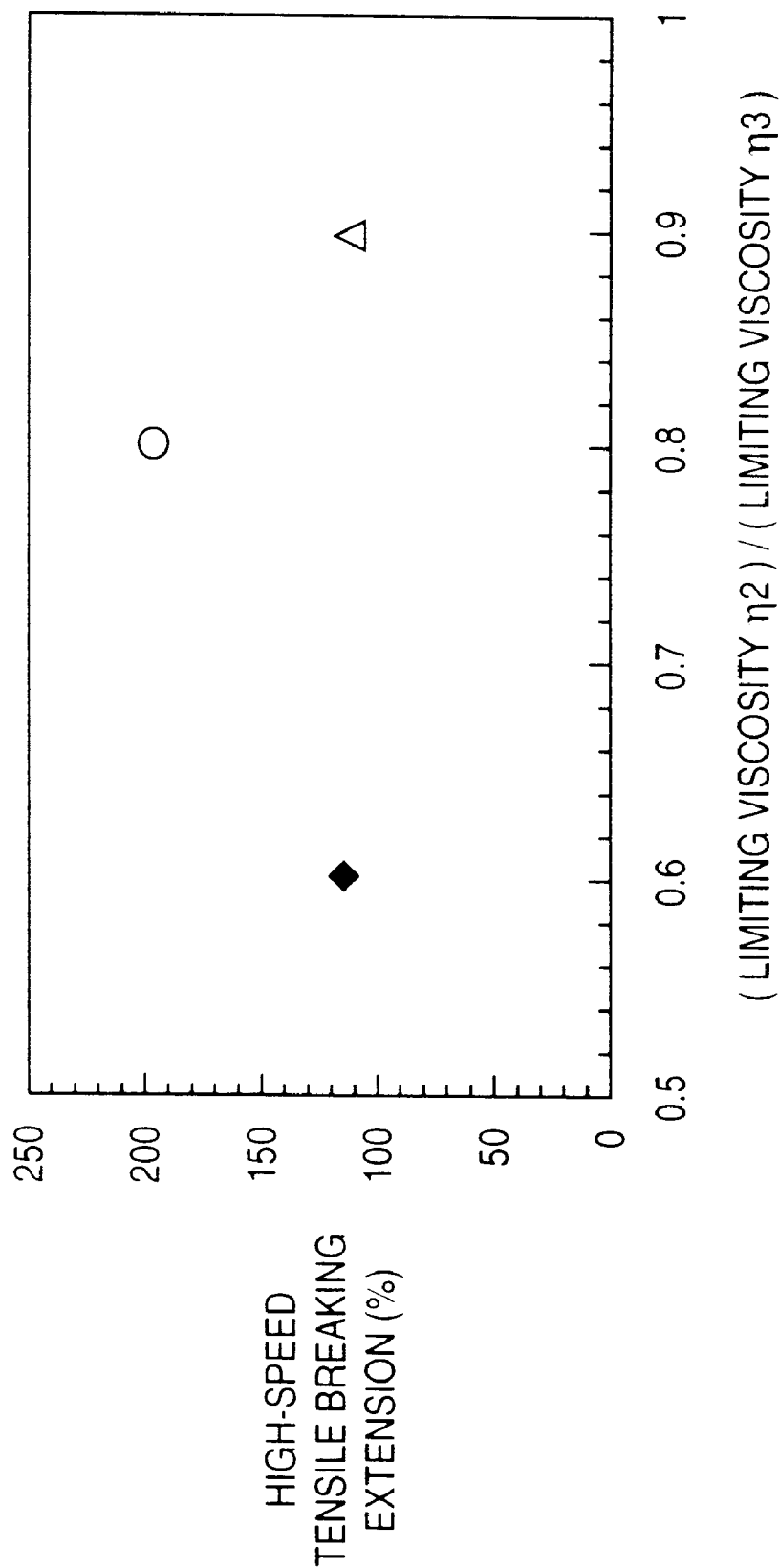
FIG. 45 is a view showing an effect of limiting viscosity η2/limiting viscosity η3 according to another resin composition upon the high-speed tensile breaking extension.

This is because, as shown in FIG. 45 (plotted from Examples 15, 26, and 27 in FIGS. 19A and 19B and FIGS. 20A and 20B), the high-speed tensile breaking extension has such characteristics that it remains and exhibits a peak in a desired region in the $\eta 2/\eta 3$ range of 0.6 to 0.9.

In this case, a relationship in which the above $\eta 2/\eta 3$ is 0.6 or more and 0.9 or less, specifically in the case where the polyolefin resin composition containing the components A, B, and D is a mold milling material or a pellet before molding, is met even in a fractionated one. The hexane insoluble component consists essentially of polystyrene; the hexane soluble component consists essentially of component B (SEPS or the like). In addition, the above methyl ethyl ketone insoluble component consists essentially of component B (SEPS or the like); and the above n-decane soluble component consists essentially of polypropylene.

With respect to the limiting viscosity $\eta 1$ of the hexane insoluble component, the limiting viscosity $\eta 2$ of the mixture, and the limiting viscosity $\eta 3$ of the n-decane soluble component obtained in the similar manner as above, a ratio of the limiting viscosity $\eta 1$ of the hexane insoluble component to the limiting viscosity $\eta 2$ of the mixture, i.e., $\eta 1/\eta 2$ is preferably 0.5 or less, and is more preferably less than 0.5.

Figure 46:
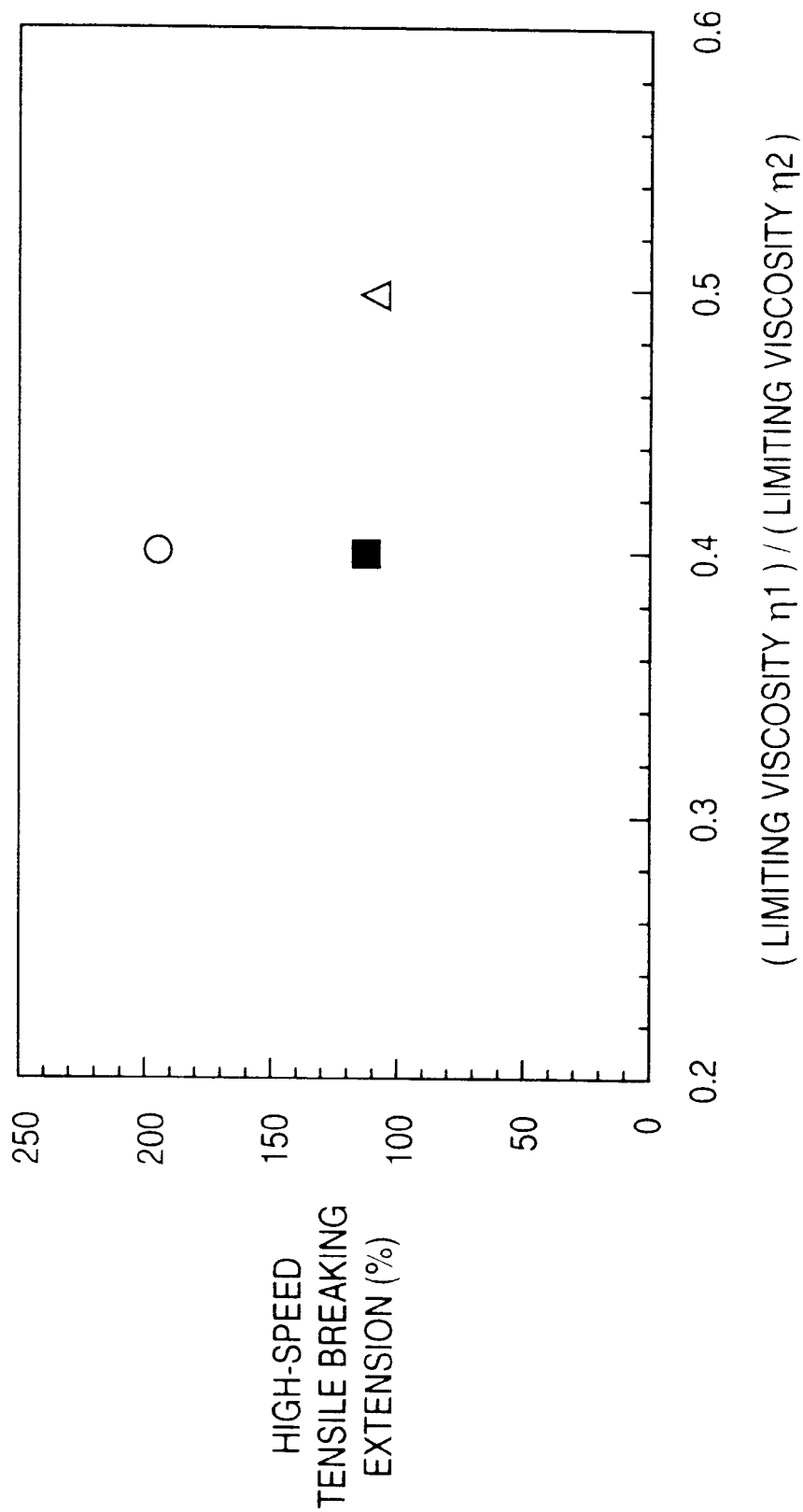
FIG. 46 is a view showing an effect of limiting viscosity η1/limiting viscosity η2 according to another resin composition upon the high-speed tensile breaking extension.

This is because, as shown in FIG. 46, when $\eta 1/\eta 2$ is 0.5 or less, the high-speed tensile breaking extension can be improved. In this case, the lower limit is preferably 0.05.

In the resin composition, a recycled polypropylene or propylene-ethylene block copolymer may be contained as component A; a recycled aromatic vinyl polymer may be contained as component D; a copolymer including at least both of the styrene skeleton and the ethylene skeleton as component B may be contained as a content adjusting material. Thereby, even if the recycled components A and D are employed (polypropylene, polystyrene as an aromatic vinyl polymer, acrylonitrile-butylene-styrene copolymer (ABS) or modified polyphenylene ether (PPE) or the like); the component B as a content adjusting material adjusts the A, D, and B contents, and the high-speed tensile breaking extension and bending elastic modulus can be compatible with each other in a desired region in the similar manner as when a fresh material is employed.

By referring to a specific example, in an automobile, a polypropylene resin (component A) is used for a main body and a surface skin of an instrument panel, an ABS resin is often used for an air blowout port, switch or the like, and an ABS resin or a modified PPE resin is often used for a center panel or the like in connection with recycling properties. Therefore, even for a polypropylene based instrument panel with its superior recycling properties, there has been a problem that parts such as air blowout port, switch, and center panel must be separated, resulting in much disassembling time or higher cost. However, as described above, even if the recycled components A and D are employed, the component B as a content adjusting material adjusts the contents of A, D, and B. Thus, as in the case where a fresh material is employed, according to the present invention, the high-speed tensile breaking extension and the bending elastic modulus can be compatible with each other in a desired region, making it possible to solve the above problem, with an attempt for extensive use.

In a polyolefin resin composition according to this embodiment, talc whose specific surface area is 3.5 $m^2/g$ or more is preferably blended in the range of 0 to 30 wt. % in all including the talc, and is more preferably 10 wt. % to 20 wt. %.

In the above range, the talc can enhance the high-speed tensile breaking extension in a desired region in which the bending elastic modulus and the high-speed tensile breaking extension are compatible with each other. That is, in the case where the specific surface area is less than 3.5 $m^2/g$, if the blend exceeds 30 wt. % in all including the talc, the high-speed tensile breaking extension is significantly lowered for reasons such as difficulty in mixing. In addition, when it is less than 10 wt. %, the bending elastic modulus is less improved, and if 20 wt. % is exceeded, the extension is lowered, and the specific gravity is increased.

In the polyolefin resin composition according to this embodiment, based on each of the aforementioned factors or based on a connection between these elements, the bending elastic modulus is preferably set to 0.5 GPa or more, the tensile breaking extension at a strain speed of 60 (l/s) is preferably set to 80% or more, and further, the bending elastic modulus is more preferably set to 0.5 GPa or more, and the tensile breaking extension at a strain speed of 60 (l/s) is more preferably set to 145% or more.

This is because the high-speed tensile breaking extension is enhanced in a desired region in which the high-speed tensile breaking extension and the bending elastic modulus are compatible with each other in order to properly absorb desired shock energy through a resin composition itself or in cooperation with a structure of the energy absorbing body 3.

Figure 47:
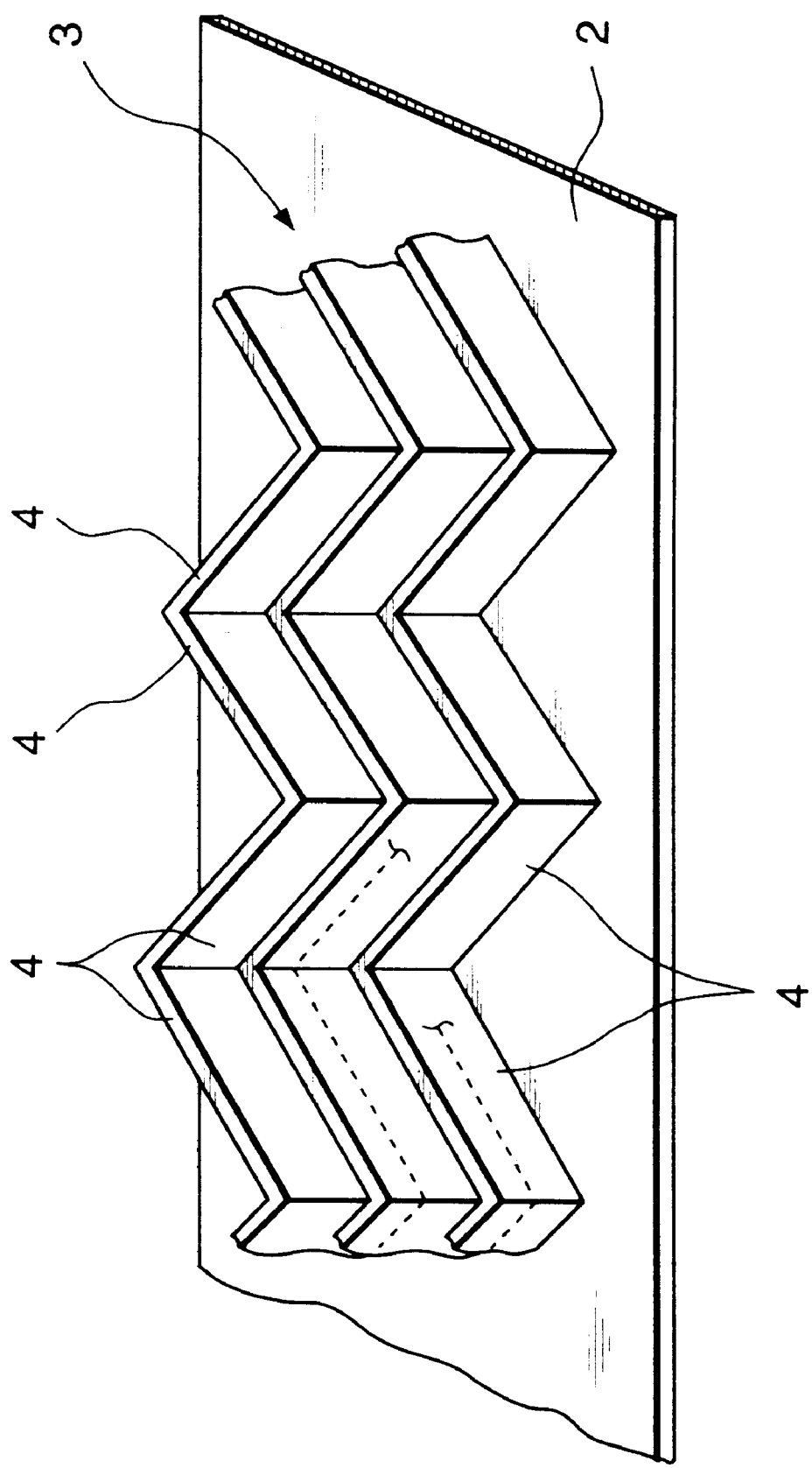
FIG. 47 is a perspective view showing an energy absorbing body and a pillar trim according to the second embodiment.
Figure 48:
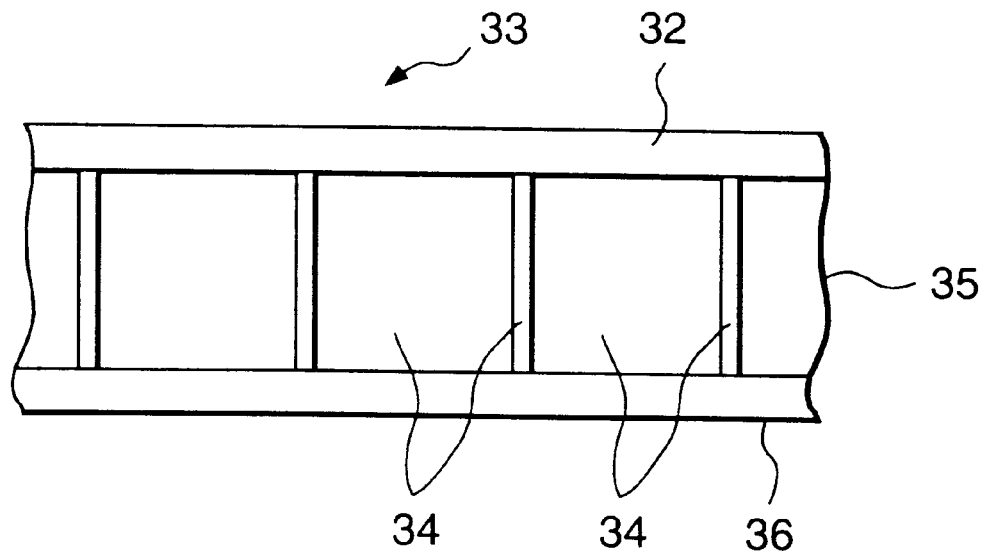
FIG. 48 is a front view showing the energy absorbing body according to the third embodiment.
Figure 49:
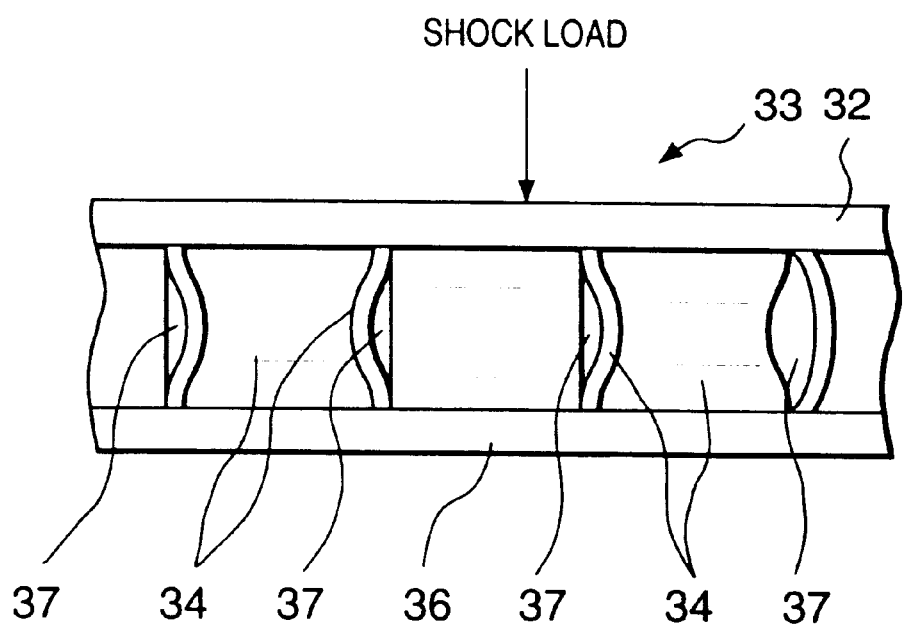
FIG. 49 is a view of the state of operation from FIG. 48.
Figure 52:
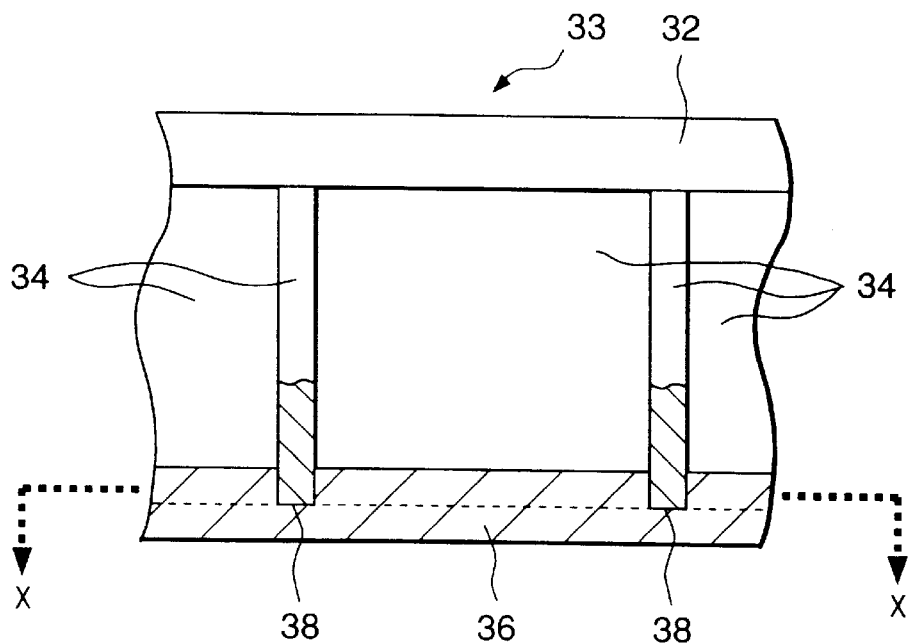
FIG. 52 is a partial front view showing the energy absorbing body according to the fourth embodiment.
Figure 53:
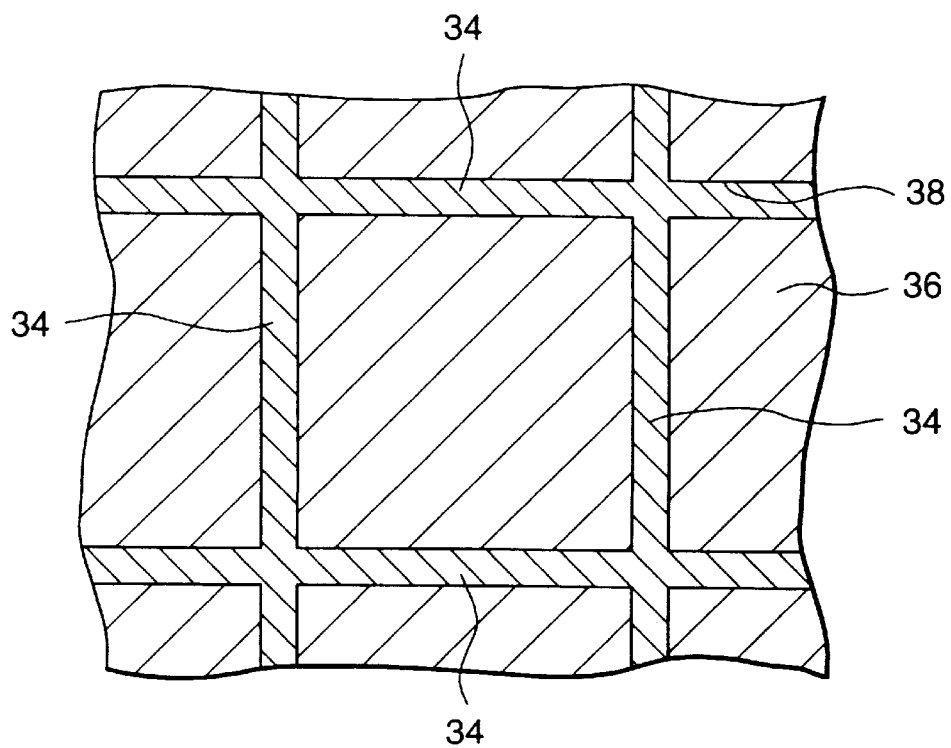
FIG. 53 is a sectional view taken along an X—X line of FIG. 52.

FIG. 47 shows a second embodiment; FIG. 48 to FIG. 51 show a third embodiment; FIG. 52 and FIG. 53 show a fourth embodiment; and FIG. 54 shows a fifth embodiment. In these embodiments each, the same constituent elements as those in the first embodiment are designated by the same reference numerals, a description of which is omitted.

The second embodiment shown in FIG. 47 shows a modified example of the first embodiment. In this second embodiment, instead of a lattice shape according to the first embodiment, the energy absorbing body 3 is formed in a wave shape, the wave shape of which is obtained by connecting the plate shaped rib portions 4 with their enhanced high-speed tensile breaking extension so as to be crossed. In this manner, although the crossing portion (connected portion) of each rib portion 4 is easily breakable from the structural point of view based on the shock load, breakage of each rib portion 4 is restricted based on the fact that the fast tension breakage extension of each rib portion 4 (energy absorbing body 3) is enhanced, and the operation and effect similar to those of the first embodiment can be achieved.

In the third embodiment shown in FIG. 48 to FIG. 51, an energy absorbing body 33 is constituted of integrally sandwiching a lattice-shaped body 35 between a pillar trim 32 as a constraint member and a resin based support plate 36.

That is, the lattice-shaped body 35 is formed in a lattice shape by arranging each rib portion 34 so as to ensure a position relationship substantially orthogonal to the adjacent rib portions 34, and the lattice-shaped body 35 is integrated so that such each rib portion 34 is erected from the pillar trim 32. The lattice-shaped body 35 and the pillar trim 32 are formed simultaneously by ejection molding using a routinely employed general resin (general polypropylene (bending elastic modulus: 0.5 GPa or more and high-speed tensile breaking extension (extension rate): about 30%)).

The support plate 36 is formed in a flat plate shape by employing a resin material of the same type as the above lattice-shaped body 35 or the like, and the flat plate shaped support plate 36 and the tip end of each rib portion 34 (lattice-shaped body 35) (the lower end in FIGS. 20A and 20B) are integrated with each other by means of an adhesive or welding so as to sandwich each of the rib portions 34.

Figure 50:
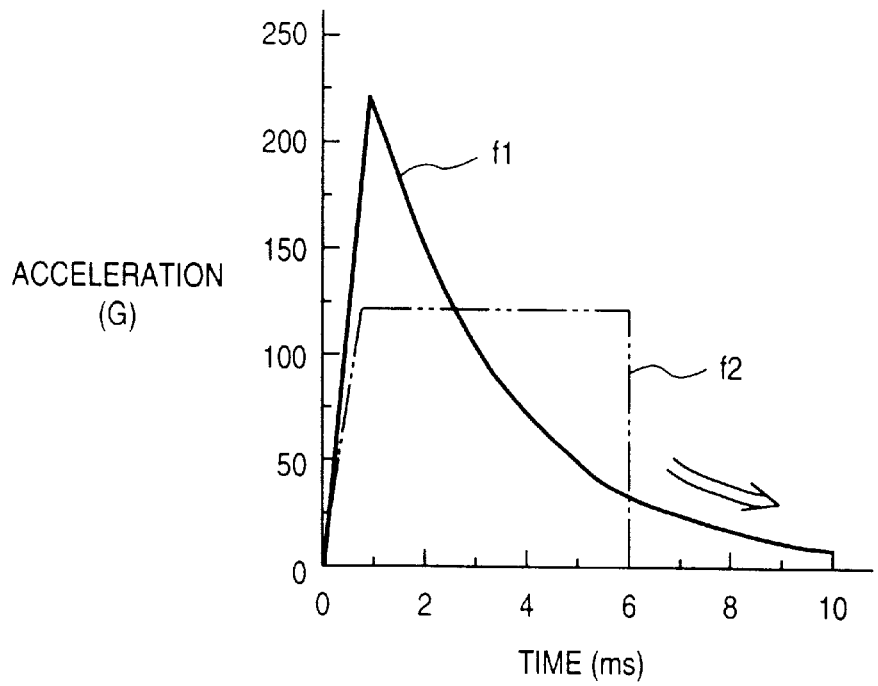
FIG. 50 is a graph depicting acceleration-time characteristics in the third embodiment.
Figure 51:
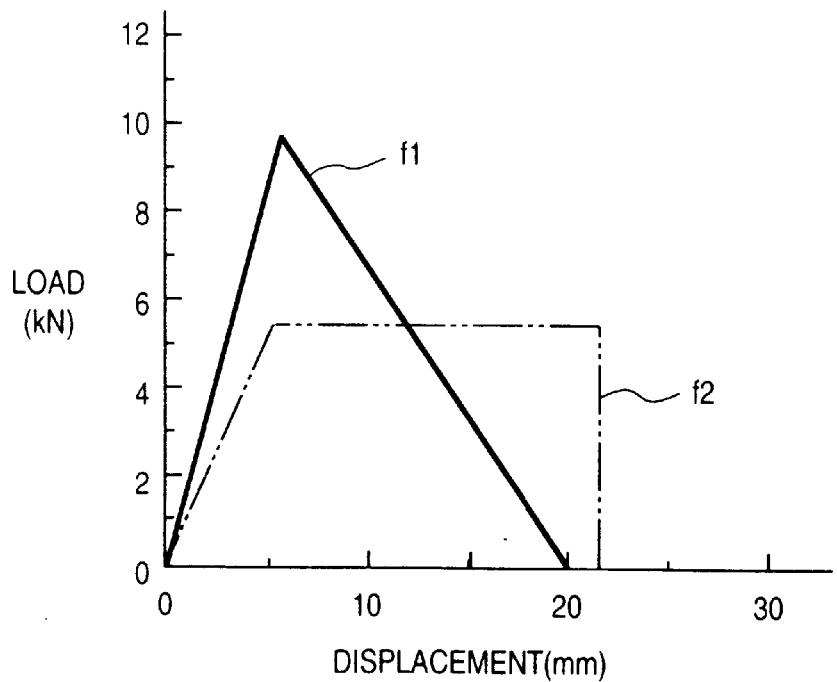
FIG. 51 is a graph depicting load-displacement characteristics in the third embodiment.

In a state in which this energy absorbing body 33 is set to an automobile (a pillar portion), based on the fact that the crossing portion of the tip end and proximal end of the adjacent rib portions 34 which may be broken most easily and which cause breakage to be accelerated at the initial stage of collision and deformation was hardly broken when shock load is applied, the generated load (crush acceleration) rapidly rises as shown by the characteristic line f1 in FIG. 50 and FIG. 51. However, a portion other than the crossing portion between the tip end and proximal end of the adjacent rib portions 34, i.e., a crossing portion at the center between the tip end and the proximal end starts breakage around its side, and forms a broken space 37 (refer to FIG. 49), and the generated load (crush acceleration) turns to be lowered immediately. After the breakage has occurred, the breakage is accelerated more slowly than breakage from the crossing portion of the tip end and proximal end of the adjacent rib portions. Thus, the generated load (crush acceleration) is gradually lowered as shown by the characteristic line f1 in FIG. 50, the acting time of the generated load (crush acceleration) (time for a human being to abut against an interior material) increases, and shock energy absorption can be increased. As a result, a desired shock energy can be absorbed in a state in which overhanging of the pillar trim 32 hardly changes. Characteristic lines f2 in FIG. 50 and FIG. 51 show characteristics in the first embodiment.

Of course, in this case, the support plate 36 is formed in a flat plate shape to contribute to suppression of overhanging of the pillar trim 32.

The fourth embodiment shown in FIG. 52 and FIG. 53 shows a modified example of the third embodiment, showing another mode of integration of the support plate 36 with each rib portion 34.

That is, in the interior face of the support plate 36, a groove 38 corresponding to the tip end shape of each rib portion 34 is formed as an engagement portion, and the tip end of each rib portion 34 is engaged with the groove 38. In this manner, even if an adhesive is not employed, each rib portion 34 (the lattice-shaped body 35) is easily integrated with the support plate 36, making it possible to reliably constrain deformation of the tip end of each rib portion 34 in tension direction for breakage.

A fifth embodiment shown in FIG. 54 shows a modified example of the third embodiment, and shows another mode of integration of the support plate 36 and each rib portion 34.

That is, protrusions 39 each are formed at the tip end of each rib portion 34 in the vicinity of the crossing portion of the adjacent rib portion 34, engagement holes 40 each are formed corresponding to each protrusion 39 at the support plate 36, and each protrusion 39 is engaged with each of the engagement holes 40. In this manner, the protrusions 39 are disposed in the vicinity of easily breakable sites, making it possible to properly suppress breakage, and holes are formed to facilitate processing for the support plate 36.

In this case, the support plate 36 may be eliminated by forming the engagement hole 40 at a pillar (an pillar inner). In this manner, the number of parts can be reduced, and deformation of the tip end of each rib portion 34 can be reliably constrained in tension direction for breakage based on rigid engagement between the energy absorbing body 33 and the pillar. In addition, a recessed engagement hole 40 may be employed without being limitative to a through hole.

In the third to fifth embodiments, the present invention has been described by way of showing an example when a routinely employed general resin (general polypropylene (bending elastic modulus: 0.5 GPa or more and high-speed tensile breaking extension (extension rate): about 30%)) is used for the lattice-shaped body 35 for clarity. Of course, any of the resin compositions in the first embodiment may be employed. The bending elastic modulus and the high-speed tensile breaking extension can be improved by action of the resin itself as well as the above-mentioned structure.

Descriptions of the embodiments have now been completed. The present invention is inclusive of the following modes:

1) applying the present invention to vehicles other than automobile in addition to sites such as automobile bonnet, fender, cowl grill, the outside of front pillar or any other site against which a pedestrian's body (for example, head) bumps, roof side (roof side trim or ceiling material covering the roof side);
2) forming a honeycomb shape or rectangular shape and the like by crossing rib portions; and
3) applying to helmet or something adopted to protect the head.

The present invention is not limited to the above embodiments and various changes and modifications can be made within the spirit and scope of the present invention. Therefore, to apprise the public of the scope of the present invention the following claims are made.

What is claimed is:

1. A polyolefin resin composition comprising:
    a component (A) consisting of polypropylene or a propylene-ethylene block copolymer whose melt flow rate (MFR) is greater than 16 (g/10 minutes);
    an ethylene based rubber component (B); and
    a component (D) compatible with said component (B),
    wherein the component (D) is an aromatic vinyl polymer which is polymerized by only aromatic resin component,
    wherein a content of sum of the propylene-ethylene copolymer part in the weight of component (A), the weight of component (B), and the weight of component (D) to the total weight of sum of the components (A), (B), and (D) is between 25 wt. % and 45 wt. %, and a ratio of the blend quantity of the component (D) to sum of the blend quantities of said components (B) and (D) is less than 0.8.

2. The polyolefin resin composition according to claim 1, wherein the melt flow rate (MFR) of said component (A) is greater than 45 (g/10 minutes).

3. The polyolefin resin composition according to claim 1, wherein said component (B) contains an α-olefin copolymer containing ethylene.

4. The polyolefin resin composition according to claim 1, wherein said component (D) is polystyrene.

5. The polyolefin resin composition according to claim 1, wherein a ratio of viscosity of said component (B) before mixing to viscosity of said component (A) before mixing (viscosity of component (B)/viscosity of component (A)) is 2.6 to 10.

6. The polyolefin resin composition according to claim 5, wherein a ratio of viscosity of said component (D) before mixing to viscosity of said component (B) before mixing (viscosity of component (D)/viscosity of component (B)) is 0.4 or less.

7. The polyolefin resin composition according to claim 1, wherein the composition is fractionated into an extraction residue component and an extracted component by Soxhlet fractionation using chloroform; said extracted component is fractionated into a methyl ethyl ketone insoluble component and a methyl ethyl ketone soluble component by dissolution fractionation using methyl ethyl ketone; said methyl ethyl ketone soluble component is fractionated into a hexane soluble component and a hexane insoluble component by dissolution fractionation using hexane; an n-decane soluble component is fractionated by heating dissolution fractionation using n-decane with respect to said extraction residue component; and when limiting viscosity $\eta 1$ of said hexane insoluble component, limiting viscosity $\eta 2$ of a mixture in which said hexane soluble component and said methyl ethyl ketone insoluble component are mixed with each other, and limiting viscosity $\eta 3$ of said n-decane soluble component are obtained, a ratio of the limiting viscosity $\eta 2$ of said mixture to the limiting viscosity $\eta 3$ of said n-decane soluble component, $\eta 2/\eta 3$ is 0.6 or more and 0.9 or less.

8. The polyolefin resin composition according to claim 1, wherein the composition is fractionated into an extracted remaining component and an extracted component by Soxhlet fractionation using chloroform; said extracted component is fractionated into a methyl ethyl ketone insoluble component and a methyl ethyl ketone soluble component by dissolution fractionation using methyl ethyl ketone; said methyl ethyl ketone soluble component is fractionated into a hexane soluble component and a hexane insoluble component by dissolution fractionation using hexane; an n-decane soluble component is fractionated by heating dissolution fractionation using n-decane with respect to said extraction residue component; and when limiting viscosity $\eta 1$ of said hexane insoluble component, limiting viscosity $\eta 2$ of a mixture in which said hexane soluble component and said methyl ethyl ketone insoluble component are mixed with each other, and limiting viscosity $\eta 3$ of said n-decane soluble component are obtained, a ratio of the limiting viscosity $\eta 1$ of said hexane insoluble component to the limiting viscosity $\eta 2$ of said mixture, $\eta 1/\eta 2$ is 0.5 or less.

9. The polyolefin resin composition according to claim 1, wherein recycled polypropylene or propylene-ethylene block copolymer is contained as said component (A); a recycled aromatic vinyl polymer is contained as said component (D); and as said component (B), a copolymer including at least both of a styrene skeleton and an ethylene skeleton is contained as a content adjusting material.

10. The polyolefin resin composition according to claim 1, wherein a bending elastic modulus is 0.5 GPa or more, and a tensile breaking extension at a strain speed of 60 (1/s) is 80% or more.

11. A polyolefin resin composition comprising:

(A) a component comprising polypropylene or a propylene-ethylene block copolymer whose melt flow rate (MFR) is greater than 16 (g/10 minutes);

(B) an ethylene based rubber component; and (D) a component compatible with said component (B), wherein the component (D) is an aromatic vinyl polymer which is polymerized from only aromatic resin components, wherein the total weight of propylene-ethylene copolymer in components (A), (B), and (D) is between 25 wt. % and 45 wt. % of the total weight of components (A), (B), and (D), and the weight ratio of component (D) to components (B) and (D) is less than 0.8.

12. A polyolefin resin composition comprising:

a component (A) consisting of polypropylene or a propylene-ethylene block copolymer whose melt flow rate (MFR) is greater than 16 (g/10 minutes);

an ethylene based rubber component (B); and a component (D) compatible with said component (B), wherein the component (D) is an aromatic vinyl polymer which is polymerized by only aromatic resin component, wherein a content of sum of the propylene-ethylene copolymer part in the weight of component (A), the weight of component (B), and the weight of component (D) to the total weight of sum of the components (A), (B), and (D) is between 25 wt. % and 45 wt. %, and a ratio of the blend quantity of the component (D) to sum of the blend quantities of said components (B) and (D) is less than 0.8, and wherein said component (B) is a copolymer containing at least both of a styrene skeleton and an ethylene skeleton, the styrene skeleton content in the copolymer of said component (B) is 13 wt. % or more and less than 35 wt. % of the component (B).

13. The polyolefin resin composition according to claim 12, wherein said component (B) contains a propylene skeleton.

14. The polyolefin resin composition according to claim 12, wherein said component (B) contains a butylene skeleton.

15. The polyolefin resin composition according to claim 12, wherein the melt flow rate (MFR) of the copolymer of said component (B) is 0.5 (g/10 minutes) or more and 140 (g/10 minutes) or less.

16. A polyolefin resin composition comprising:

a component (A) consisting of polypropylene or a propylene-ethylene block copolymer whose melt flow rate (MFR) is greater than 16 (g/10 minutes);

an ethylene based rubber component (B); and a component (D) compatible with said component (B), wherein the component (D) is an aromatic vinyl polymer which is polymerized by only aromatic resin component, and the melt flow rate (MFR) of said component (D) is 6 (g/10 minutes) or more and, wherein a content of sum of the propylene-ethylene copolymer part in the weight of component (A), the weight of component (B), and the weight of component (D) to the total weight of sum of the components (A), (B), and (D) is between 25 wt. % and 45 wt. %, and a ratio of the blend quantity of the component (D) to sum of the blend quantities of said components (B) and (D) is less than 0.8.

17. A polyolefin resin composition comprising:

a component (A) consisting of polypropylene or a propylene-ethylene block copolymer whose melt flow rate (MRF) is greater than 16 (g/10 minutes);

an ethylene based rubber component (B); and a component (D) compatible with said component (B), wherein the component (D) is an aromatic vinyl polymer which is polymerized by only aromatic resin component, wherein a content of sum of the propylene-ethylene copolymer part in the weight of component (A), the weight of component (B), and the weight component (D) to the total weight of sum of the components (A), (B), and (D) is between 25 wt. % and 45 wt. %, and a ratio of the blend quantity of the component (D) to sum of the blend quantities of said components (B) and (D) is less than 0.8, and wherein said component (B) surrounds said component (D), and these components each have a fine structure dispersed in said component (A).

* * * * *